United States Patent [19]

Ayata et al.

[11] Patent Number: 5,486,848
[45] Date of Patent: Jan. 23, 1996

[54] RECORDING APPARATUS WHICH TWICE EJECTS DROPLETS TO THE SAME POSITION AND IMAGE FORMING APPARATUS WITH U-SHAPED MATERIAL PATH

[75] Inventors: Naoki Ayata; Yoshiaki Shirato, both of Yokohama; Yasushi Takatori, Sagamihara; Mitsuaki Seki, Machida, all of Japan

[73] Assignee: Canon Kabushiki Kaisha, Tokyo, Japan

[21] Appl. No.: 409,638

[22] Filed: Mar. 23, 1995

Related U.S. Application Data

[63] Continuation of Ser. No. 193,897, Feb. 9, 1994, abandoned, which is a continuation of Ser. No. 957,451, Oct. 7, 1992, abandoned, which is a continuation of Ser. No. 732,583, Jul. 18, 1991, abandoned, which is a division of Ser. No. 489,339, Mar. 6, 1990, abandoned, which is a division of Ser. No. 379,668, Jul. 13, 1989, abandoned, which is a continuation of Ser. No. 287,527, Dec. 19, 1988, abandoned, which is a continuation of Ser. No. 36,179, Apr. 8, 1987, abandoned, which is a continuation of Ser. No. 624,714, Jun. 26, 1984, abandoned, which is a division of Ser. No. 133,327, Mar. 24, 1980, Pat. No. 4,463,359.

[30] Foreign Application Priority Data

| Apr. 2, 1979 | [JP] | Japan | 54-39467 |
| Apr. 2, 1979 | [JP] | Japan | 54-39468 |
| Apr. 2, 1979 | [JP] | Japan | 54-39469 |
| Apr. 2, 1979 | [JP] | Japan | 54-39470 |
| Apr. 2, 1979 | [JP] | Japan | 54-39471 |
| Apr. 2, 1979 | [JP] | Japan | 54-39472 |
| Apr. 11, 1979 | [JP] | Japan | 54-43849 |
| Feb. 22, 1980 | [JP] | Japan | 55-21348 |

[51] Int. Cl.[6] .................................................. B41J 2/05
[52] U.S. Cl. ........................ 347/15; 347/13; 347/57; 347/104
[58] Field of Search .................................. 347/15, 3, 12, 347/13, 42, 43, 57, 104

[56] References Cited

U.S. PATENT DOCUMENTS

| 2,951,894 | 9/1960 | Hirsch | 347/3 |
| 3,177,800 | 4/1965 | Welsh | . |
| 3,404,221 | 10/1968 | Loughren | 347/3 |

(List continued on next page.)

FOREIGN PATENT DOCUMENTS

| 1012198 | 6/1977 | Canada . | |
| 2435214 | 3/1975 | Germany | B41J 3/04 |
| 2349340B2 | 4/1975 | Germany . | |
| 2349340 | 4/1975 | Germany . | |
| 2532037 | 1/1976 | Germany | B41J 3/04 |
| 2817641 | 10/1978 | Germany | B41J 3/04 |
| 2944005 | 5/1980 | Germany . | |
| 2944005A1 | 5/1980 | Germany . | |
| 2945658 | 5/1980 | Germany | B41J 3/04 |
| 51-132036 | 11/1976 | Japan | B41J 3/04 |
| 53-131052 | 11/1978 | Japan | B41J 3/20 |

OTHER PUBLICATIONS

Texas Instruments, "The TTL Data Book for Design Engineers," Second Edition, 1979, ISBN 0–904047–27–X, pp. 11–121 to 11–123.

*Primary Examiner*—Joseph W. Hartary
*Attorney, Agent, or Firm*—Fitzpatrick, Cella, Harper & Scinto

[57] ABSTRACT

An information recording apparatus comprises a recording unit for recording on a recording medium and control means for controlling the recording unit to twice eject droplets to the same position on the recording medium so that the tone of the recording is emphasized. In another aspect of the disclosure, an image forming apparatus includes a storage unit for storing recording material, an image forming unit in which an image is formed without contacting the recording material and a discharge unit for discharging the recording material on which the image has been formed. A transporting mechanism transports the recording material from the storage unit, through the image forming unit to the discharge unit along a U-shaped transporting path.

17 Claims, 37 Drawing Sheets

U.S. PATENT DOCUMENTS

| | | | |
|---|---|---|---|
| 3,580,515 | 5/1971 | Cassill | 347/49 |
| 3,893,131 | 7/1975 | Perel et al. | 347/55 |
| 3,897,492 | 10/1976 | Kraus et al. | |
| 4,015,272 | 3/1977 | Yamamori | 347/68 |
| 4,059,183 | 11/1977 | Hoskins | 347/41 X |
| 4,063,254 | 12/1977 | Fox et al. | 347/41 |
| 4,112,469 | 9/1978 | Paranjpe | 347/3 |
| 4,117,518 | 9/1978 | Skala | 347/3 X |
| 4,141,018 | 2/1979 | Mizuguchi et al. | 347/180 |
| 4,223,323 | 9/1980 | Bader | 347/39 |
| 4,330,787 | 5/1982 | Sato et al. | 347/63 |
| 4,459,600 | 7/1984 | Sato et al. | 347/56 |
| 4,463,359 | 7/1984 | Ayata et al. | 347/56 |
| 4,520,373 | 5/1985 | Ayata et al. | 347/56 |
| 4,721,968 | 1/1988 | Arai et al. | 347/15 X |
| 4,723,129 | 2/1988 | Endo et al. | 347/56 |
| 5,006,864 | 4/1991 | Ayata et al. | 347/3 |

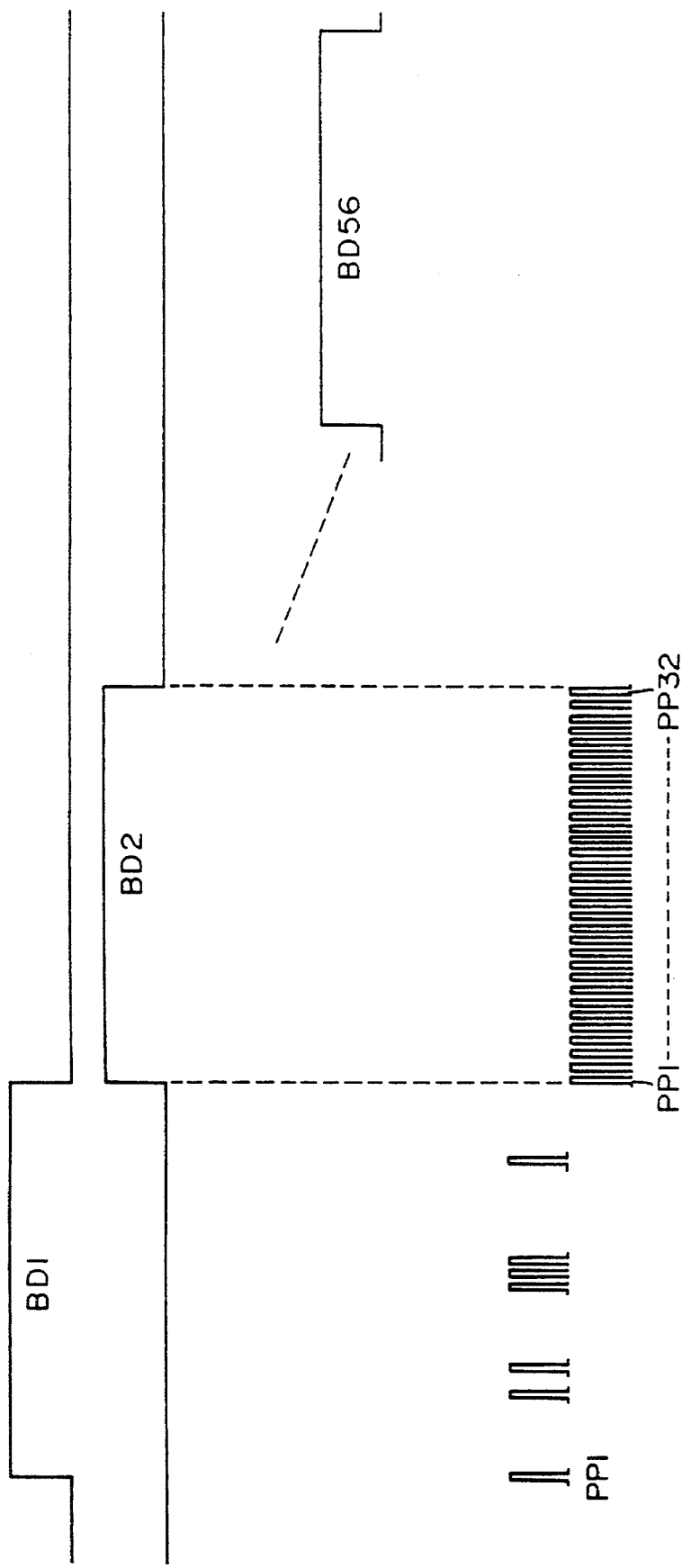
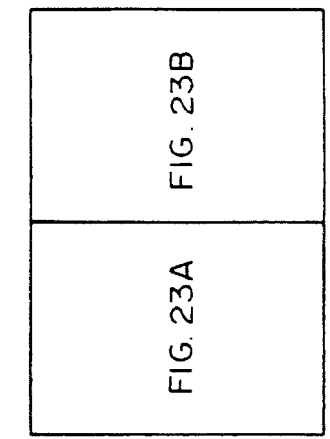
FIG. 22
FIG. 23

RECORDING APPARATUS WHICH TWICE EJECTS DROPLETS TO THE SAME POSITION AND IMAGE FORMING APPARATUS WITH U-SHAPED MATERIAL PATH

This application is a continuation of application Ser. No. 08/193,897 filed Feb. 9, 1994, now abandoned, which in turn is a continuation of application Ser. No. 07/957,451, filed Oct. 7, 1992, now abandoned, which in turn is a continuation of application Ser. No. 07/732,583, filed Jul. 18, 1991, now abandoned, which is a division of application Ser. No. 07/489,339, filed Mar. 6, 1990, now abandoned, which in turn is a division of application Ser. No. 07/379,668, filed Jul. 13, 1989, now abandoned, which in turn is a continuation of application Ser. No. 07/287,527, filed Dec. 19, 1988, now abandoned, which in turn is a continuation of application Ser. No. 07/036,179, filed Apr. 8, 1987, now abandoned, which in turn is a continuation of application Ser. No. 06/624,714, filed Jun. 26, 1984, now abandoned, which in turn is a division of application Ser. No. 06/133,327, filed Mar. 24, 1980, now U.S. Pat. No. 4,463,359.

BACKGROUND OF THE INVENTION

1. Field of the Invention

The present invention relates to a droplet generating method and apparatus therefor, and more particularly to a method and apparatus therefor for emitting a droplet from an orifice of a small liquid chamber containing liquid therein more specifically the present invention provides a method for repeated high-speed generation of the droplets and apparatus for allowing accurate generation of droplets of a uniform diameter.

2. Description of the Prior Art

In the related field there are already known ink jet recording apparatus for example of drop-on-demand type, which are recently attracting particular attention because of their negligibly low noise and absence of an unnecessary ink deposit when recording. Such recording is considered particularly useful in the ability of recording on plain paper without a particular fixing treatment. In the field of such drop-on-demand type ink jet recording there have been proposed various apparatus some of which are already in commercial use, while others are still in the course of development.

In summary, the ink jet recording of the drop-on-demand type performs recording by emitting a droplet of recording liquid, called ink, from a small orifice in response to an instruction signal and depositing the droplet onto a recording material. In the known methods, the droplet generation is achieved for example by the use of a piezoelectric element.

The present invention relates to a novel drop-on-demand type ink jet recording method which is different from the conventional method utilizing the piezoelectric element and which effects the droplet emission from a small orifice by applying a drive signal to the liquid introduced to a small liquid chamber thereby causing bubble formation in the liquid. Also in a related field U.S. Pat. No. 3,878,519 discloses another apparatus, which while not requiring pressurizing and deflecting means, does provide droplets of insufficient evenness because of a weak droplet forming force and further requires a liquid recovery mechanism for unused droplets, and thus cannot be compactized.

SUMMARY OF THE INVENTION

A principal object of the present invention is to provide a solution to technical problems which have not been resolved in this technical field by the conventional technology.

Another object of the present invention is to provide apparatus well adapted for example for high-speed droplet emission without the trouble of the defect or lack of droplet emission.

Still another object of the present invention is to provide apparatus having a very short induction period before reaching a stable droplet emission state and achieving a gradual retraction of the liquid meniscus after the droplet emission.

Still another object of the present invention is to provide a droplet emitting apparatus allowing easy maintenance.

In accordance with one aspect of the present invention, an information recording apparatus comprises recording means for recording on a recording medium, said recording means having a plurality of heat energy generating elements corresponding to a plurality of ejection ports for ejecting ink, said heat energy generating elements causing a change in the state of the ink for ejecting ink droplets from the associated ejection ports and attaching the ink droplets to the recording medium, and control means for causing said recording means to twice eject ink droplets to the same position on the recording medium so that the tone of the recording is emphasized.

In accordance with another aspect of the present invention, an image forming apparatus for forming an image on a recording material using image forming means adapted to eject ink comprises storage means for storing the recording material, an image forming unit in which the image is formed by said image forming means without contacting the recording material, discharge means for discharging the recording material on which the image has been formed, and transporting means for transporting the recording material through a transport path from said storage means through said image forming unit to said discharge means, wherein the transport path for the recording material has a U-shaped configuration.

BRIEF DESCRIPTION OF THE DRAWINGS

FIG. 22 is a waveform chart showing the drive signals;

DESCRIPTION OF THE PREFERRED EMBODIMENTS

The present invention will now be explained in detail on the embodiments thereof shown in the attached drawings.

Figure 1:
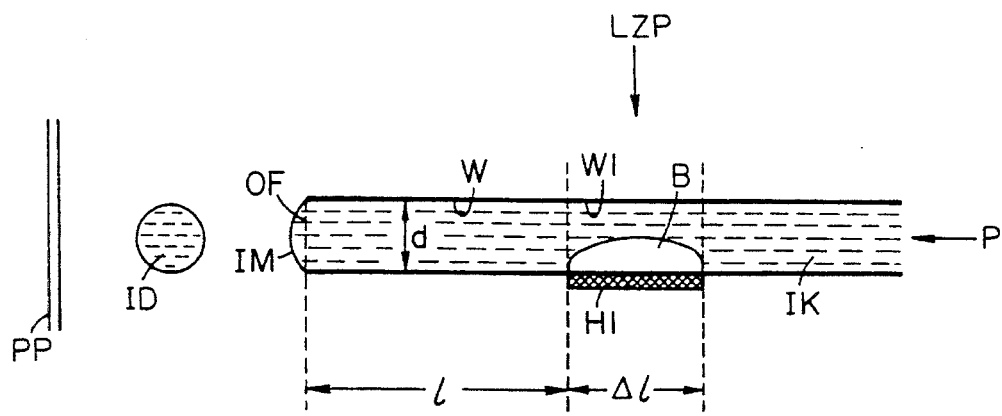
FIGS. 1, 2 and 3 are explanatory schematic views showing the working principle of the present invention.

Reference is no made to FIG. 1 showing, in a schematic view, the principle of droplet emission by the droplet emission head of the present invention.

A liquid chamber W constituting the emission head is supplied with liquid IK. Upon receipt of a drive signal, a heating element H1 having a width $\Delta l$ and located at a distance l from an orifice OF initiates the temperature rise. When heating element H1 reaches a temperature above the evaporating point of the liquid contained in the chamber W1, a bubble B is formed on heating element H1. With the rise of temperature thereof, bubble B rapidly increases the volume thereof. As the result the pressure in the liquid chamber W1 rapidly increases, and the liquid present in the chamber W1 is displaced rapidly in the direction of the orifice OF and in the opposite direction by an amount equal to the volume increase of the formed bubble B. Consequently a part of the liquid present in the portion l of the chamber W is emitted from the orifice OF. The emitted liquid constitutes a liquid column, of which the front end accumulates the kinetic energy supplied thereto until the growth thereof is terminated. In case the bubble B collides with the ceiling of the liquid chamber W1, the colliding force is diverted in the longitudinal direction to enhance the droplet propelling force.

Upon termination of the drive signal supplied to the heating element H1, the temperature thereof gradually lowers so that the bubble B initiates volume contraction with after a slight delay in time. Along with the volume contraction, the liquid is replenished into portion $\Delta l$ from the direction of the orifice OF and from the opposite direction. In this manner the liquid present in the vicinity of the orifice OF is retracted to the chamber W1, so that the kinetic energy of the front end portion of the liquid column is directed opposite to that of the portion of the liquid column close to the orifice OF. Thus the front end portion becomes separated from the liquid column to constitute a minute droplet ID which flies toward a member PP and is deposited on a determined position thereon. The bubble B on the heating element H1 gradually disappears by heat dissipation. The gradual annihilation of the bubble B causes a slow retraction of the meniscus IM while maintaining a stable surface thereof, so that it is possible to resolve the problems attendant to subsequent droplet emission resulting from excessive meniscus retraction caused by air introduction from the destructed meniscus. The position of the bubble formation should be selected suitably since the bubble B itself may also be emitted from the orifice OF to destroy the droplet ID if the position is excessively close to the orifice IF while a bubble generated on excessive distance from the orifice IF may be unable to cause the droplet emission. The aforementioned gradual contraction of the bubble B is caused by the heat dissipation of the heating element (since the trailing down time of a thermal signal is longer than the leading rise time thereof), bubble or liquid, condensation to liquid, capillary liquid supply or the combinations thereof.

The dimension of the droplet ID emitted from the orifice OF is dependent on the parameters of the apparatus such as the quantity of energy applied, width $\Delta l$ of the portion subjected to the energy application, internal diameter d of the liquid chamber W, distance l from the orifice OF to the heating element H1 etc., and the physical properties of the liquid IK such as specific heat, thermal conductivity, thermal expansion coefficient, viscosity, etc. Also the aforementioned heating element may be replaced by instantaneous irradiation with a laser pulse LZP which similarly causes rapid generation and gradual annihilation of the bubble B to emit a droplet. In such a case the element H1 in the portion $\Delta l$ may be utilized, if desirable, as a reflector or a heat accumulator for improving the heat generation by the laser pulse LZP. Furthermore the liquid IK is not necessarily limited to a recording liquid but also includes other liquids such as water, solution of chemicals or fertilizers etc.

Figure 2:
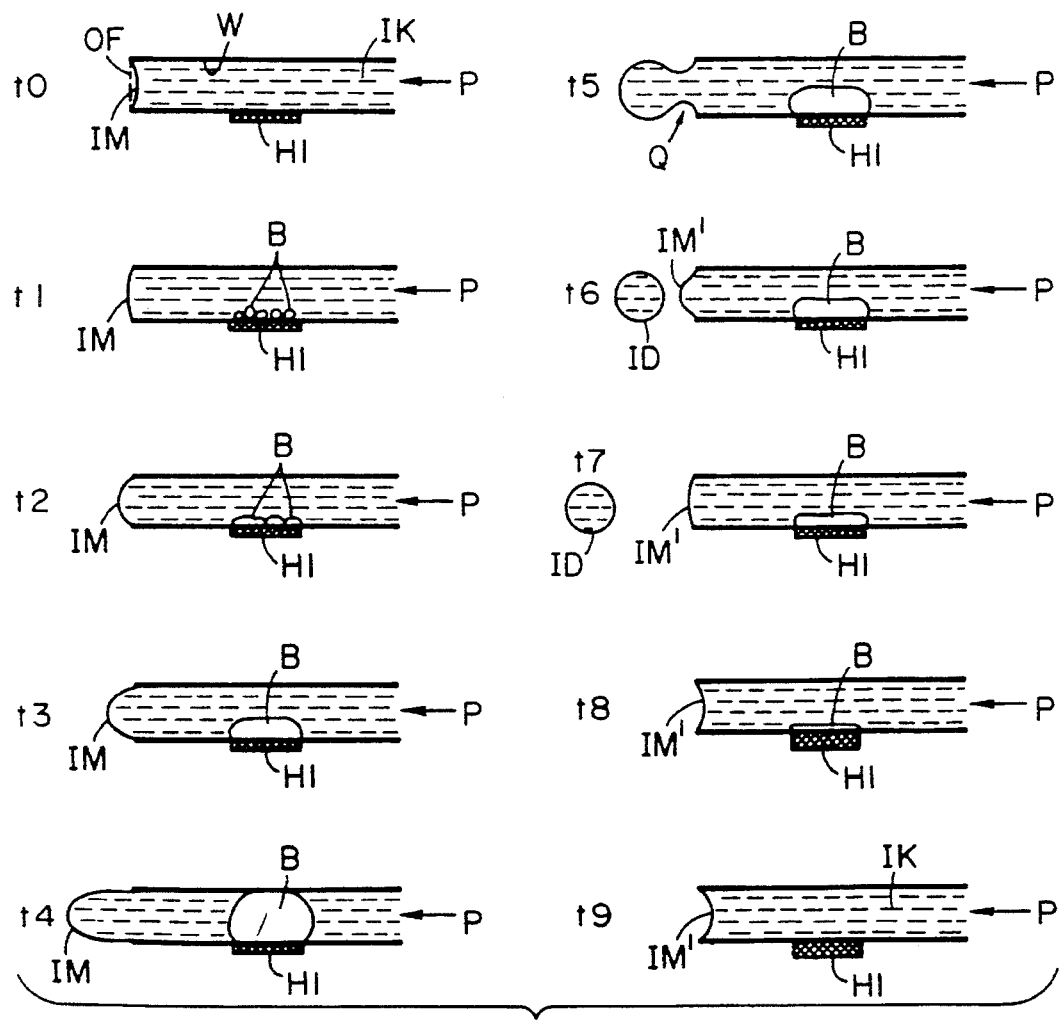
Figure 3:
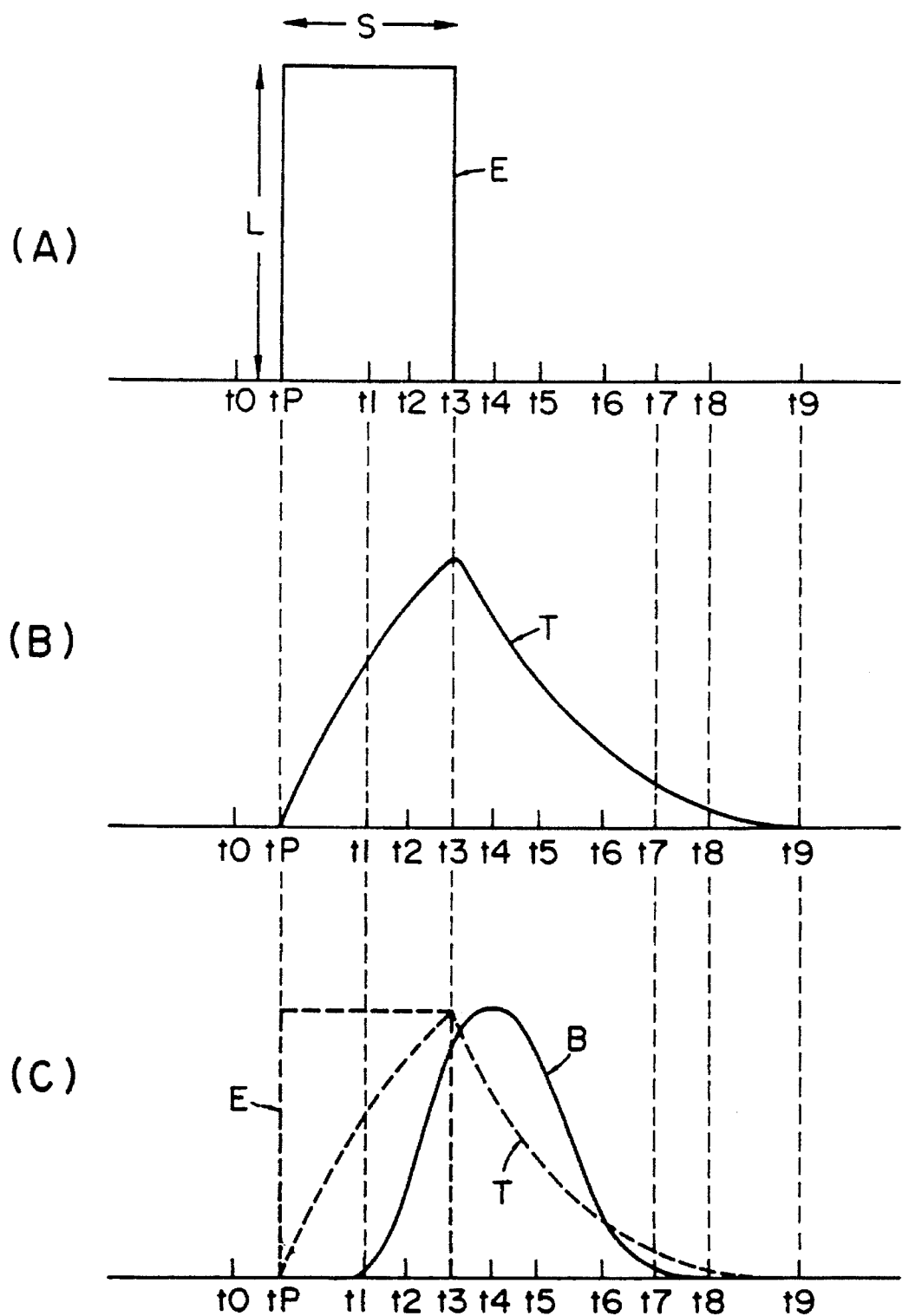

FIG. 2 schematically shows the procedure of liquid emission in the steps of t0 to t9, wherein there are shown the liquid chamber W, heating element H1 and orifice OF, and the liquid IK is supplied by capillary action from a direction P. FIG. 3A shows an example of the drive pulse, wherein times t0–t9 respectively correspond to those in FIG. 2. FIGS. 3B and 3C respectively show the temperature change of the heating element H1 and the volumic change of the bubble B. The time t0 represents the state prior to the droplet emission, and a drive pulse E is supplied to the heating element H1 at a time tp between t0 and t1. As illustrated, the heating element H1 initiates the temperature rise simultaneously with the application of the drive pulse E. At time t1 the heating element reaches a temperature exceeding the vaporizing point of the liquid IK whereby bubbles B appear and the meniscus IM becomes expanded from the orifice corresponding to the displacement of the liquid IK by bubbles B. At time t2 the bubbles B are further developed to form a more protruding meniscus IM. The meniscus IM becomes further expanded at time t3 when the drive pulse E is terminated as shown in FIG. 3A and the heating element H1 assumes a highest temperature as shown in FIG. 3B. At time t4, although the temperature of the heating element H1 is already descending as shown in FIG. 3B, the bubble B reaches a largest volume as shown in FIG. 3C so that the meniscus IM is even larger. At time t5 the bubble B starts to contract so that the liquid IK is retracted into the liquid chamber W from the protruding portion corresponding to the volumic contraction of the bubble B, whereby the meniscus IM develops a constricted portion Q. At time t6, the droplet ID is separated from the meniscus IM' due to further advanced contraction of the bubble B. At time t7 the liquid droplet ID is completely emitted, while the meniscus IM' further approaches the face of the orifice OF due to the continued contraction of the bubble B. At time t8 where the bubble B is close to annihilation, the meniscus IM is further retracted to a position inside the orifice OF. At time t9 the liquid IK is replenished to assume the original state t0.

As will be apparent from the foregoing, the form of the drive signal supplied to the heating element H1 is an important factor for achieving stable emission of the liquid IK. Also important for droplet separation is the contraction of the bubble which can however be easily controlled by the form of the drive signal. Furthermore it is possible to increase the droplet emitting frequency by the form of the drive signal.

Figure 4:
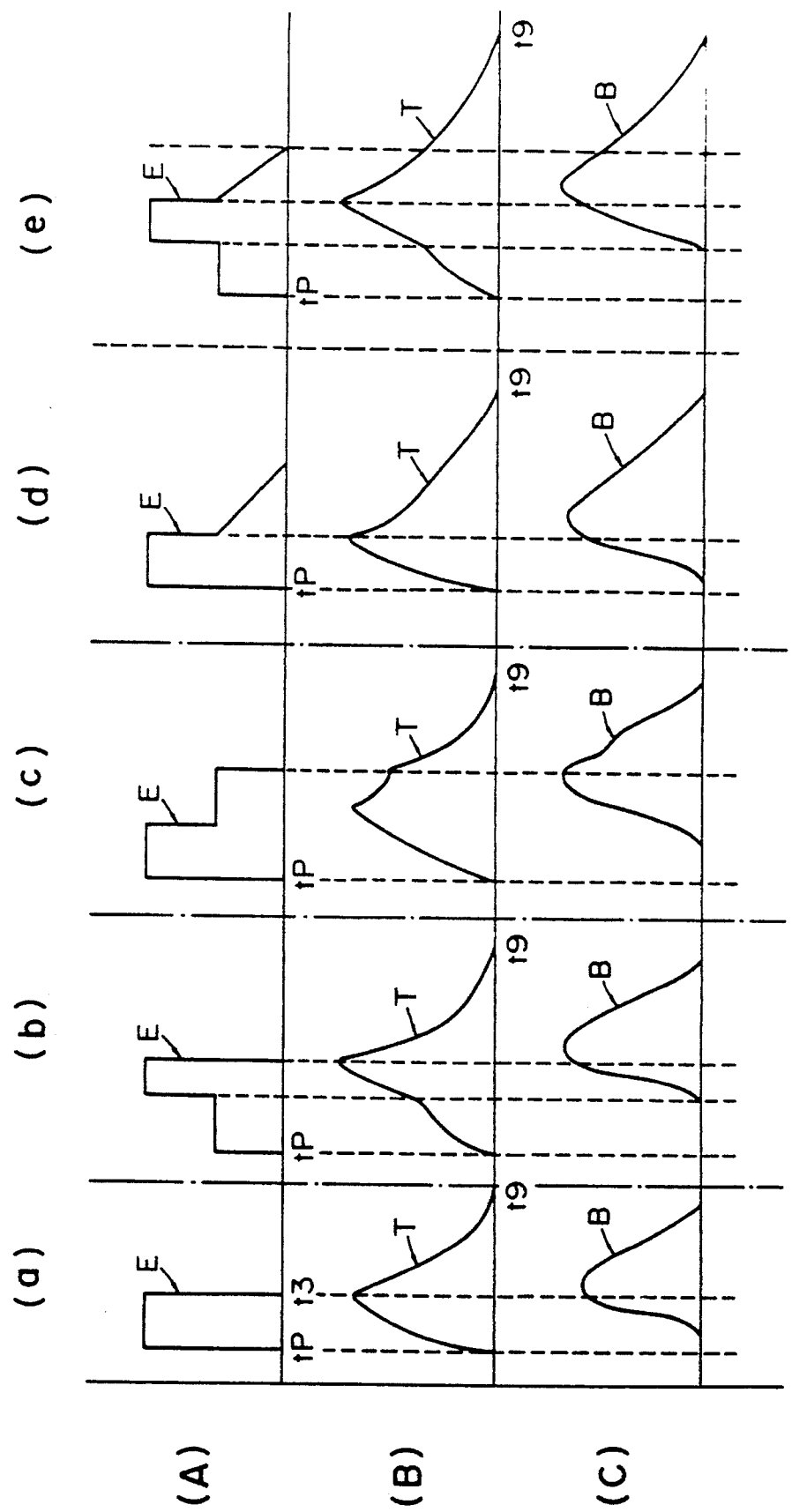
FIG. 4 is a waveform chart showing various drive signals.

FIG. 4 shows various examples of the drive signal and the corresponding temperature changes in the heating element H1 and the volumic changes of the bubble B.

These drive signal pulses are capable of satisfactory droplet emission. The waveform (a) is particularly advantageous in not requiring a special provision in the drive circuitry for the high resistor in the CR discharge circuit in case piezoelectric drive is not required. The waveform (b) performs a pre-heating before the start of the pulse thereby reducing the pulse width for droplet emission. The waveform achieves a rapid bubble development and is effective for improving the emission speed and the emission frequency. Also the pre-heating, conducted only at the droplet emission, prevents excessive heating of the liquid. The waveform (c) performs a post-heating subsequent to the drive pulse thereby achieving a further gradual retraction of the meniscus after the droplet is separated. The waveform is effective in avoiding the air introduction into the liquid chamber after the droplet emission, thus ensuring smooth emission for the subsequent droplets. Also in this case the post-heating is effected only at the recording so that the bubble is completely annihilated to ensure the subsequent droplet emission. The waveform (d) involves a gradual heat dissipation for realizing a smooth droplet separation and preventing excessive meniscus retraction thereafter, and is effective in achieving a gradual meniscus retraction without losing the droplet speed. Also the waveform (e) is an effective drive signal obtained from the combination of the waveforms (b) and (d).

In either case it is possible to realize very gradual heat dissipation of the heating element and bubble contraction merely by controlling the drive signal and without the use of an external high resistance. This prevents the trouble of lack of droplet emission upon receipt of the subsequent emission instruction pulse, which results from a rapid meniscus retraction induced by air introduction from the orifice. The preferred relation of the generation and contraction of the bubble with the drive signal is determined by the pulse width S and pulse height L. The waveform (a) is preferred in consideration of the function of the large-scale integrated circuits, and particularly preferred in the case where a laser pulse is used. Also in the case of a solid-state laser it is quite easy to control the intensity of the laser pulse and to obtain waveforms similar to those of (b) to (e), thus achieving control over the heat generation or the bubble behavior by the laser light. Consequently the term "heating element" to be used hereinafter shall include other heat generating means such as a laser beam or infrared beam.

Figure 5:
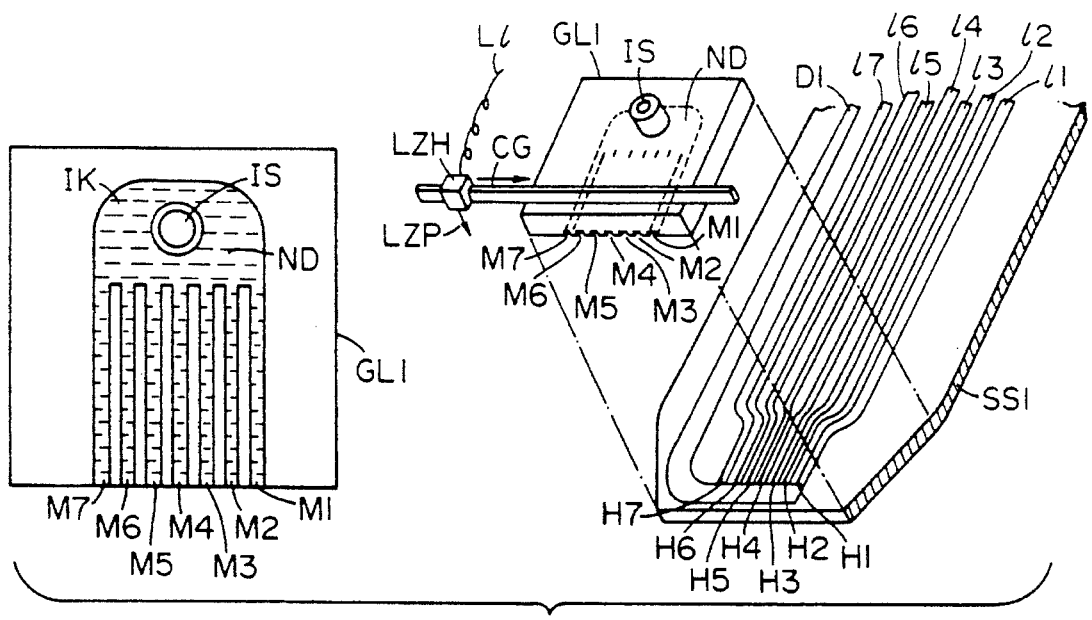
FIG. 5 is a view showing schematically the structure of the droplet emission head.
Figure 6A:
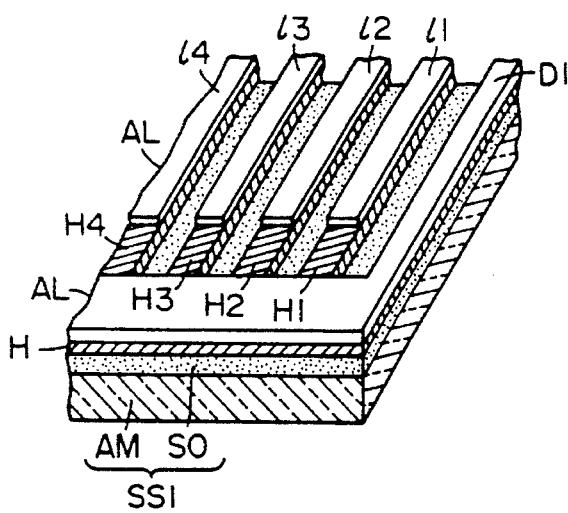
FIGS. 6A and 6B are a partial perspective view and a cross-sectional view of the head, respectively.
Figure 6B:
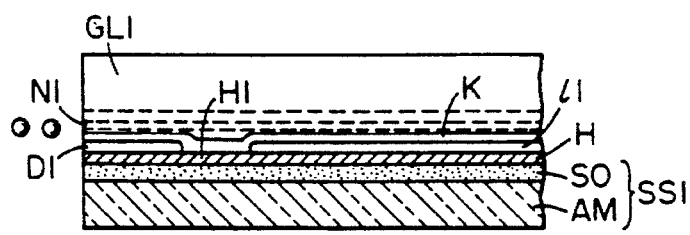

FIG. 5 shows an example of the head structure in a schematic exploded perspective view, in which a substrate SS1 is provided on the surface thereof with heating elements H1–H7, a common electrode D1 and selecting electrode l1–l7. Heating elements H1–H7 are of the same area and the same resistance and are positioned respectively corresponding to the liquid chambers. A plate GL1 is provided with a liquid supply inlet IS, small grooves M1–M7 constituting the liquid chambers and a common groove MD for supplying the liquid to the liquid chambers. Grooved plate GL1 is further provided, if necessary, with an orifice plate (not shown) at the droplet emitting side. Grooved plate GL1 is composed of a glass plate which is subjected to an etching process for forming common groove MD and plural grooves M1–M7, which are subsequently combined with the substrate SS1 to constitute a plurality of liquid chambers. Consequently grooves M1–M7 are so adhered as to respectively correspond to the heating elements. The heating elements H1–H7 selectively effect heat generation of an energy level corresponding to the input signal level. It is also possible to use substrate SS1 as a simple liquid support, instead of mounting the heating elements thereon, in which case a solid-state laser, for example, a semiconductor laser head LZH slidably mounted on a carriage guide CG1 is intermittently or continuously displaced to selectively irradiate those grooves with laser pulses LZP of a determined length through the plate GL1. Otherwise plural laser heads LZH may be fixedly provided in plate of the heating elements. FIGS. 6A and 6B show, in a partial view, the details of the substrate SS1 having the heating elements H1–H7 thereon. A substrate AM for example composed of aluminum is provided thereon with a heat accumulating layer SO (several micrometers), a heat-generating resistance layer H composed of $ZrB_2$ (800 Å) and an aluminum electrode layer AL (5000 Å) which are selectively etched to form heating elements H1, H2, H3 etc. each of 60 µm in width and 75 µm in length, the common electrode D1 and selecting electrodes 11, 12, 13 etc As shown in FIG. 6B the heating elements and the electrode layer AL are over-laid by a $SiO_2$ protective layer K (1 µm).

Figure 7:
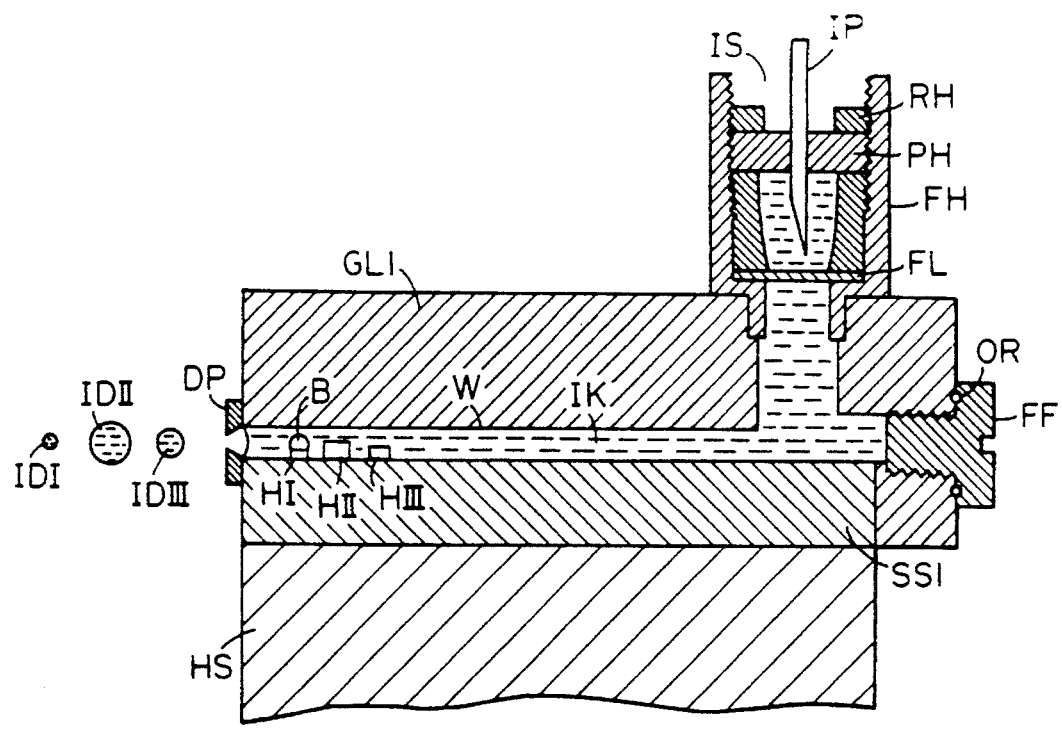
FIG. 7 is a cross-sectional view of another embodiment of the invention.

FIG. 7 shows, in a cross-sectional view, another embodiment of the droplet emitting head basically similar to the foregoing and provided with plural heating elements HI, HII, HIII, etc. for controlling the tonal rendition. As illustrated therein the substrate SS1 provided with heating elements HI, HII and HIII is placed on a metal heat sink HS and is covered with the grooved plate GL1 as explained in the foregoing to constitute a liquid chamber S at the junction therebetween. Grooved plate GL1 is provided with a liquid supply inlet IS and a stopper FF with an O-ring OR for bubble removal at the liquid filling and for nozzle cleaning. Supply inlet IS is provided with a filter FL for removing minute dusts, a filter holder block FH for supporting the filter, a pipe holding rubber piece for supporting a pipe IP for external ink supply, and a rubber piece holder RH for supporting the rubber piece. At the front end of the liquid chamber W there is provided an orifice plate OP for obtaining a droplet of a desired shape, the orifice plate being however dispensed with in case the liquid chamber W itself is structured to constitute the orifice as shown in FIGS. 5 and 6.

As exaggeratedly illustrated in FIG. 7, the liquid chamber W is provided, along the longitudinal direction thereof, with plural heating elements HI, HII and HIII which are selectively energized to cause a state change in the adjacent liquid, involving the generation and annihilation of bubbles as explained in the foregoing, which are schematically illustrated as a single bubble B. The volume change induced by the generation of bubble B in the liquid chamber causes the emission, from the orifice plate OP, of a droplet IDI, IDII or IDIII different in dimension due to a tonal rendition explained in the following. Namely if the heating elements HI, HII and HIII are formed with different thickness or length to have different resistances, it is rendered possible to generate a bubble corresponding to the applied energy and to vary the volume of the droplet according to the energy, thus obtaining droplets of different sizes. Also a similar effect can be obtained by selecting plural heating elements simultaneously or in succession.

Figure 8:
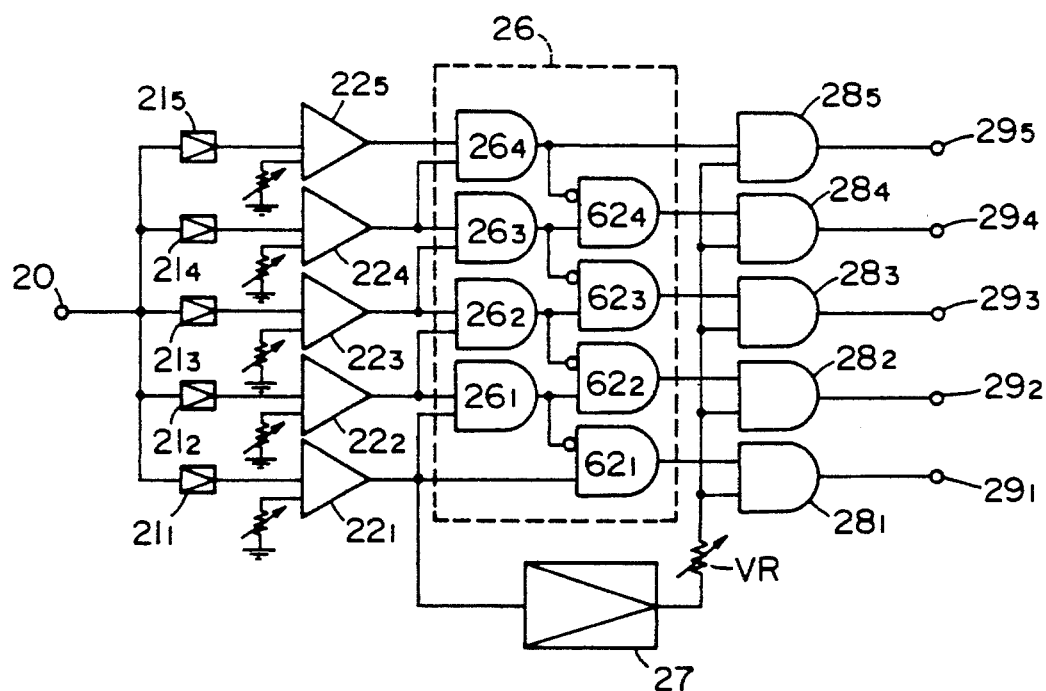
FIG. 8 is a schematic circuit diagram showing an example of the drive circuit.

FIG. 8 is a block diagram showing control circuitry for selectively driving five heating elements as shown in FIG. 7. Input analog signals supplied from an input terminal 20 are introduced, through buffer circuits $21_1$ to $21_5$, to comparators $22_1$–$21_5$. The comparator $22_1$ is designed to release an output signal in response to a lowest input signal level, and other comparators $22_2$–$22_5$ are designed to respond to successively high input signal levels.

The output signals from comparators $22_1$–$22_5$ are respectively supplied to AND gates $26_1$–$26_4$ of a gate circuit 26, whereby only one gate corresponding to the input signal level is enabled. A drive circuit 27 is activated by the output signal from the comparator $22_1$ to an output signal of a determined pulse width and pulse amplitude to AND gates $28_1$–$28_5$, of which only one is opened by the output signal selected in the gate circuit 26 to transmit the output signal from the drive circuit 27 to one of the output terminals $29_1$–$29_5$. Assuming that the terminal $29_1$ is connected to a heating element of the highest resistance while the terminal $29_5$ is connected to a heating element of the lowest resistance, the former or the latter is energized respectively corresponding to a low-level input or a high-level input. In case the input signals are level-indicating digital signals, those comparators can be dispensed with and the input signals directly select the gate circuits and selectively drive the corresponding heating elements. Also different resistances of the heating elements may be achieved by using different materials instead of using different dimensions.

Figure 9:
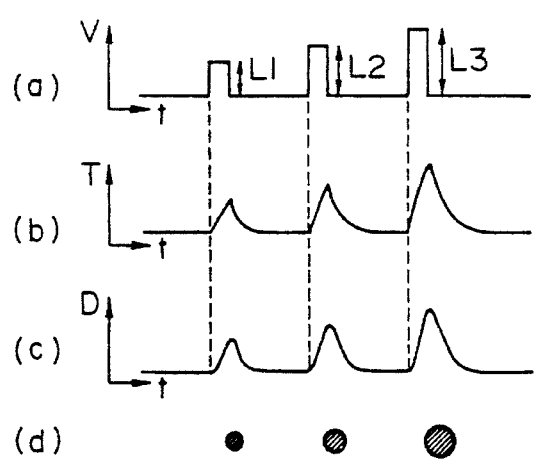
FIGS. 9 and 10 are waveform charts showing the drive signals.
Figure 10:
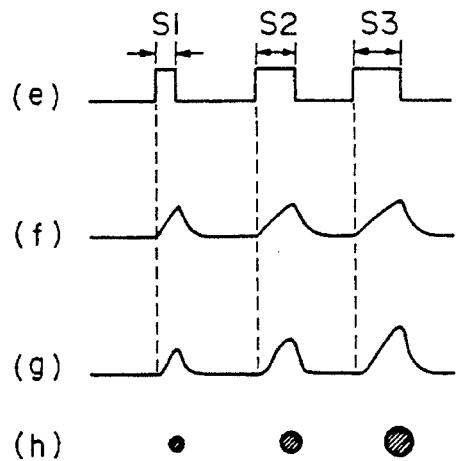

In contrast to the foregoing embodiment in which the diameter of the emitted droplet is modified by controlling the heating energy through the selection of plural heating elements of different resistances, there will be explained another embodiment in which tonal rendition control is achieved by applying drive pulses of different waveforms to the heating element of a fixed resistance. It is found possible to increase the droplet diameter by applying, to the same heating element, drive signals of a given pulse width but of increasing amplitudes or by signals giving a constant peak temperature of the heating element but with increasing pulse widths. Such control method will be explained in relation to FIGS. 9 and 10. FIG. 9 shows a case in which the amplitude L is varied, wherein the plots (a), (b), (c) and (d) respectively show the pulse waveform applied to the heating element, surface temperature thereof, volume of the bubble generated in the liquid and the droplet diameter. Thus, with the increase in the pulse amplitude L, the surface temperature increases generating a larger bubble and finally providing a larger droplet. FIG. 10 shows a case of changing the pulse width S, in which the plots (e), (f), (g) and (h) respectively show the pulse waveform, surface temperature of the heating element, volume of the bubble and diameter of the emitted droplet. Thus in case the pulse width S is changed and the pulse amplitude is so regulated to give the same maximum surface temperature, a larger pulse width results in a larger bubble volume and in a correspondingly larger droplet diameter. Naturally it is also possible to achieve high-speed emission of uniform droplets by suitably regulating the pulse width S and the pulse amplitude L. Furthermore, in the application in a recording or copying apparatus, the aforementioned tonal control can be made automatically in response to the density of original documents. For example it is possible to supply a signal related to the original reading sensor to the input terminal 20 shown in FIG. 8, or to supply a signal from a variable resistor manually regulated through a density control dial to input terminal 20. Furthermore it is possible to control the density in an arbitrary manner by directly regulating variable resistor VR. Also the tonal control is similarly achievable by the use of laser pulses in the aforementioned manner.

The above-explained bubble control by the heat generating means or heat controlling means easily allows to constantly produce an optimum image, properly covering the eventual time-dependent change in the recording liquid or change in the circumferential conditions of the apparatus such as temperature or humidity.

In the application of the present embodiment to a multi-color ink jet recording, there is required a suitable bubble control for each color, corresponding to the various dyes used for different colors. In such a case the aforementioned bubble control methods allow to obtain uniform droplets for each color.

Such bubble control is also applicable for obtaining an intentionally regulated color balance, such as a reddish or bluish hue, or achieving a density control.

Figure 11:
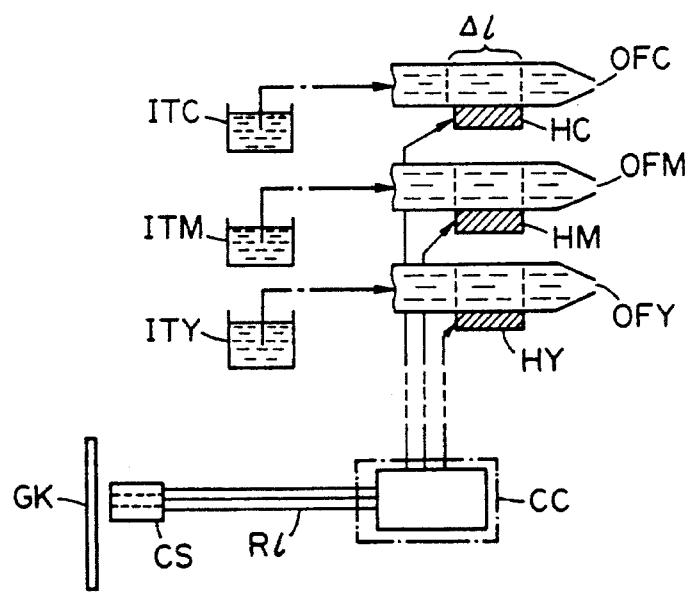
FIG. 11 is a schematic view of color recording.

FIG. 11 schematically shows a multi-color ink jet apparatus in accordance with the present invention. In the following there will be explained a case of using liquids of three colors C, M and Y, but the present invention is not limited to such a case but includes the use of any number of colors equal to or larger than a factor of two.

The apparatus shown in FIG. 11 is provided, corresponding to each color liquid C, N or Y, with an ink supply tank ITC, ITM or ITY, a heating section Al, bubble generating means HC, HM or HY and an emitting orifice OFC, OFM or OFY. It is possible to increase the number of the heating sections, bubble generating means and emitting orifices or to provide plural bubble generating means along each liquid path as explained in the foregoing, but each liquid path from the supply tank to the emitting orifice is designed to accomodate the liquid of only one color. However it is furthermore possible to mix plural liquids in the liquid path if desirable.

Heating section Al is used for causing the bubble generation in the colored liquid by the supply of thermal energy as explained in the foregoing.

As bubble generating means HS, HM or HY there can be employed, for example an electrothermal transducer such as a heating element as employed in a thermal head, a Peltier element or a combination thereof, or a high energy irradiation such as the aforementioned laser beam.

The bubble generating means is provided on the internal or external wall of the heating section, or, in the case of the use of high-energy irradiation such as a laser beam, in a suitable position allowing the supply of thermal energy to the liquid accomodated in the heating section.

The bubble generating means are selectively activated by a control circuit CC in response to the multi-color input information, which, in case the apparatus of present invention is utilized for recording in a copying or facsimile apparatus, is received from an original GK through a photoreceptor means CS composed for example of lenses, filters, photosensors etc. On the other hand, in the case of using this apparatus as an output terminal for a computer, photoreceptor means CS can be dispensed with as the multi-color information is obtained directly from the computer.

Control circuit CC contains the means for selectively driving the bubble generating means in response to multi-color information, such as in the case of driving electrothermal transducers with pulse signals, clock generators, shift registers, memories, drive circuits, synchronizing means for controlling the relative displacement between the recording member and the recording head, etc.

The heat generation of the bubble generating means can be easily controlled, as explained in the foregoing, by the pulse width and amplitude of the drive signal.

The recording liquids are selected in relation to the above-explained control circuit and according to the species of the desired recording, for example a "false color" graphic recording, a "true color" recording, a special black-red two-color recording for documentation or proof editing.

For example in the graphic recording generally for recording output signals from a computer in the form of multi-color information, there may be employed liquids of arbitrary colors.

Also in a "true color" recording, the original information is received by three photoreceptors respectively through red, green and blue filters to obtain color separated signals, which drive the electrothermal transducers in the heating sections through the control circuit, and there are employed liquids of cyan, magenta and yellow complementary to the filter colors.

A particularly preferable result is obtained in case the above-explained apparatus is realized in a structure composed of a substrate with heating elements, a grooved plate and a liquid supply block to be explained in the following.

Figure 12A:
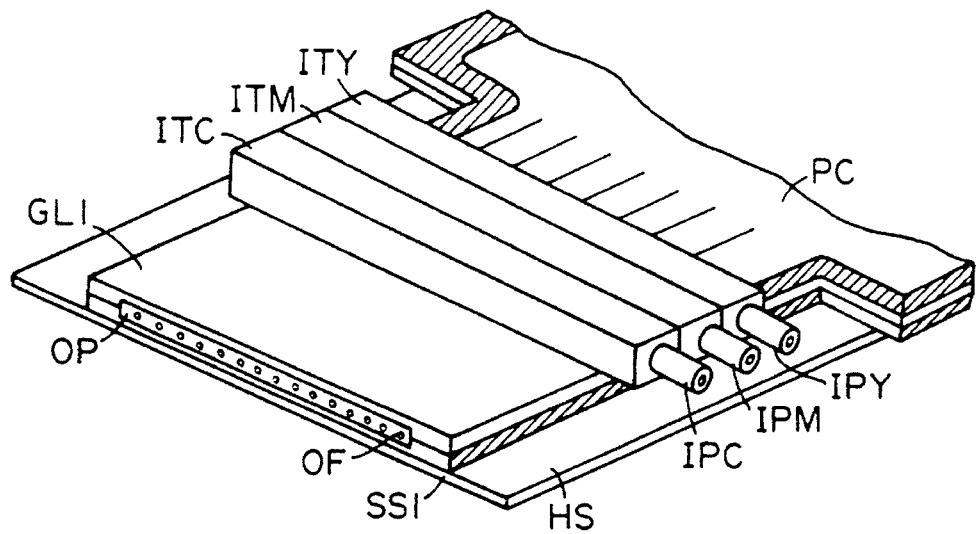
FIGS. 12A, 12B and 12C are views showing the examples of the head structure.

FIG. 12A shows, in a perspective view, an embodiment composed of a substrate SS1 having heating elements, a grooved plate GL1 having liquid supply grooves, ink tanks ITC, ITM and ITY and ink pipes IPC, IPM and IPY for supplying liquids C, M and Y for multi-color recording, a printed circuit board PC for image signal supply etc. Also there may be added a thermally conductive substrate HS as a heat sink and an orifice plate OP for constituting desired emitting orifices OF.

Figure 12B:
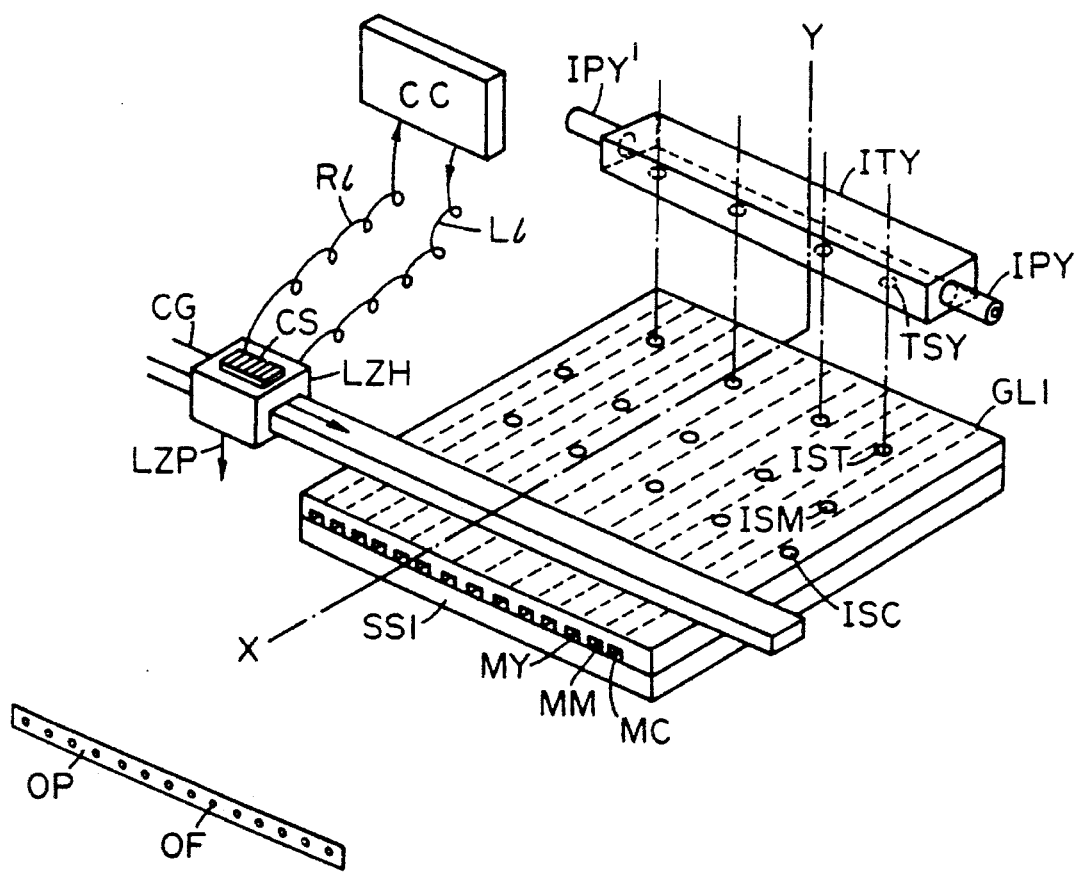
Figure 12C:
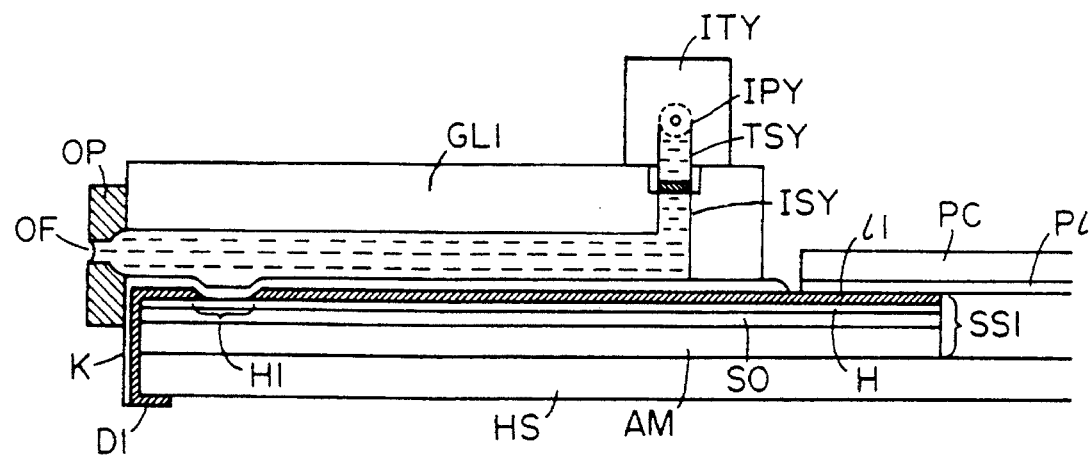

FIG. 12B shows the relation between the grooved plate and the ink tanks, while FIG. 12C shows a cross-section along a line X–Y in FIG. 12B. As shown in FIG. 12C the substrate SS1 is composed of an aluminum substrate AM and a heat accumulating layer SO, on which provided are electro-thermal transducers composed of a heat-generating resistor H1 made of $ZrB_2$ or $HfB_2$, aluminum selecting electrode P1 and a common electrode D1. Also as explained in the foregoing, a protecting layer K of silicon oxide covers the upper face of the electrodes and the lateral face of the orifices. Also as shown in FIG. 12B, the grooved plate GL1 is made of a glass or plastic plate and is provided with liquid guide grooves MC, MM and MY formed by a diamond microcutter, and liquid supply apertures ISC, ISM and ISY. Those supply apertures are perforated for example by electron beam for every three grooves for example in the case of using three liquids. On the other hand the ink tanks ITC, ITM and ITY are respectively provided with apertures TSC, TSM and TSY respectively corresponding to the aforementioned apertures ISC, ISM and ISY. FIG. 12B shows only one ink tank ITY but other tanks for other colors C and M are also mounted similarly on the grooved plate GL1. The substrate, grooved plate and ink tanks prepared in this manner are adhered integrally so that the heating elements respectively correspond to the grooves. IPY' indicates a deaerating pipe for facilitating the liquid filling into the apparatus.

In FIG. 12C P1 indicates an electrode formed on the board for driving the heating element. The common electrode D1 is extended to the lateral and lower faces of the substrate SS1 to facilitate electric connection.

The above-explained structure permits obtaining of a multi-orifice array in which the emitting orifices for multiple liquids are arranged with a high density. In a multi-colored image composed of multiple dots, it is generally accepted that the deterioration in the tonal reproduction or the color aberration becomes evident in case the dot are positionally aberrated by 150–170 micro-meters. However the present invention is capable of providing extremely desirable results in terms of resolution and tonal rendition as the orifices can be arranged at least with a density of 10 lines/mm, well within the above-mentioned limit. The multiorifice array is further advantageous in its very thin compact structure.

The density of the orifices and the density of the photoreceptor means are selected to achieve a mutual correspondence for each pixel. Thus in the case of a true-color recording with three colored liquids and with an orifice density of 12 lines/mm, there can be employed a photoreceptor density of ca. 4 lines/mm.

In the application of such a multi-orifice array in a recording apparatus such as a copier or a facsimile, the use of a line-shaped photoreceptor element for the photoreceptor means CS is advantageous in achieving a high-speed recording with a high resolving power by a single scanning. Such combination is particularly desirable as the control circuit does not require particular delay circuits or memories for determining the drive timings, and as the orifice array is easy to prepare.

Also the information reading and recording can be carried out simultaneously if photoreceptor means CS is integrally mounted on the semiconductor laser head LZH sliding over the carriage CG as shown in FIG. 12B, and in this manner it is rendered possible to economize the circuitry and to simplify the structure, allowing to provide a miniturized recording apparatus.

Also instead of displacement on the carriage CG, there may be employed a plurality of fixed laser heads LZH and photoreceptor means CS, in which case it is rendered possible to obtain a further increased processing speed.

As an example, the apparatus shown in FIG. 12 was prepared in the following manner. An $Al_2O_3$ substrate SS1 of a thickness of 0.6 mm was puttered with $SiO_2$ to form a heat accumulating layer SO of a thickness of 3 micrometers. Subsequently there were formed a $ZrB_2$ resistance layer H of a thickness of 800 Å and an aluminum layer of 5000 Å for the electrodes, and selective etching process was conducted to prepare 1200 pieces of the heating element H1 arranged at a pitch of 111 micrometers and having a resistance of 200Ω in a dimension of 50 micrometers in width and 300 micrometers in length. Subsequently $SiO_2$ was sputtered in a thickness of 1 micrometer to form an insulating protective layer K, thereby completing the electrothermal transducers.

Substrate SS1 was adhered to a grooved glass plate GL1 having grooves formed by a microcutter at a pitch of 111 micrometers (corresponding to an orifice density of 9 lines/mm) and each having a dimension of 60 micrometers in width and in depth and also glass ink tanks ITC, ITM and ITY in the foregoing manner, and further adhered on the opposite face to an aluminum head sink HS.

Ink tanks ITC, ITM and ITY were respectively filled with cyan, magenta and yellow inks. In this manner a recording head having 1200 orifices, or 400 orifices for each color, arranged at a density of 9 lines/mm is obtained.

The recording head was combined with photo-receptor means and a control circuit, and, under the liquid supply with such a liquid pressure not causing emission from the orifices in the absence of heat generation by the heating elements, the recording operation was performed by supplying predetermined pulses to the heating elements according to image signals. A color image having a high resolution and a rich tonal rendition could be obtained with a very high recording speed, but the color balance was not enough in that the black color obtained by the super-posed cyan, magenta and yellow inks was excessively yellowish and the density of the entire image was somewhat low.

Figure 13:
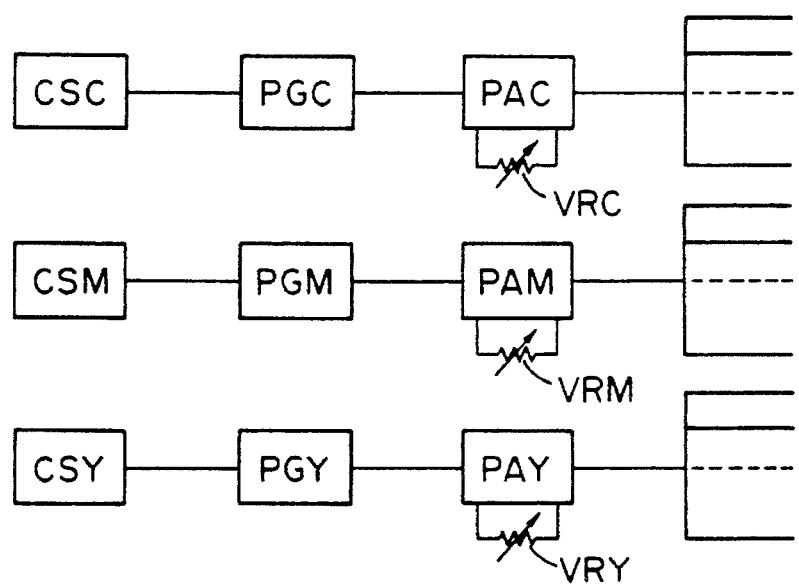
FIG. 13 is a block diagram showing an example of the drive circuit.

However it was possible to well balanced black color and to increase the image density by regulating the variable resistors VRC, VRM and VRY shown in FIG. 13 in such a manner that the pulse width for cyan and magenta colors is 15 μsec while that for yellow color is equal to 10 μsec.

Following Table 1 summarizes the recording conditions employed in the foregoing example.

TABLE 1

| | |
|---|---|
| Drive voltage: | 35 V |
| Repeating frequency: | 5 kHz |
| Recording material: | bond paper (brand name "Seven Star") A size 28.5 kg produced by Hokuetsu Paper Mills, Ltd.) |
| Liquids: | |
| Yellow (Y) | 2.0 gr. Yellow RY (Orient Chemical) 80.0 gr. ethanol 18.0 gr. diethylene glycol |
| Magenta (M) | 3.0 gr. Red BT 80.0 gr. ethanol 17.0 gr. diethylene glycol |
| Cyan (C) | 2.0 gr. Blue RL 80.0 gr. ethanol 18.0 gr. diethylene glycol |

FIG. 13 shows a block diagram composed of circuits CSC, CSM and CSY containing sensors and analog-digital converters for respective colors, pulse generators PGC, PGM and PGY for generating drive pulses in response to the output signals from circuits CSC, CSM and CSY, amplifiers PAC, PAM and PAY for said pulse signals, and variable resistors VRC, V4 and VRY for regulating the width and amplitude of the pulse signals. As explained in the foregoing variable resistors VRC, VR and VRY enable to obtain optimum drive pulses and therefore the bubbles for three inks containing different dyes as summarized in Table 1, and thus to satisfy various requirements mentioned above. Naturally variable resistors VRC, V and VRY need not necessarily be regulated manually but can be automatically controlled by the facsimile signals or by the signals related to the output signals from the reading sensor element.

Also the regulation of the variable resistors may be replaced by a suitable output control of the semiconductor laser output to obtain a similar result.

Figure 14:
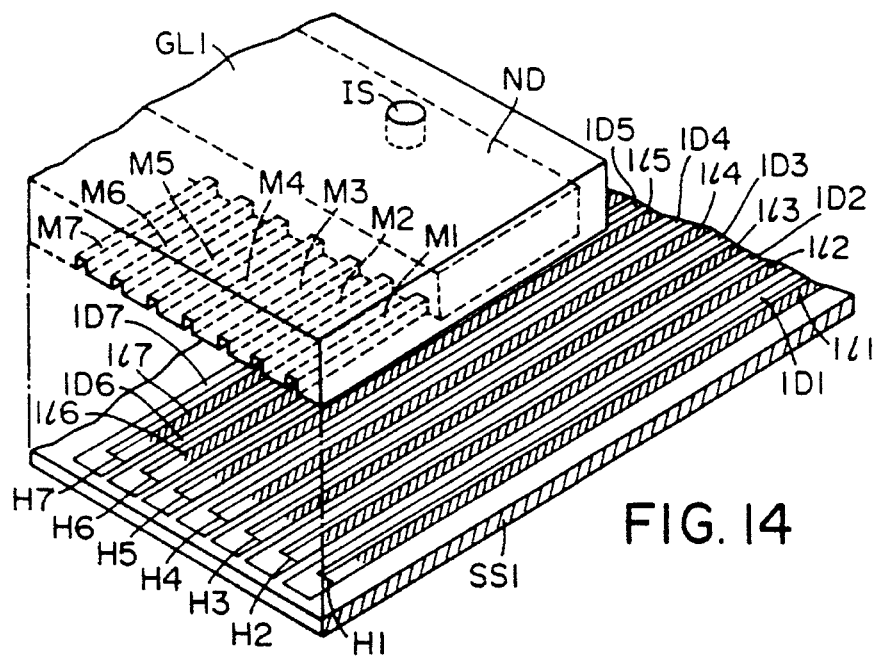
FIG. 14 is a perspective view showing another example of the head structure.

FIG. 14 schematically shows another embodiment of the recording head, in which a substrate SS1 is provided on the surface thereof with heating element H1–H7 and selecting electrodes 1l1–1l7, wherein heating elements are of the same area and the same resistance and are positioned respectively corresponding to the liquid chambers. Substrate SS1 is combined with a plate GL1 having grooves M1–M7 to constitute plural liquid chambers at the interface therebetween. Plate GL1 is provided with an ink supply chamber ND for ink supply and an ink inlet aperture IS for introducing the ink from an unrepresented ink tank.

The present embodiment is different from that shown in FIG. 5 in the arrangement of the common electrode. The common electrode D1 in FIG. 5 has to pass a considerably large current and may therefore be destructed in case the heating elements H1–H7 are simultaneously activated. Such difficulty is however prevented in the structure of FIG. 14 in which the common electrode is divided into seven lines 1D1–1D7.

Figure 15:
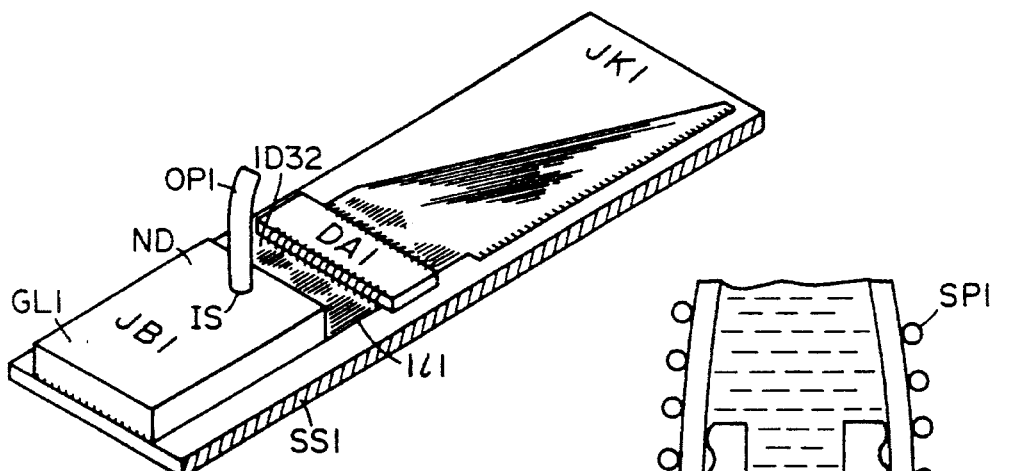
FIG. 15 is a perspective view of the emission head of a cassette structure.

FIG. 15 shows another embodiment in which an ink jet block JB1 containing a larger number (for example 32) heating elements and orifices than in the structure shown in FIG. 14 is structured as a cassette. DA1 is a diode array while OP1 is an ink supply pipe detachably connected to the plate GL1, ink jet block cassette JK1 being rendered detachable from the apparatus by disconnecting the ink supply pipe.

Figure 16:
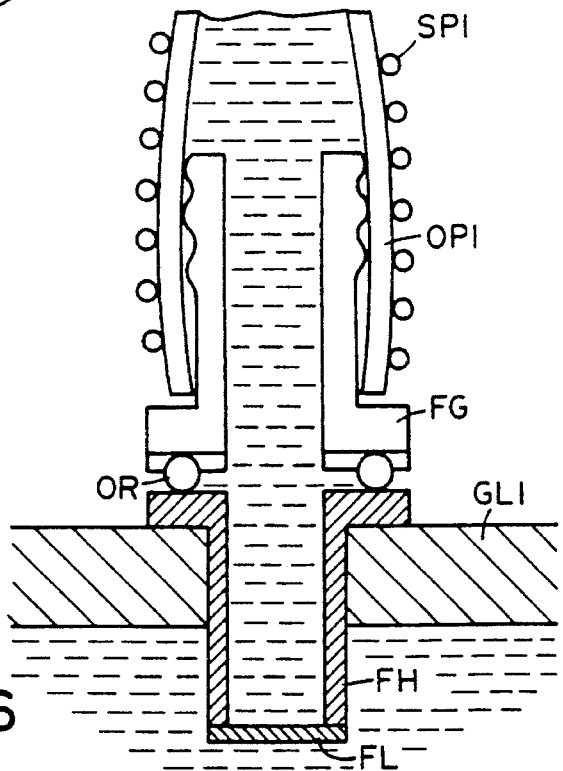
FIG. 16 is a cross-sectional view of the ink supply section.

FIG. 16 shows, in a cross-sectional view, an example of the connecting structure between the ink supply pipe OP1 and the ink supply inlet IS. In the inlet aperture IS provided in the plate GL1 there is inserted a packing FH for receiving an O-ring OR, which is in turn supported by a flange FG. Flange FG is inserted into the ink supply pipe OP1 which is externally provided with a spring SP1 for maintaining the packing FH and the flange FG in pressure contact to prevent the ink leak. The above-explained structure merely shows an example of the easily detachable connecting method of the ink supply pipe OP1 employable in the cassette structure according to the present invention and should not be understood as limiting the connecting method for pipe OP1 associated with such cassette structure, but it is desirable to achieve the connection by means of pressure contact means as illustrated. FL indicates a filter explained in the foregoing.

The above-mentioned block cassette structure of the ink jet nozzle array can be amplified to a multiple cassette structure to achieve various advantages. Particularly such structure is advantageous in that a small commercial vacuum sputtering apparatus can be employed for forming the heating elements, lead electrodes, protecting layer and insulating layer on the small substrate SS1 for such cassette structure, and in that small masks and small mask aligner can be used in the preparation of the heating elements and lead electrode patterns. Also the mounting and detaching operations can be facilitated by the use of a flexible pipe OP1.

Figure 19:
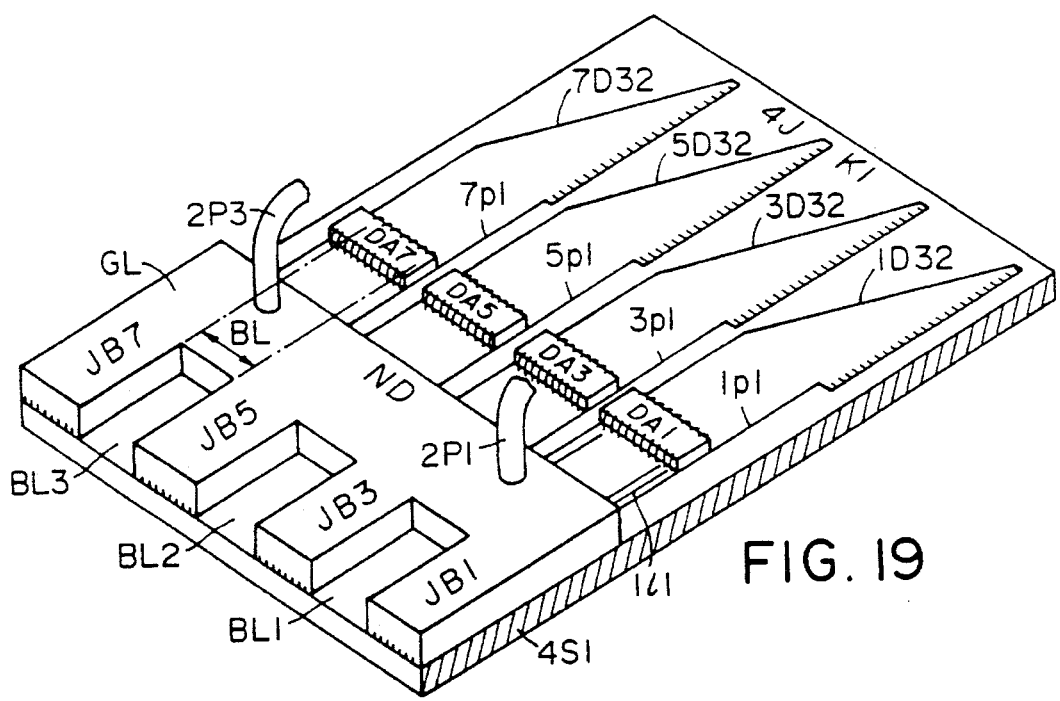
FIG. 19 is a perspective view showing another example of the cassette structure.

The ink jet block cassette of the present invention is not limited to the structure shown in FIG. 15 but may assume a form as shown in FIG. 19 or any other suitable form. In short, the cassette structure is advantageous in an improved productivity resulting from the use of a smaller substrate, in easier repair by replacement of defective cassette block and in an improved production yield resulting from the reduced troubles in making connection with the diode array. Eventual fluctuations between the blocks can be compensated by the adjustment of the pulse width or amplitude to obtain uniform recording as explained in the foregoing.

Figure 17:
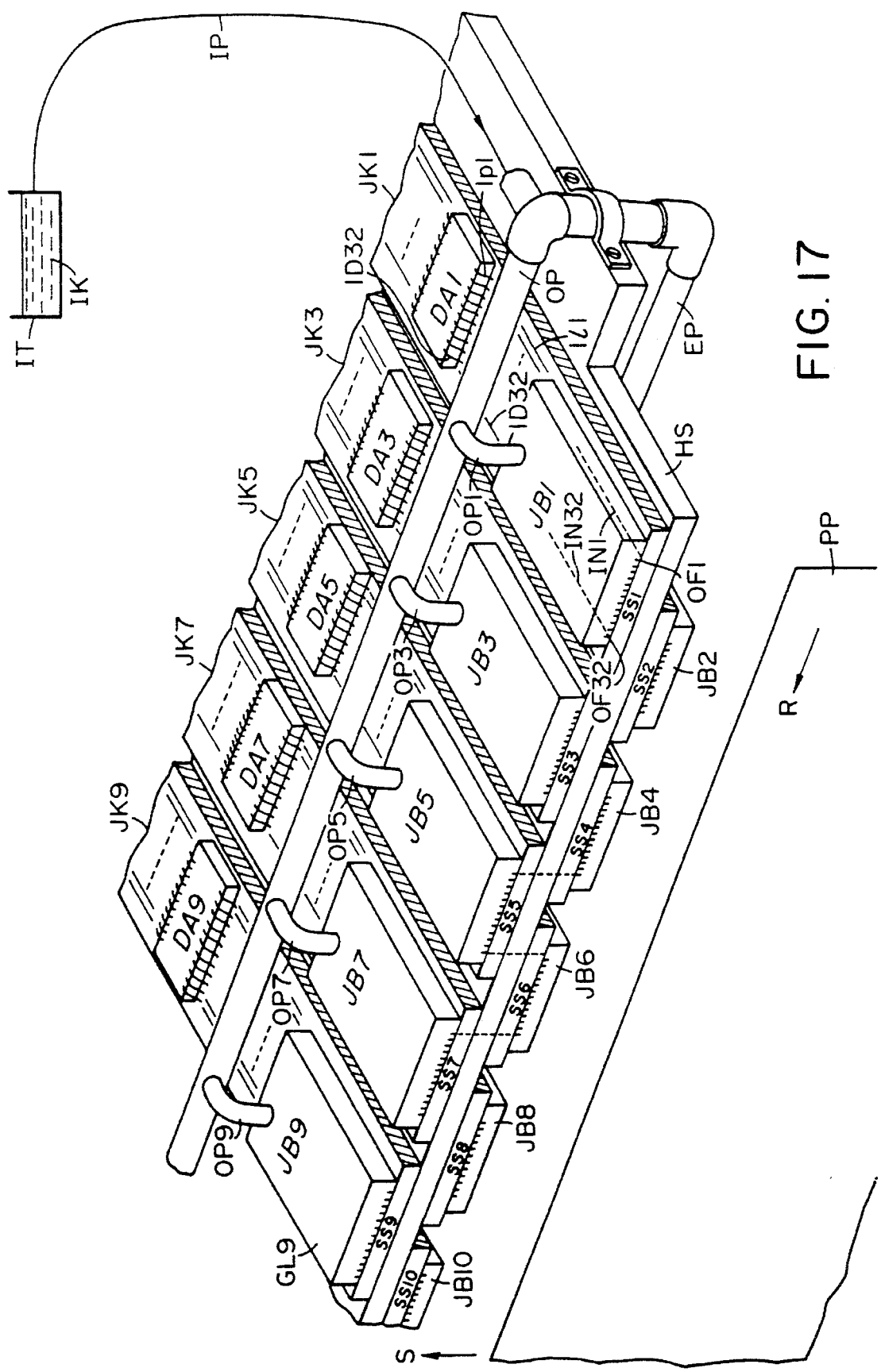
FIG. 17 is a perspective view of an example of the full multiple head.

FIG. 17 shows a full multiple recording head structure in which plural ink jet head blocks are provided in a staggered arrangement on and under a common substrate. In FIG. 17 a metal substrate HS functioning as the heat sink is provided on the upper surface thereof with the blocks of odd numbers JB1, JB3, . . . , JBn and on the lower surface thereof with the blocks of even numbers JB2, JB4, . . . , JBn. Each block receives ink supply from an ink tank IT through an ink pipe IP common supply pipes OP, EP and individual supply pipes OP1–OPn. Individual supply pipes OP1–OPn are structured detachable as shown in FIG. 16 and rendered flexible to facilitate the block replacement.

Figure 18:
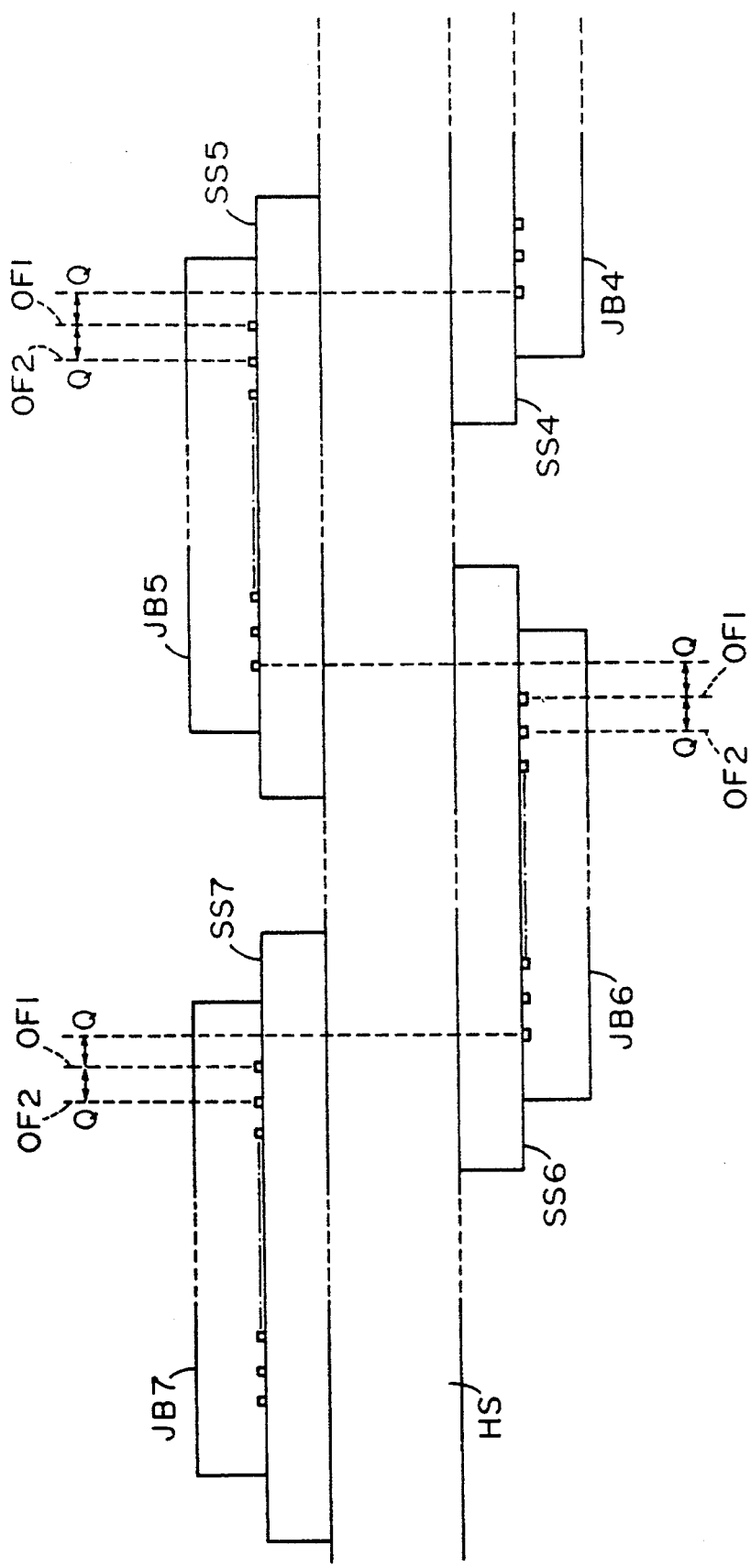
FIG. 18 is an enlarged front view of a part of the head.

DA1–DAn are diode arrays similar to that already explained and connected to the electrodes 1l1–1D32 provided on the substrates SS1–SSn having the heating elements thereon. Such staggered arrangement allows to achieve a same distance Q between the orifices OF1 and OF2 above and under the substrate as illustrated in FIG. 18, thereby ensuring a same orifice distance Q throughout the entire recording head. It is to be noted also that heat sink HS is composed of a single metal plate throughout the entire head for efficient heat dissipation and easier assembly.

FIG. 19 shows another embodiment of the cassette structure shown in FIG. 15 and is provided with a cassette 4JK1 in which four ink jet blocks of FIG. 15 are integrated. A substrate 4S1 is provided with electrodes 1l1–7D32 divided into four blocks with respective diode arrays DA1–DA4. An ink chamber ND common to the four blocks is formed in a plate GL1. Such structure is favorable in facilitating mass production, reducing the errors in assembly and in that a wasted blank space BL between neighboring head blocks can be effectively utilized for accommodating the diode arrays. Also the larger common ink chamber ND allows to reduce the volume of said main ink tank, to which said ink chamber is connected for example by two ink supply pipes 2P1 and 2P3.

Figure 20:
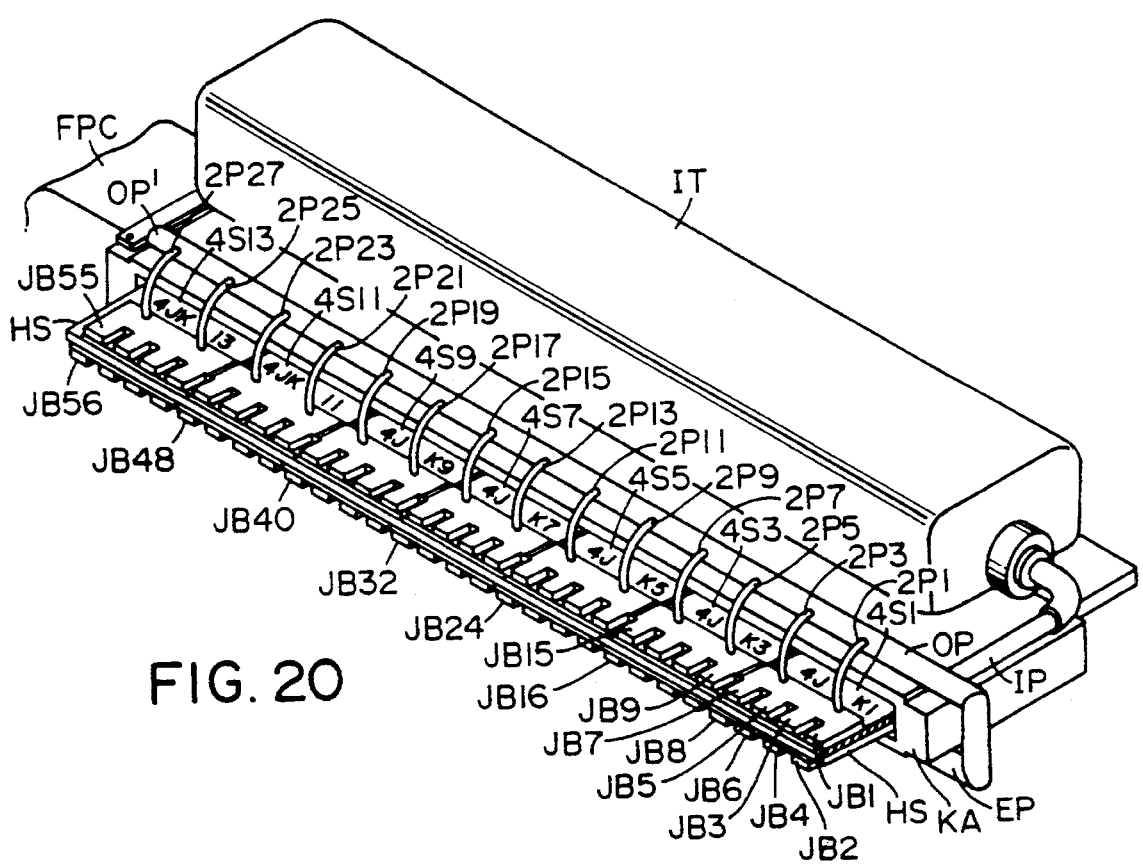
FIG. 20 is a perspective view showing a full multiple head obtained therefrom.

FIG. 20 shows, in a perspective view, a recording head assembled from the ink jet block cassettes shown in FIG. 19 according to the assembling principle of FIG. 18.

The illustrated example has a total length corresponding to the shorter side of a recording sheet of the JIS A4 size, with an orifice density of 8 lines/mm. A metal substrate HS functioning as the heat sink is provided with 14 cassette substrates arranged in a staggered fashion on both faces of said metal sink and respectively having 128 heating elements, wherein substrates 4S1–4S14 are respectively provided with cassettes 4JK1–4JK14 containing the blocks JB1–JB56 each having 32 grooves and integrated into the aforementioned 4-block structures. There are provided two ink supply pipes for each cassette, so that 28 ink supply pipes 2P1–2P28 in total are connected to the ink tank IT through the ink supply pipes OP and EP. Substrates 4S1–4S14 bonded to the metal heat sink HS are housed in a common cassette casing KA which also covers the electric connections between the unrepresented 3584 terminals and terminals of the same number formed on the substrates, and the connections between the connector and the flexible printed circuit FPC, which is connected to a drive circuit to be explained later.

Figure 21:
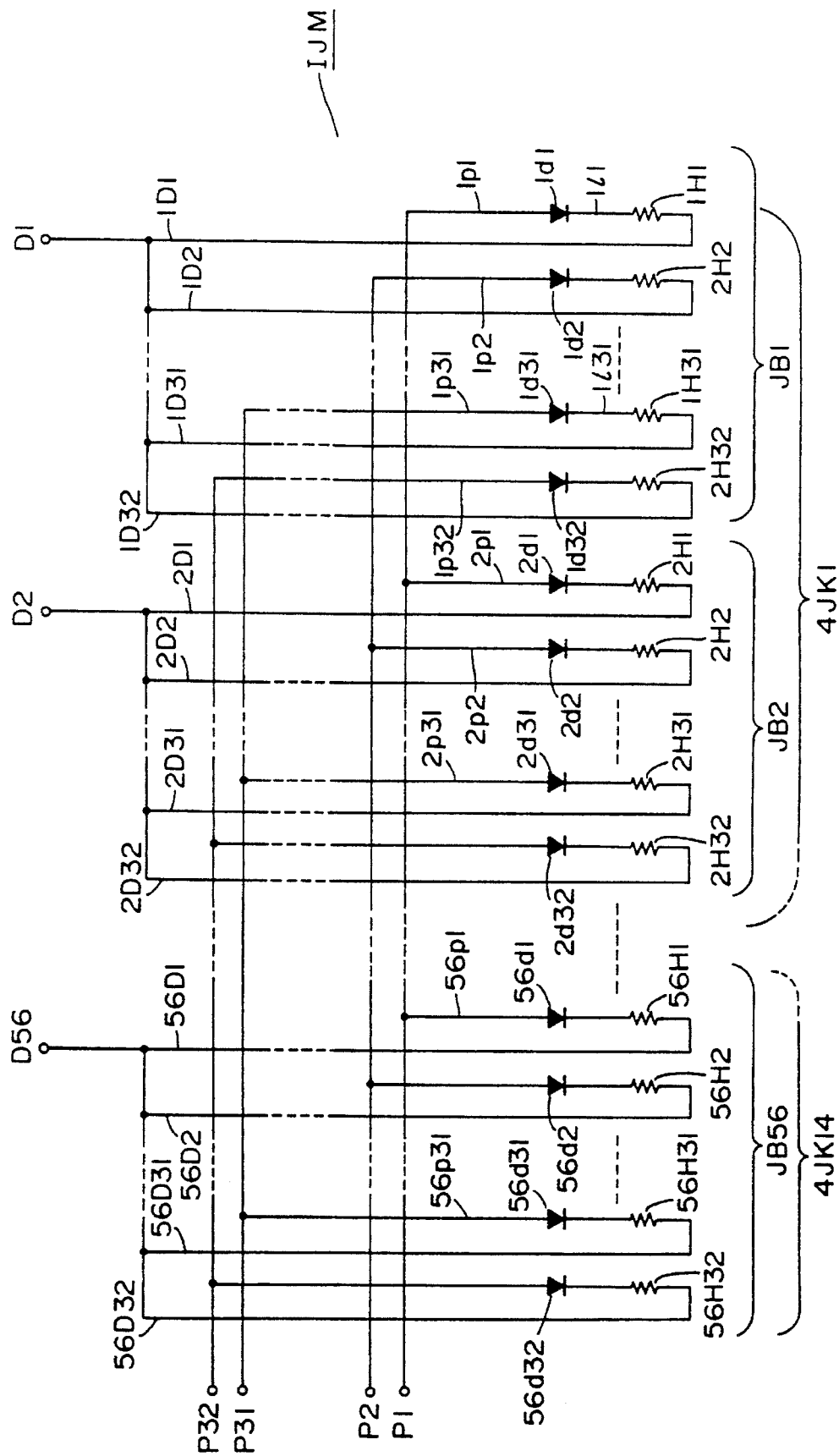
FIG. 21 is a circuit diagram showing an example of the drive circuit.

FIG. 21 shows a drive circuit for time-division drive of the apparatus shown in FIGS. 19 and 20, and FIG. 22 is a waveform chart showing the function thereof. Each block is composed of 32 heating elements 1H1–1H32 etc. so that there are 1792 heating elements 1H1–56H32 in the entire 56 blocks, which are respectively connected to 1792 diodes 1d1–56d32 divided into 56 blocks each composed of 32 diodes 1d1–1d32 etc. Those diodes are connected in a grouped fashion to image information terminals P1–P32 through connectors. The other ends of the heating elements 1H1–1H32 are connected to a scan signal terminal BD1, and other heating elements 2H1–2H32, . . . , 56H1–56H32 are similarly connected to scan signal terminals D2–D56. On cassette substrate 4S1 there are provided heating elements 1H1–1H32, 3H1–3H32, 5H1–5H32, 7H1–7H32, diodes 1d1–1d32, 3d1–3d32, 5d1–5d32, 7d1–7d32 and corresponding connecting terminals. In this fashion the heating elements, diodes and lead wires are divided, by every 4 blocks, on 14 cassettes 4JB1–4JB14.

The cassette casing KA shown in FIG. 20 contains the wiring from connectors to the terminals. The terminals D1–D56 and P1–P32 are connected, by a flexible printed circuit board, to the time-divided drive circuit shown in FIG. 21, which performs droplet emission by bubble generation in the liquid chambers through time-division drive of the blocks with a duty ratio of 1/56 as shown in FIG. 22. The above-mentioned wirings can also be achieved by multi-layered wirings. In any case it is advantageous to provide a connector between the cassettes. Referring to FIG. 22, the drive pulse BD1 for the first digit requires a relatively low power because of sparcely distributed image pulses PP1 but the drive pulse BD2 for the second digit requires a considerable power for simultaneously driving 32 nozzles.

Figure 23A:
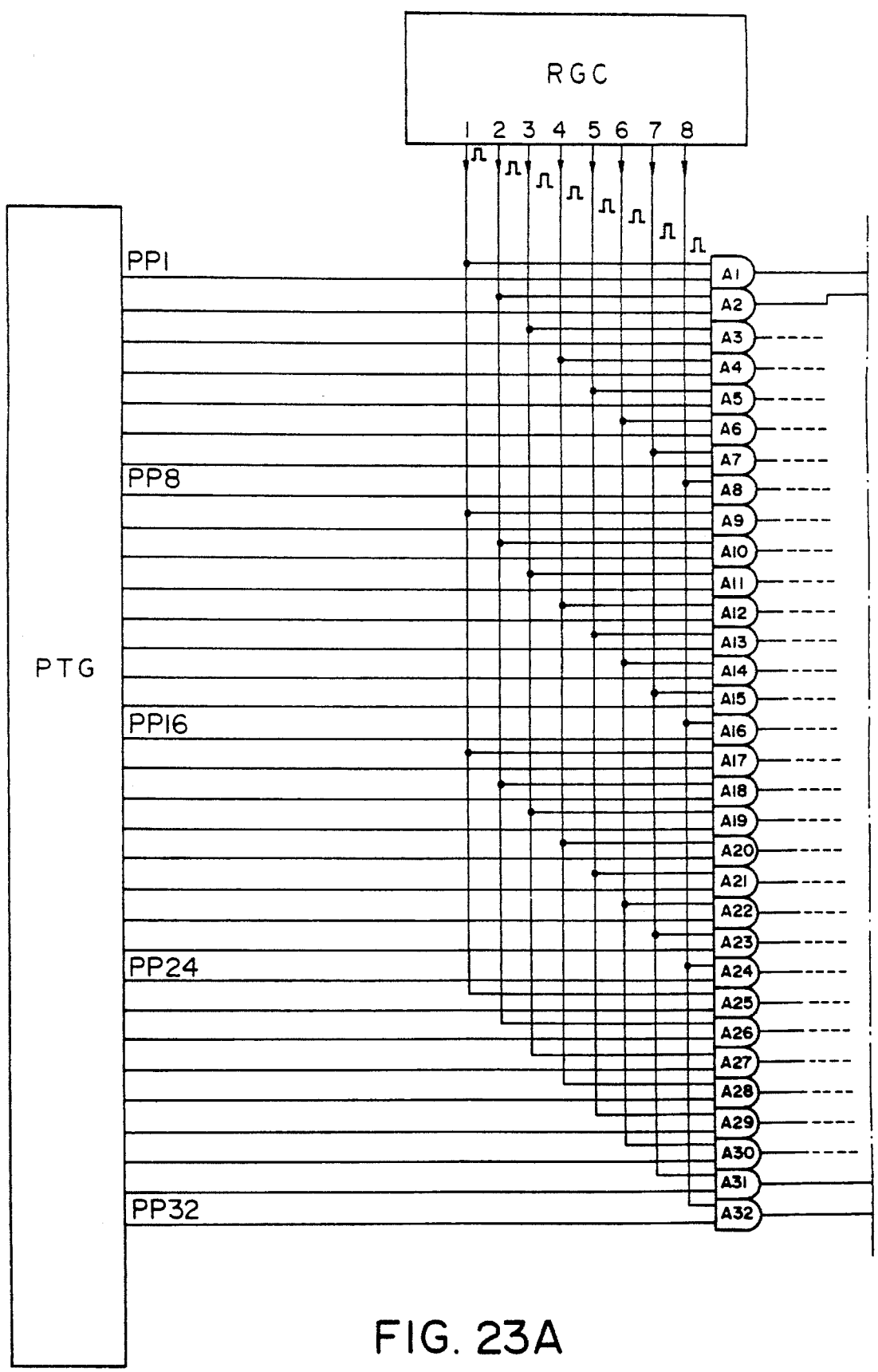
FIGS. 23A and 23B, when combined as shown in FIG. 23, are a circuit diagram showing another example of the drive circuit.
Figure 23B:
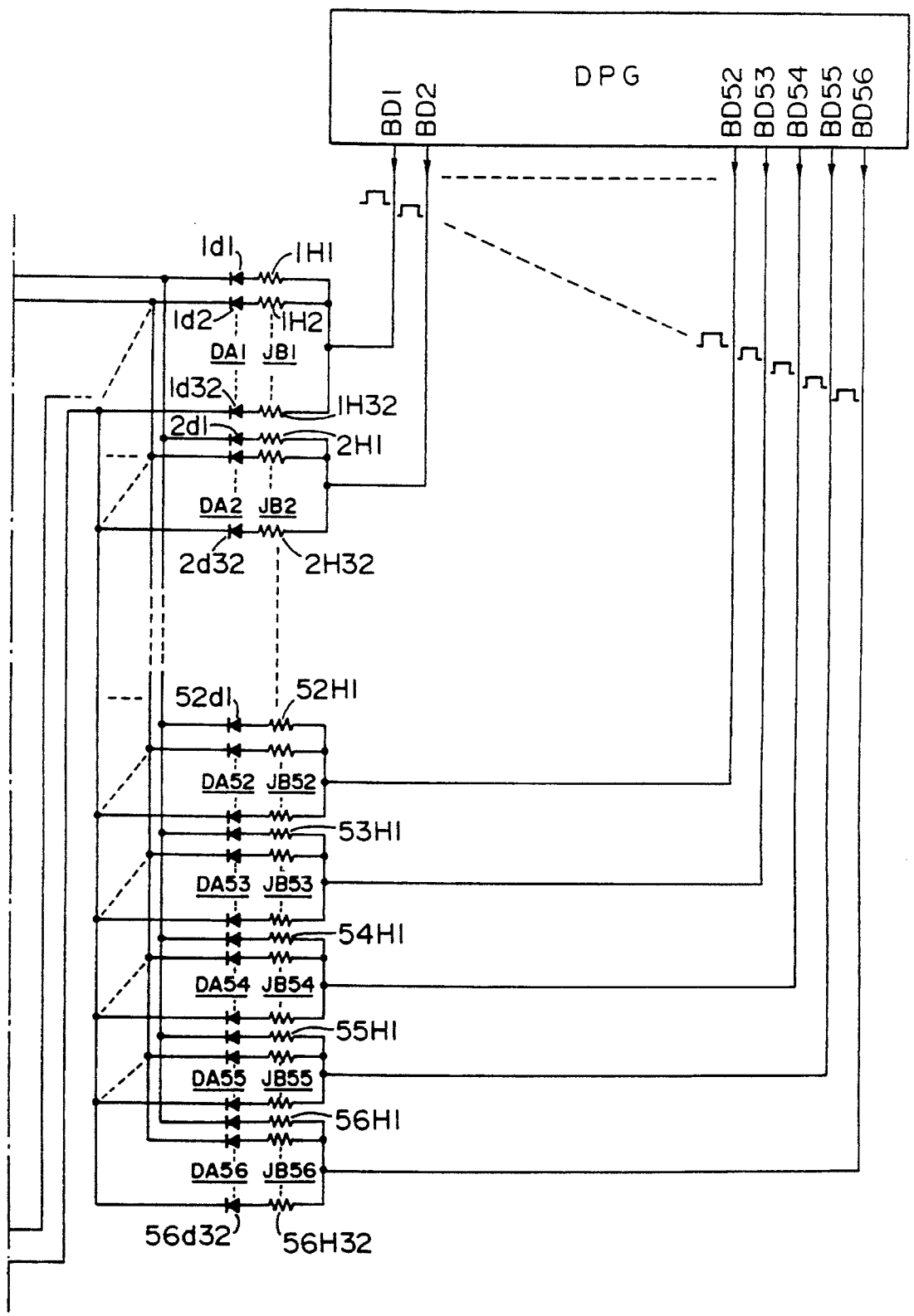
Figure 24:
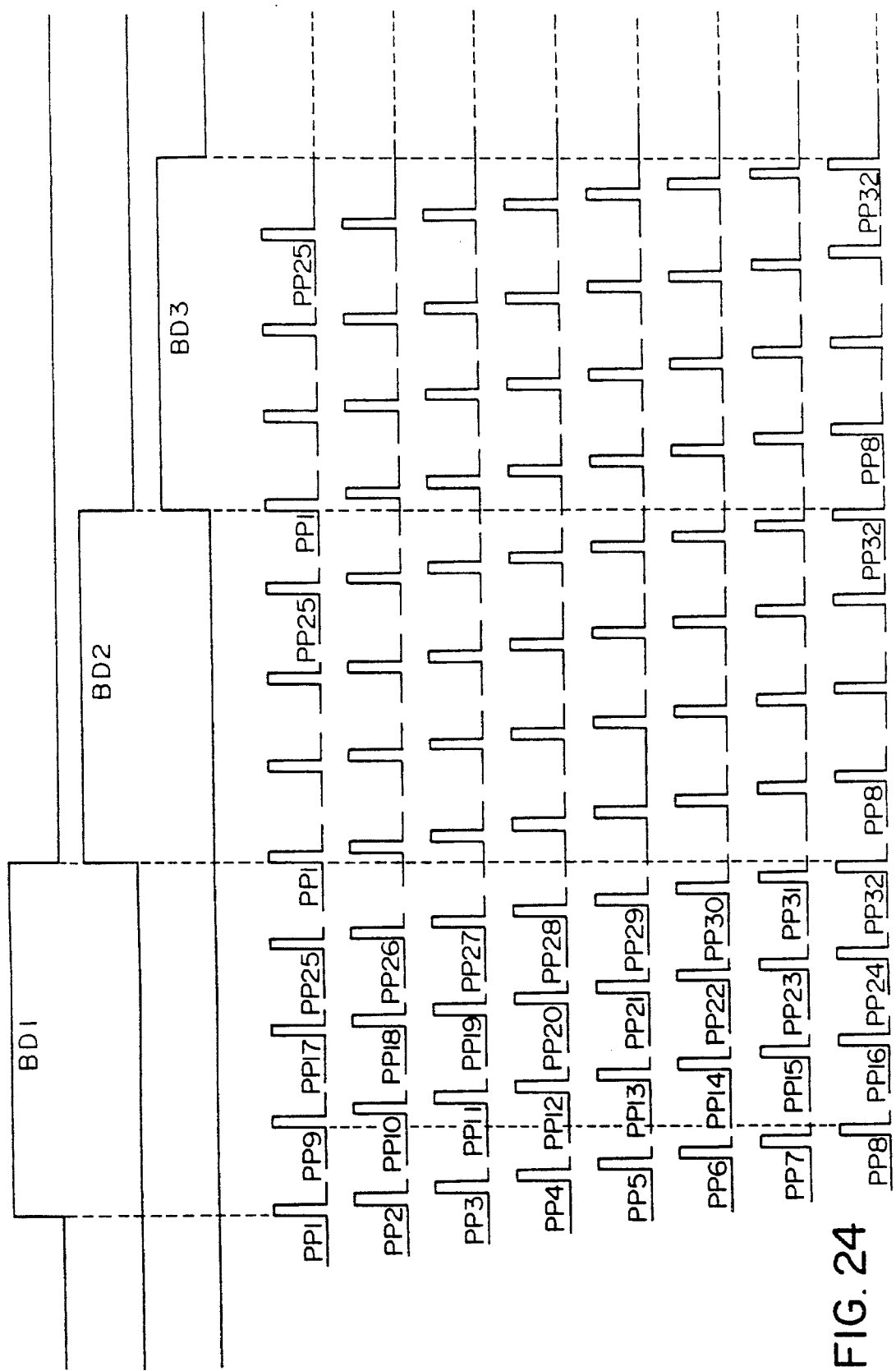
FIG. 24 is a waveform chart showing the drive signals therefor.

FIGS. 23A and 23B show an example of the circuit for avoiding the above-mentioned difficulty, in which PTG is an image information generator, DPG is a scan signal generator, and RGC is a signal generator composed of a ring counter or a read only memory for driving only four heating elements, for example H1, H9, H17 and H25 at a time and subsequently driving another four heating elements, for example H2, H10, H18 and H26. There are provided AND gates A1–A32 to simultaneously select four ink jet nozzles mutually spaced by eight nozzles. In this manner the power requirement is reduced to ⅛ compared to simultaneous drive of 32 nozzles in the circuit shown in FIG. 21. In the present embodiment, as shown in FIG. 24, four heating elements mutually spaced by eight elements in a block of 32 elements are activated at first to effect bubble generation, thus giving rise to the emission of four droplets for recording four dots and subsequently the neighboring four dots are recorded. In this manner the printing of a line of 32 dots is completed by repeating the above procedure 8 times. Such arrangement also contributes to a significant improvement in the print quality, as it is rendered possible to prevent the loss in print quality resulting from eventual merger of droplets emitted from adjacent orifices or the loss in the cooling efficiency resulting from mutual interference between the neighboring heating elements. The above-mentioned circuit is also applicable to any recording head for example shown in FIG. 5, 6A or 12.

In the foregoing embodiments, however, the common electrode positioned on the orifice side, serving to select a group of nozzles in the block, has to be given a determined dimension and cannot therefore be modified to an arbitrary length for example of a lower resistance.

The common electrode is therefore unable to accommodate an excessively large current, and thus requires considerable width and height. Consequently the element has to be considerably distanced from the orifice as shown in FIG. 6B, whereby the efficiency of the droplet emission has to be inevitably lowered.

Figure 25:
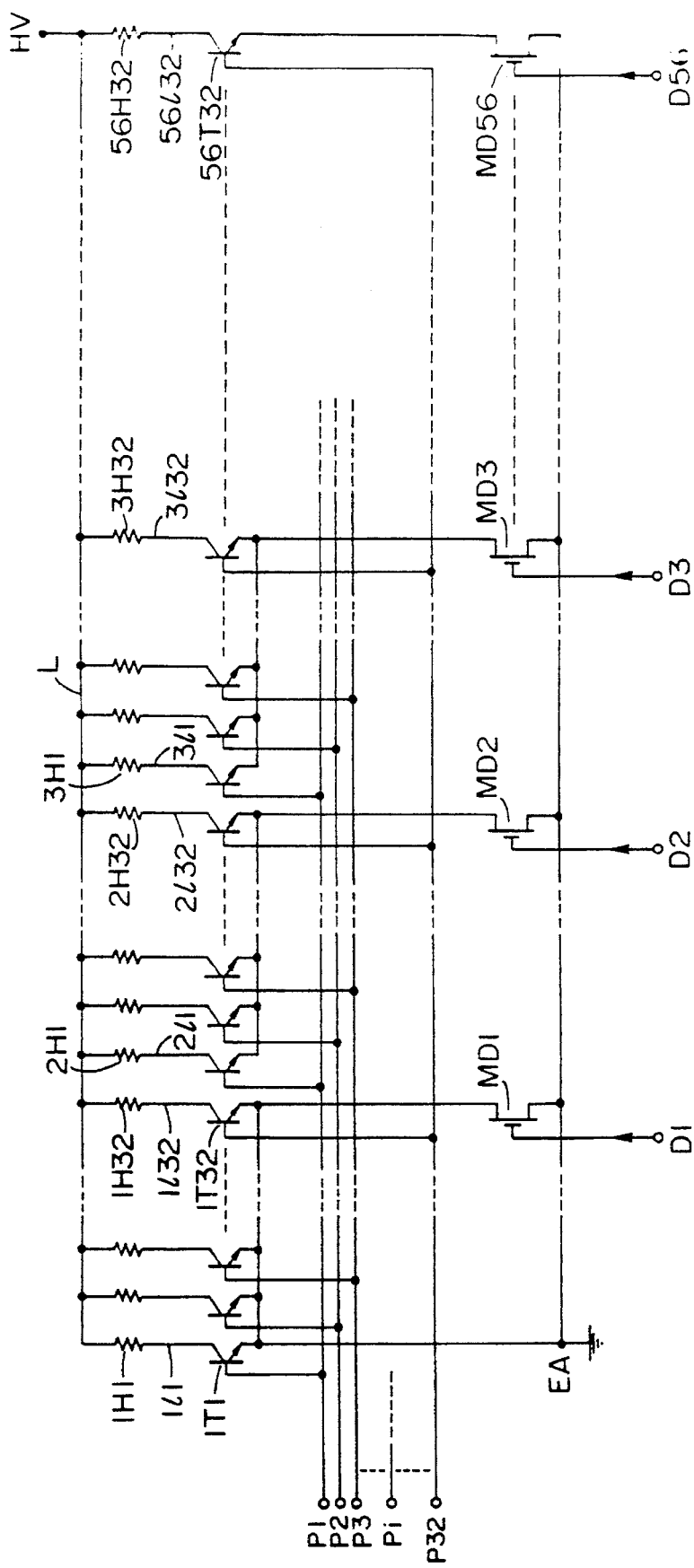
FIGS. 25, 26 and 27 are circuit diagrams showing other examples of the drive circuit.

FIG. 25 shows an example of the circuit for resolving the above-mentioned drawback by the use of a transistor array TA in place of the diode array DA. In that circuit the plural heating elements 1H1–56H32 are connected at one ends thereof respectively to collectors of transistors 1T1–56T32 and are connected in common at the other ends. The emitters of the transistors are connected in a grouped fashion to switching elements MD1–MD56, and the bases of the transistors in each block are respectively connected to image information input terminals P1–P32.

In this embodiment, the heating element 56H32 for example can be activated by closing the switching element MD56 while maintaining other switching elements MD55–MD1 and supplying an image signal to the terminal P32, whereby the transistor 56T32 is rendered conductive to supply current to heating element 56H32 through a circuit HV–56H32–56T32–MD56–ground EA.

In this state a forward bias voltage is applied between the collector and emitter of the transistors 56T1–56T31, which however are not shifted to conductive state because of the absence of image input signals at the terminals P1–P31. Consequently the image signal supplied from the terminal P32 is introduced to the transistor 56T32 alone.

As explained in the foregoing it is rendered possible to selectively activate the heating elements by the successive activation of the switching elements MD1–MD56 in combination with the signal supply to the terminals P1–P32.

Figure 26:
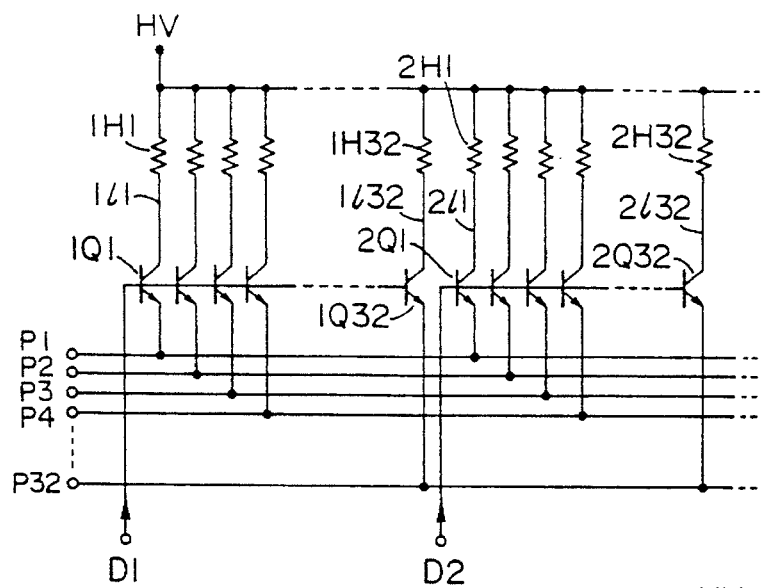

FIG. 26 shows another example of the drive circuit in which the transistors have commonly connected bases in place of commonly connected emitters as shown in FIG. 25. The present embodiment allows to reduce the current in external lead wires to respective emitters and commonly connected bases through the current amplification of respective transistors, thereby reducing the power load to the drive circuit and to the bonding wires from the array.

Figure 27:
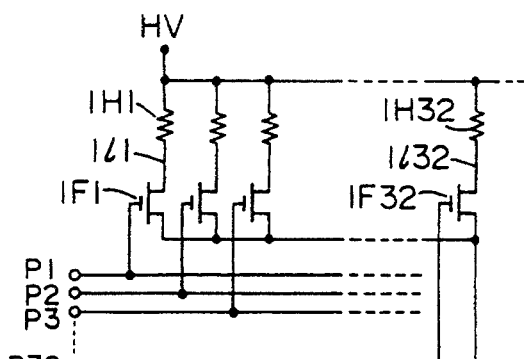

Also FIG. 27 shows another example composed of field effect transistors (FET), which not only reduce the power consumption but also allow high-speed function and simplification in the drive circuit owing to the short accumulation time, fast switching performance and splendid transmission characteristics of the transistors.

It will also be readily understood that the circuit of FIG. 27 can be modified to a structure with commonly connected gates similar to that shown in FIG. 26. Also in FIG. 25 the transistor for driving the commonly connected emitters may be composed of a bipolar transistor. Furthermore, in the circuits shown in FIGS. 25–27, it is naturally possible to invert the polarity of the power supply by employing the PNP transistors or P-channel FETs instead of the illustrated NPN transistors or N-channel FETs. These embodiments are particularly advantageous in positioning the heating elements close to the orifices because of the absence of returning digit electrodes as in FIG. 14 or of the digit electrode positioned at the orifice side as shown in FIG. 5, 6A or 16B. However the heating element should be positioned so as not to cause the escapement of the bubble from the orifice, since such escapement which occurs in the case where the element is positioned too close to the orifice, will lead to the destruction of the droplet in the flight, a phenomenon known as splashing.

Also the circuits shown in. FIGS. 25, 26 and 27 are effectively applicable to the recording head provided with returning digit electrodes as shown in FIG. 14, and in fact such combination is highly practical in consideration of the advantages in the circuit, such as high degree of integration, high-speed performance, low power consumption and ease of preparation of necessary layers on one surface of the recording head.

Furthermore it will be evident that the drive system shown in FIGS. 25, 26 and 27 can be advantageously combined with the drive system shown in FIG. 23.

Figure 28:
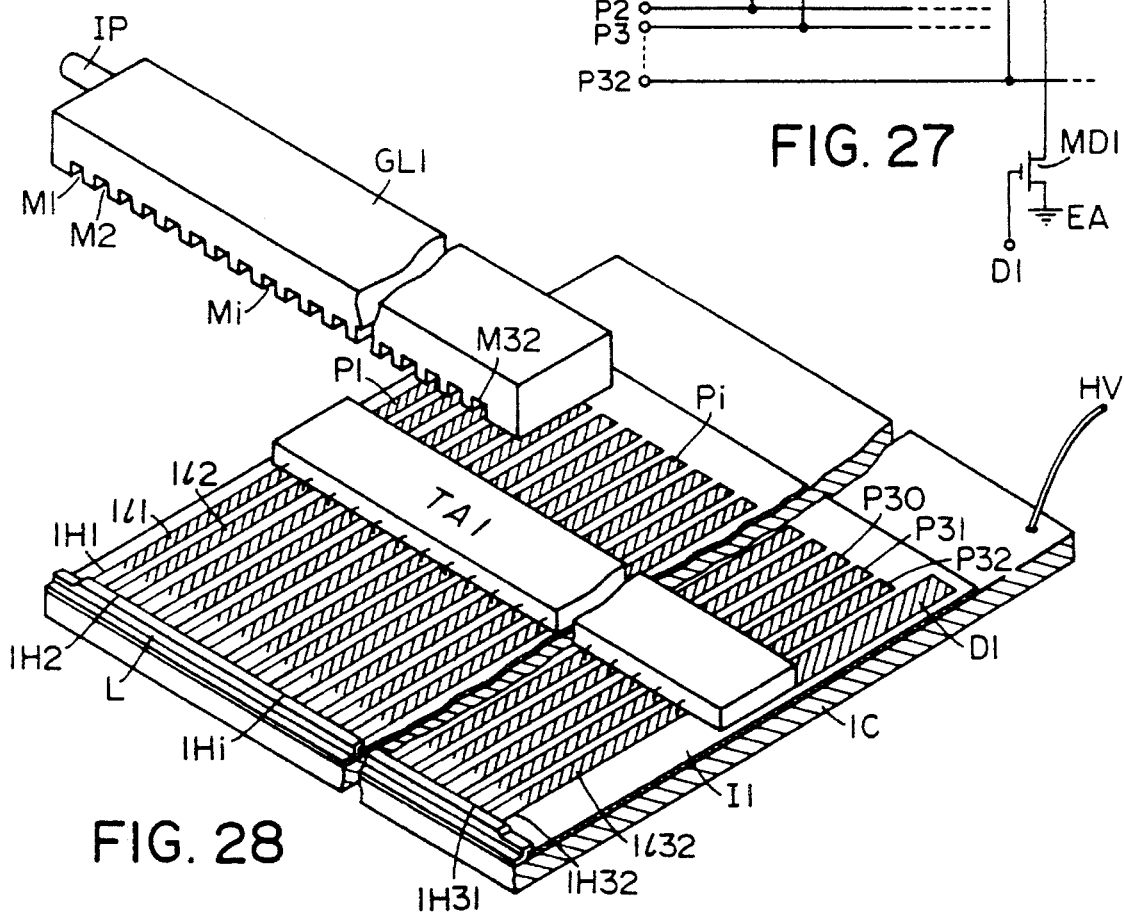
FIG. 28 is a perspective view showing still another example of the head.

FIG. 28 shows an example of the recording head utilizing the drive system shown in FIGS. 25, 26 and 27, the head being composed of a conductive substrate IC having an insulating layer I1 and heating elements 1H1, 1H2, ..., 1Hi, ..., 1H32 provided thereon and a grooved place GL1 having oblong grooves M1, M2, ..., M32 constituting liquid chambers, the substrate and grooved plate being mutually bonded in such a manner that said heating elements respectively correspond to the grooves.

Insulating layer I1 also serves as a heat accumulating layer for controlling the heat generated by the elements.

Figure 29:
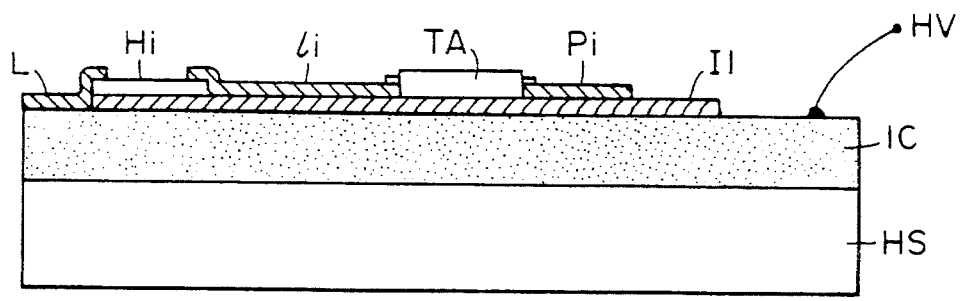
FIG. 29 is a cross-sectional view of the head.

Heating elements 1H1–1H32 provided on the substrate IC are provided with selecting electrodes 1I1–1I32 for selectively supplying image signals thereto and a common electrode L positioned at the orifice side, as illustrated in FIGS. 28 and 29, electrode L being utilized in common for all the elements 1H1–1H32. Said selecting electrodes 1I1–1I32 are connected to the aforementioned transistor array TA. On said insulating layer I1 on the substrate there are provided at least one (D1) of the digit terminals D1–D56 for supplying the digit signals and selecting terminals P1–P32.

As will be apparent from the cross-section shown in FIG. 29, the heating element Hi is provided on insulating layer I1 supported by the substrate 1C, and the conductive layer constituting the electrode L at the orifice side for power supply to the element is connected to the conductive substrate 1C.

Figure 30:
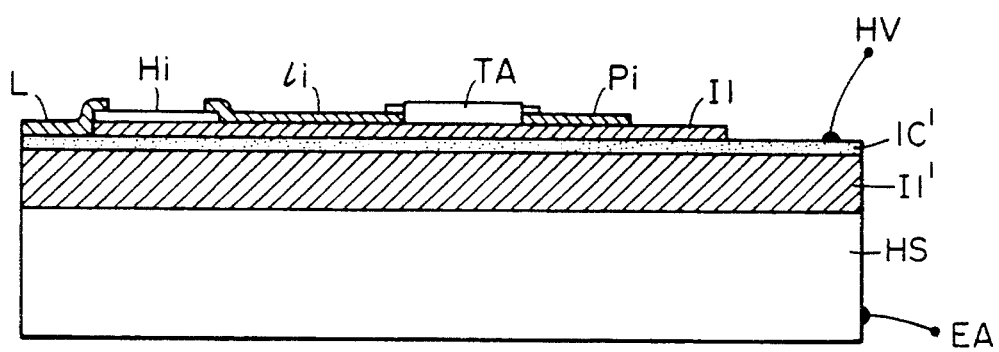
FIGS. 30 and 31 are cross-sectional views showing still other examples of the head.
Figure 31:
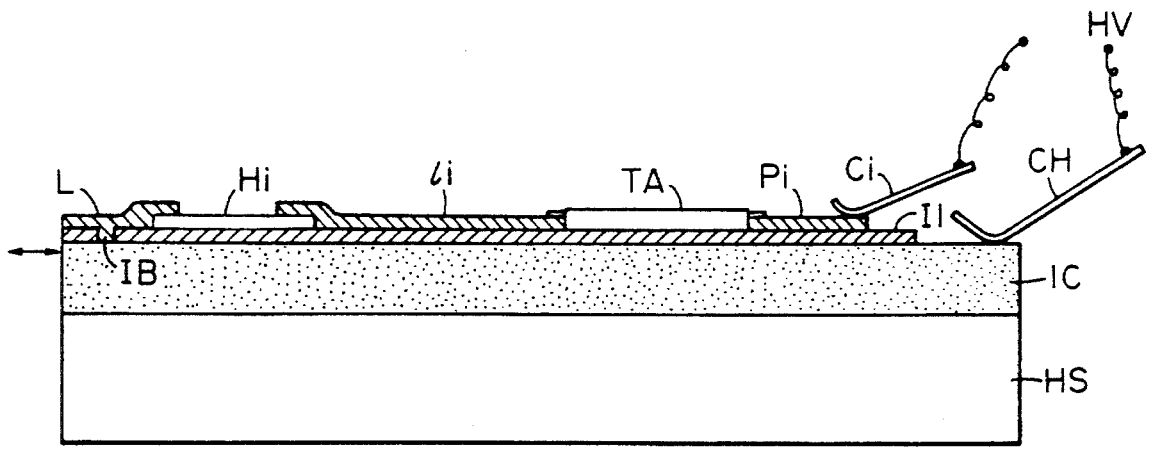

FIG. 30 shows another embodiment of the recording head of the present invention, wherein a conductive layer iC' is formed on an insulating substrate I1' and utilized as the conductor for supplying power voltage to the electrode L at the orifice side, while the metal heat sink HS is utilized as the electrode for grounding EA. It will also be evident from FIG. 25 that the conductive layer 1C or 1C' can be connected to the ground EA while the power supply voltage is introduced elsewhere or through metal heat sink P The conductive layer Pi, li, Di etc. and heating elements Hi are preferably provided on the surface thereof with a thin protective insulating layer for preventing chemical reaction with the recording liquid, current leak or mechanical abrasion. The connection between electrode L and the conductive substrate 1C may be achieved by a throughhole IB as shown in FIG. 31. Also it is effective to form plural conductive and insulating layers in alternating manner in order to allow spacious arrangement of many selecting electrodes on the same surface. For facilitating the mounting and detaching of the circuit, the selecting electrodes Pi and conductive substrate 1C may be connected through connecting leads Ci and CH.

EXAMPLE

Preparation of a recording head of the structure shown in FIG. 29: The substrate 1C was composed of a high-resistance silicon wafer of 0.6 mm thickness on which low-resistance silicon layer was epitaxially developed. On that substrate there were formed, in succession, an $SiO_2$ insulating layer (5 μm), a $ZrB_2$ resistor layer (800 Å) and an aluminum conductive layer (1000 Å) for constituting the electrodes L, Pi, D1 etc. Subsequently a photoetching process was conducted to form heating elements of 40 micrometers in width and 100 micrometers in length and arranged at a pitch of 120 micrometers, and the orifice-side electrode and selecting electrodes of determined patterns.

The orifice-side electrode was employed in common by 32 heating elements.

The above-explained structure was then overlaid by an $SiO_2$ layer (1 μm) to obtain a substrate provided with heating elements.

Separately groove patterns of 40 μm in width and 40 μm in depth were prepared at a pitch of 120 μm on a glass plate (thickness 1 mm) to obtain the grooved plate GL1.

The above-mentioned substrate and grooved plate were firmly bonded to obtain a recording head.

Figure 32:
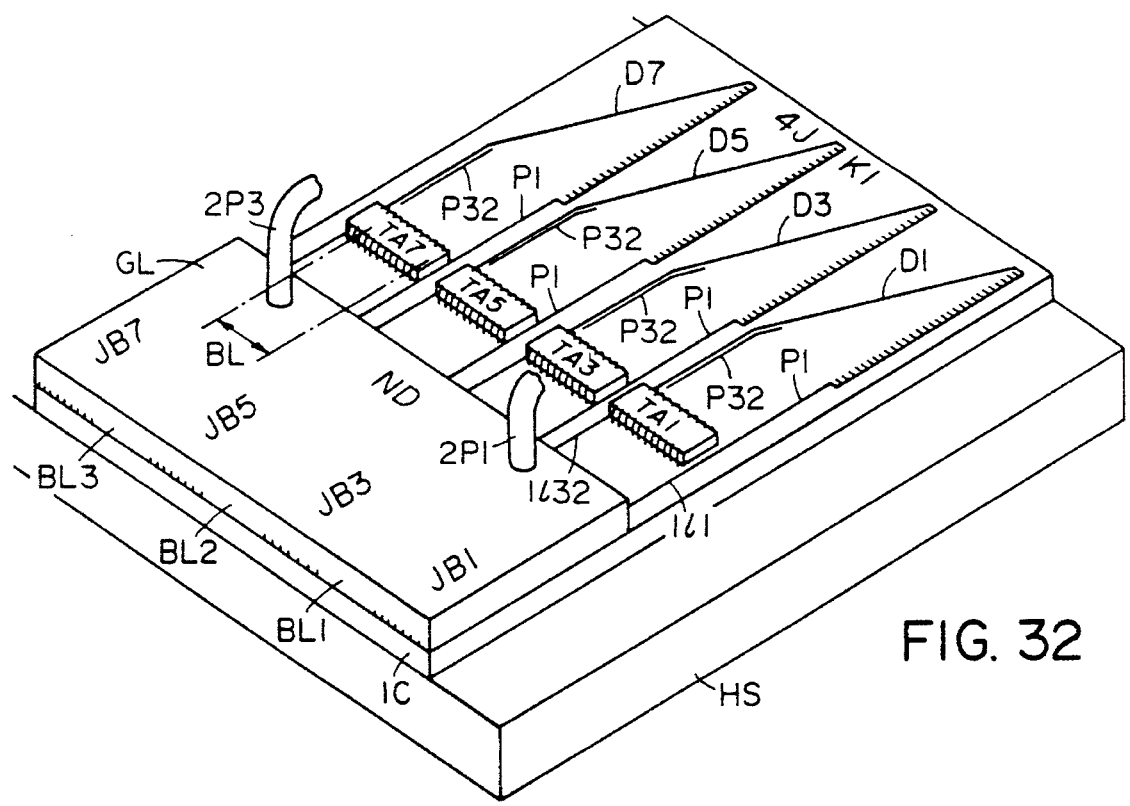
FIG. 32 is a perspective view showing still another example of the head.
Figure 33:
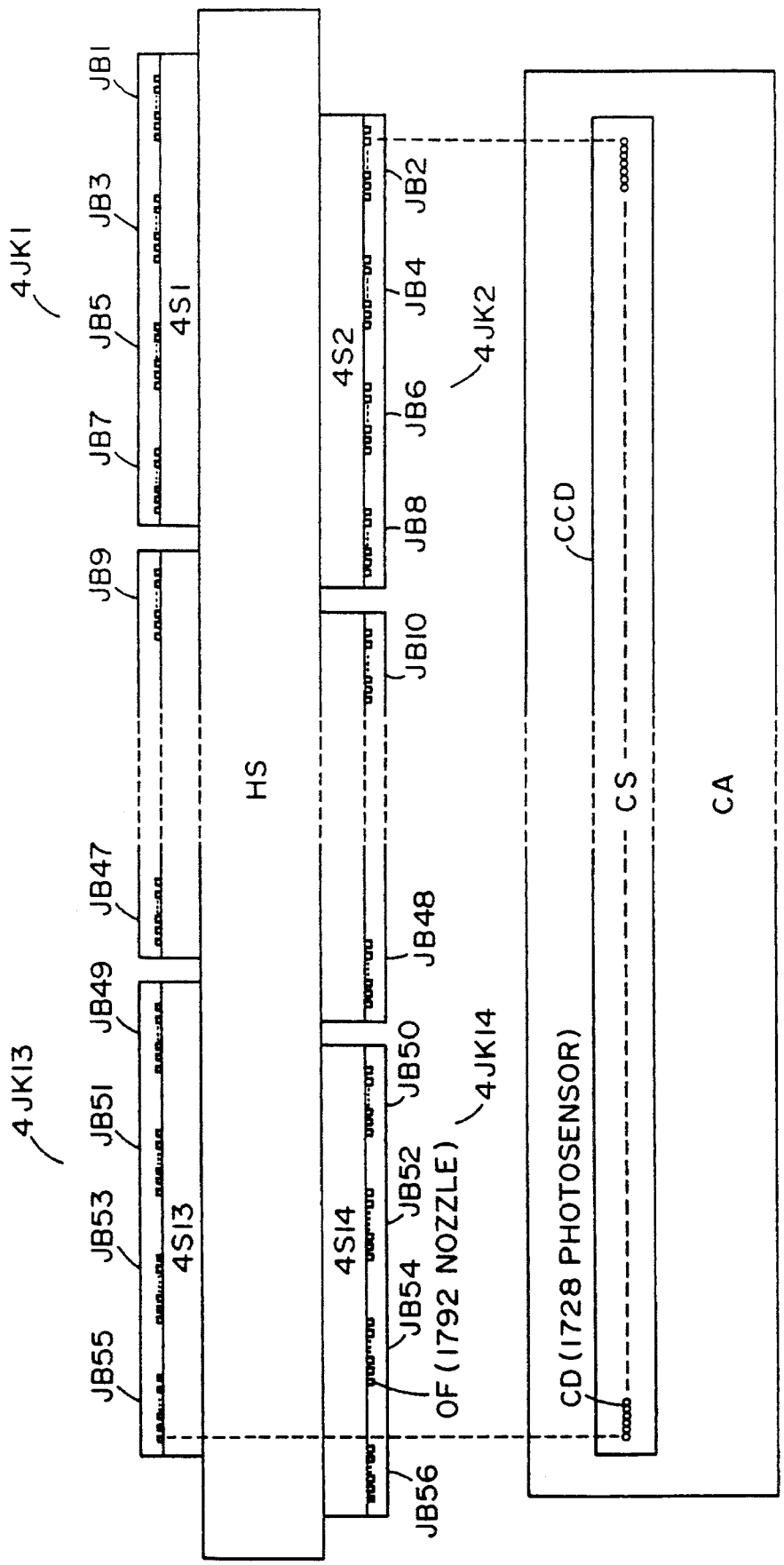
FIG. 33 is an enlarged front view showing the head and the relation thereof of the reading sensor.

FIG. 32 shows still another embodiment of the ink jet block cassette, wherein there are provided, on the insulating layer formed on the electroconductive substrate 1C, four blocks D1–D7 of lead wires P1–P32 having transistor arrays TA1–TA7 each incorporating the aforementioned transistors and switching elements. Between the blocks JB1–JB7 each containing 32 grooves there are provided blank areas BL1, BL2 and BL3. For selective drive of 32 heating elements there are required at least 33 lead wires, and the array requires a large chip area in order to accommodate additional functions. Thus, if such blocks are densely arranged without the above-mentioned blank areas, the bonding paths to be connected to the transistor arrays TA1–TA7 will have to be too densely arranged for the commercial wire bonders. Also the neighboring blocks have to be joined to obtain a uniform orifice pitch, thus requiring a highly difficult working. On the other hand the presence of blank areas BL1–BL3 provides additional space for accommodating said transistor arrays, for example TA7. Naturally said blank areas have no recording ability, so that similar blocks are mounted in a staggered fashion on and under the metal substrate HS as shown in FIG. 33 for mutually filling the blank areas.

In case each cassette contains 4 blocks or 32×4=128 nozzles in total as shown in FIG. 32, the total number of nozzles in a full-multiple recording head having such cassettes in a staggered arrangement on and under the metal substrate HS will be a multiple of 128. In case such ink jet recording head is utilized for recording on a copier or a facsimile in combination with a commercially available reading sensor for reading the original information there may result a difference between the total number of said nozzles and the number of photosensor elements in such a photosensor. For example a commercially available photosensor array CS for JIS A4 size has only 1728 photosensor elements, so that the ink jet blocks JB1 and JB56 on both ends will not be in use as shown in FIG. 33. Consequently the digit signal for time-division drive are limited D1–D54 for performing a dynamic drive with a duty ratio of 1/54. Dummy heads JB1 and JB56 are positioned on both ends of the block cassette and are preferably utilized for collecting dusts and unnecessary bubbles. Also in case an end block of an intermediate cassette develops a failure, such cassette may be simply interchanged with the end cassette 4JK1.

Figure 34:
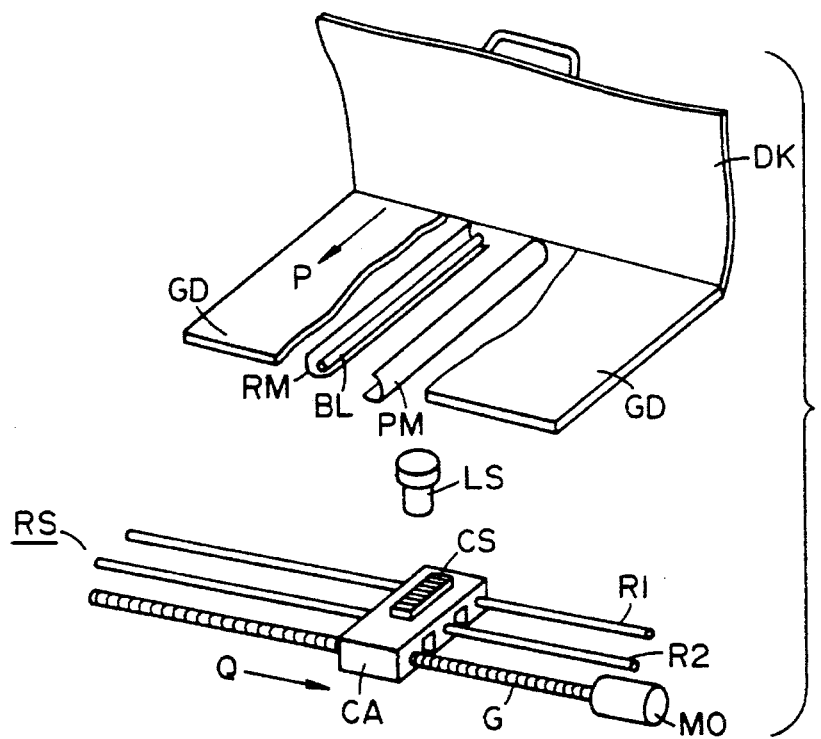
FIG. 34 is a perspective view showing an example of the original reading unit.
Figure 35:
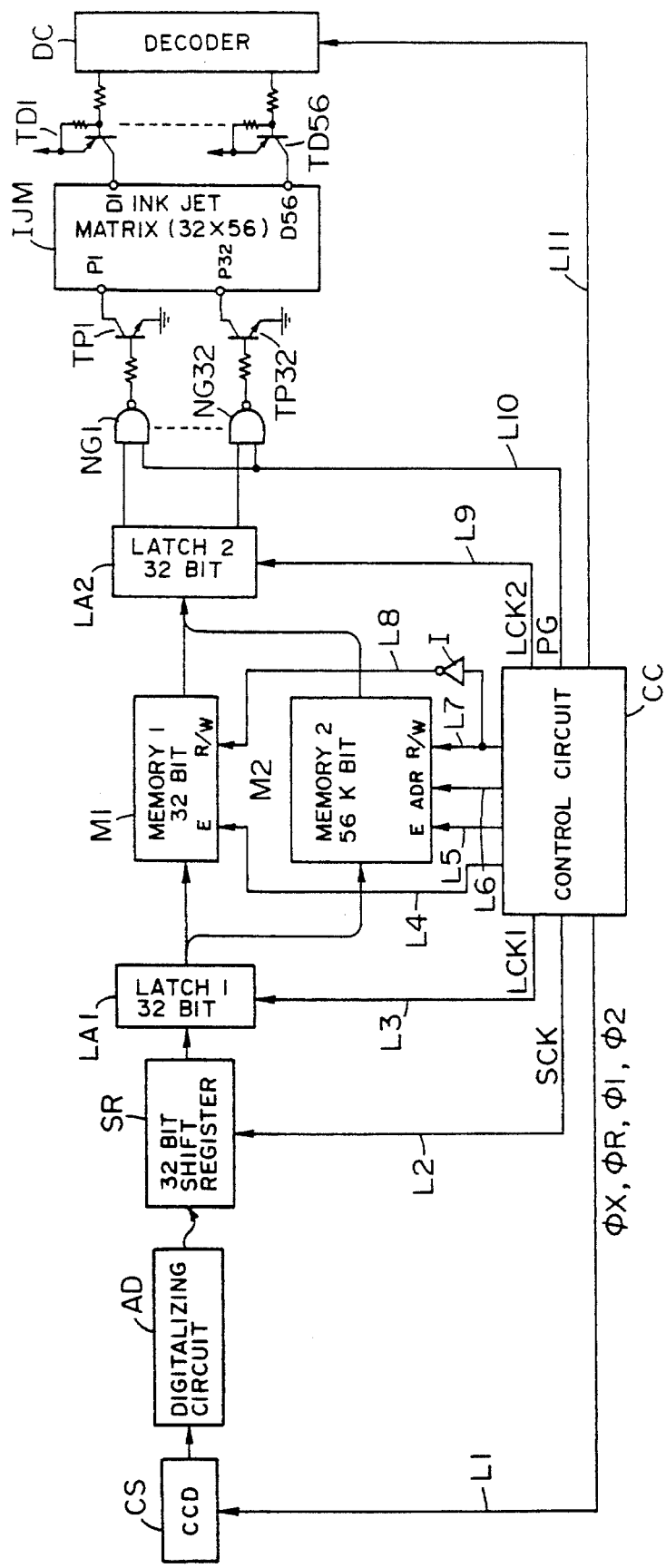
FIG. 35 is a schematic block diagram showing an example of the control unit for the entire apparatus.

FIGS. 34 and 35 schematically show a recording apparatus for a copier or a fascimile utilizing the aforementioned full-multiple recording head with time-division drive system, wherein the recording apparatus is provided with a reading section RS, above which there are provided an original carriage GD composed for example of a glass plate for supporting an original thereon and a carriage cover DK for maintaining the original in position.

Under original carriage GD there are provided a rod-shaped light source BL for illuminating the original, a reflector RM for efficiently directing the light from light source BL toward the original, a self-scanning photosensor array CS having a plurality of photosensor elements arranged in a linear fashion, and an optical unit LS including an optical lens for focusing the image of the original onto photosensor array CS. The optical unit LS and photosensor array CS are being integrally fixed to a carriage CA, which is adapted to perform forward displacement in a direction Q or backward displacement in the opposite direction along guide rails RL, R2 and by means of a screw G rotated by a motor MO. Also it is assumed that the self-scanning photosensor array CS performs the main scanning on the original plane in a direction P. Consequently the information of the original supported on the carriage GD is successively imaged on the photosensor array CS by the displacement of the carriage CA in the auxiliary scanning direction Q, and the information is released as time-sequential raster scan signals by the scanning function in the principal scanning direction of said photosensor array.

In place of the above-explained structure in which the carriage CA is displaced with respect to a fixed original carriage GD, it is also possible to employ a combination of a displacing original carriage and a fixed carriage. In a copy operation, the raster scanning is performed in the direction P while the carriage CA is displaced in the direction Q. At this operation the recording paper in the recording section is displaced in a direction S shown in FIG. 17, while performing the recording in a direction R, at the same displacing speed as that of the carriage CA in the direction Q. The image information obtained in the reading section is supplied, through a buffer memory, to the ink jet recording head as shown in FIG. 20 to perform recording in a parallel manner to the reading operation, but it is also possible to store such information in a memory and to effect the recording afterwards.

The self-scanning photosensor array CS is composed of a plurality of photoelectric transducing elements for time-sequential processing of thus obtained electric signals. Such an array is exemplified by a charge-coupled device (CCD) or a MOS image sensor. It is now assumed that the specific copying apparatus has a Width of 224 mm in the direction P, which is substantially equal to the short end length of JIS A4 size, and is provided with a charge-coupled device linear image sensor having 1792 photosensor elements, and that the recording section has, for the purpose of simplicity, a full-line multiple recording head of 1792 nozzles within a width of 224 mm. The image sensor and ink jet head correspond to a resolution of 8 pixels/mm. The ink jet heads are positioned in staggered fashion on and under the heat-sink substrate HS as shown in FIG. 20 to constitute a full-line multiple head. The 1792 nozzles are divided into 56 blocks JB1–JB56 each containing 32 nozzles. The 28 odd-numbered blocks mounted on substrate HS are separated from other 28 even-numbered blocks mounted under the substrate by a vertical orifice-to-orifice distance of 8 mm, corresponding to 64 lines. The CCD sensor array of 1792 bits provides voltage levels-corresponding to the image information, the voltage levels being converted by a digitalizing circuit AD shown in FIG. 35 into binary signals, or multiplex signals in case tonal rendition is required. In the case of simple binary signals as an example, the digitalizing circuit AD is composed of a comparator for comparing the output voltage of the sensor array CS with a standard slice level, thus releasing high- or low-level binary signals in response to the input voltages. Thus digitalized data are serially entered into a 32-bit shift register SR which performs serial-parallel conversion for 32-bit signal processing thereafter. The parallel data from shift register SR are temporarily retained in a 32-bit latch circuit LA1 and transferred to a memory section composed of a memory M1 for storing data of odd-numbered blocks JB1, JB3, . . . , JB55 and a memory M2 for storing data of even-numbered blocks JB2, JB4, . . . , JB56. The data retained in said latch circuit LA1 are alternately supplied, for every 32 bits, to said memories M1 and M2. The memories M1 and M2 are composed for example of random access memories, CCD memories, magnetic memories, etc., and have memory capacities respectively of 32 bits and 56 killobits, corresponding to one word and 1792 words each word being composed of 32 bits. The outputs of memories M1 and M2 are in the high impedance three state when the enable signal lines L4, L5 are in the high level state.

The memory M1 or M2 is designed to perform write-in operation from the latch circuit LA1 while the other is in the read-out operation.

Thus another latch circuit LA2 alternately retains the data from the memory M1 or M2. The data are supplied to 32 NAND gates NG1–NG32 which selectively activate transistors TP1–TP32 in response to the timing signal PG supplied from a control circuit CC through a print instruction line L10. The collectors of said transistors are connected to the image data input terminals P1–P32 of the time-division drive matrix IJM of the ink jet recording head. In the case of the drive system explained in relation to FIGS. 23 and 24, the above-mentioned NAND gates NG1–NG32 are replaced with NAD gates A1–A32 shown in FIG. 23. The 56 scan signal input terminals D1–D56 of matrix IJM are connected to the collectors of transistors TD1–TD56 which are controlled in succession to perform a scanning function by the output signal from a decoding circuit DC.

Decoding circuit DC is composed of a 6 line-to-56 line decoder controlled by six signal lines Lll from the control circuit CC. The control circuit CC generates for controlling the foregoing components based on clock pulses from a quartz oscillator.

The functions of the control signals will be explained in the following, while referring to FIGS. 35, 36 and 37. The CCD sensor receives, from the control circuit CC through a signal line L1, various drive pulses such as a start pulse $\phi x$ for initiating a line scan, reset clock pulses $\phi R$ for the output amplifier and 2-phase shift clock pulses $\phi 1$ and $\phi 2$ (not shown) for the shift register in said CCD sensor. The interval of said start pulses $\phi x$ corresponds to the scanning time of a scan line, during which the control circuit CC releases 1792 reset clock pulses $\phi R$, corresponding to the number of bits of said sensor and allowing the output of image information there-from when the clock pulses are in the low level state.

Figure 36:
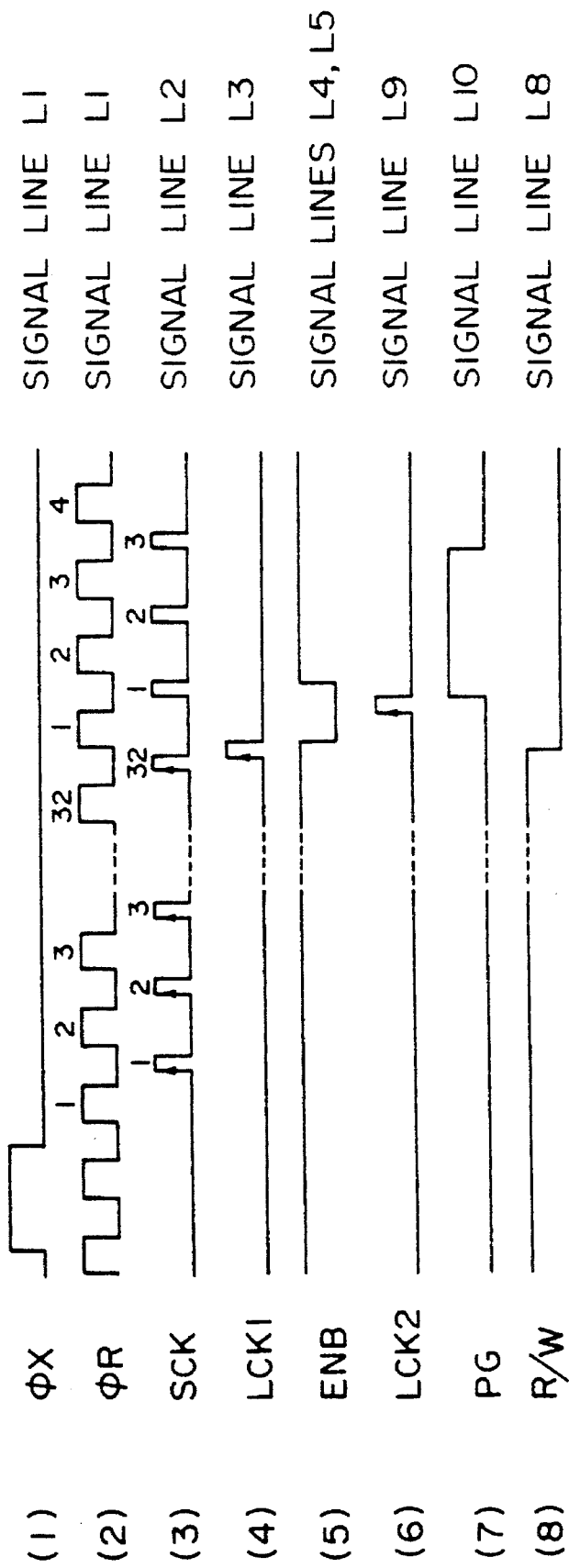
FIGS. 36 and 37 are waveform charts showing the drive signals.
Figure 37:
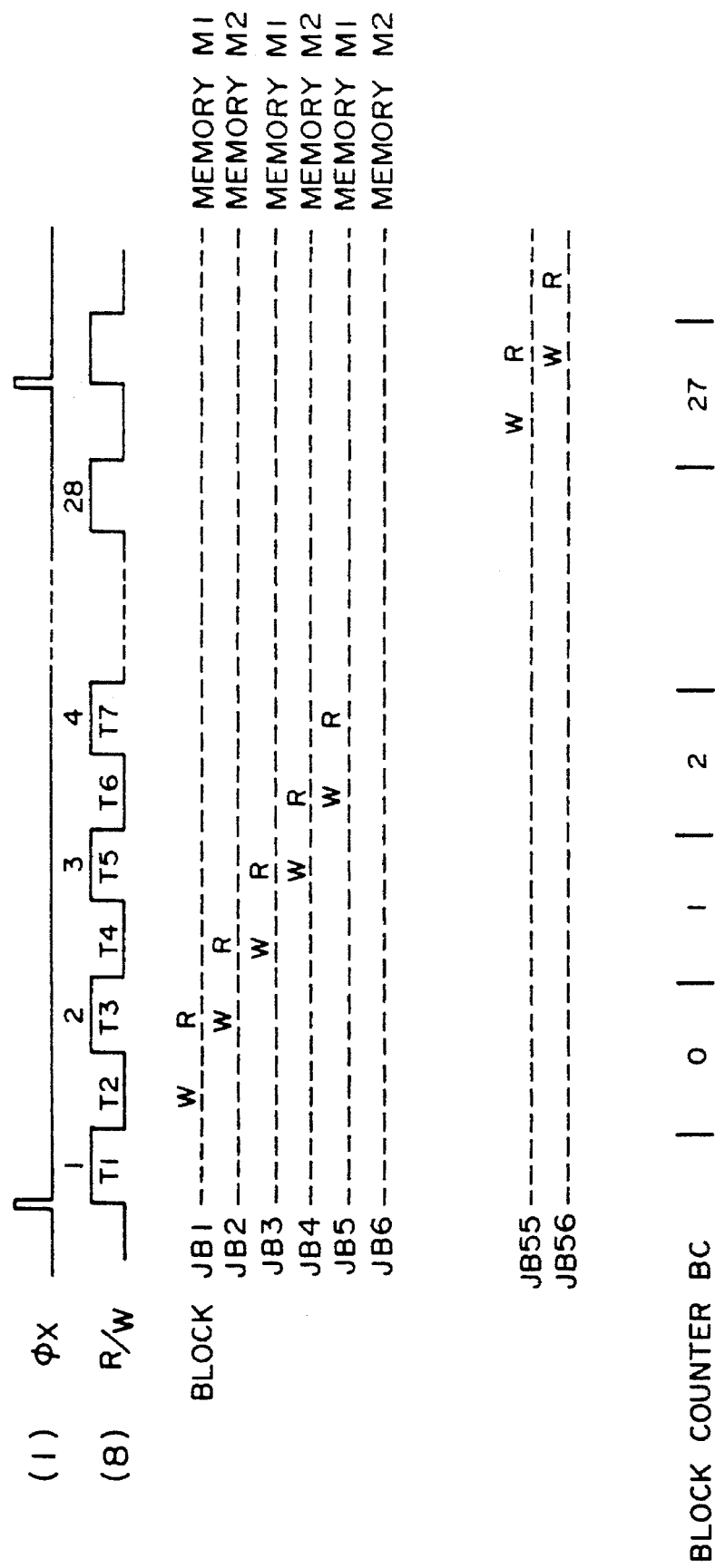

The control circuit CC supplies, through a signal line L2 for controlling the shift register SR, shift clock pulses SCK which have the same frequency as that of reset clock pulses $\phi R$ and of which leading ends are located in the low-level state of the reset clock pulses, as shown in FIG. 36(3).

Also the control circuit CC supplies, for every 32 shift clocks, load clock pulses LCK1 and LCK2 respectively to the latch circuits LA1 and LA2 through the signal lines L3 and L9. The load clock pulse LCK1 supplied to the latch circuit LA1 is released after 32 shift clock pulses SCK are released as shown in FIG. 36(4).

A memory enable signal ENB for selecting the memories M1 and M2 is shifted to the low level state after the initiation of the load clock pulse LCK1 for the latch circuit LA1 as shown in FIG. 36(5) to enable the write-in or read-out function of the memories. The load clock pulse LCK2 supplied to the latch circuit LA2 should be initiated while the memory enable signal ENB is maintained at the low level state.

A read-write signal R/W for controlling the write-in and read-out operations of the memories M1, M2 changes level, as shown in FIG. 36(8), 28 times in a single scan line at every 32 reset pulses $\phi R$. The illustrated signal R/W is supplied to the memory M2 through a signal line L7 while an inverted signal obtained through an inverter I is supplied to the memory M1 through a signal line L8 to achieve mutually alternate write-in and read-out functions of the memories as explained in the foregoing.

A signal PG for determining the timing and duration of power supply to the ink jet recording head is supplied to the NAND gates NG1–NG32 through a signal line L10 after the load clock pulse LCK2 to the latch circuit LA2, as shown in FIG. 36(7), signal PG being released for every 32 reset clock pulses $\phi R$.

In the case of a drive system as shown in FIG. 23, signal PG is further time-divided by a ring counter or a read-only memory provided in the control circuit CC and supplied to the aforementioned AND gates A1–A32. The decoding circuit DC receives, in one scan line, 56 binary pulses supplied from a counter which is step advanced upon receipt of every 32 reset pulses R. Consequently transistors TD1–TD56 are turned on in succession for every 32 reset pulses R to generate successive drive pulses BD1– BD56 shown in FIG. 22 thereby scanning the digits of the matrix IJM and thus driving the blocks JB1–JB56 shown in FIG. 20 in succession. In the following there will be briefly explained the function of the circuit shown in FIG. 35. After the release of the CCD start pulse x, the data for the nozzles of the odd-numbered block JB1 are stored from the shift register SR and latch circuit LA1 into the memory M1 during the latter half (low level) of the first cycle of the read-write signal R/W (During the former half (high level) of the cycle conducted are read-out and write-in of the memory corresponding to the last two blocks of the preceding scan line). During the former half of the next second cycle the data stored in the memory M1 during the first cycle are transferred to the latch circuit LA2, and the data for the second block JB2 are stored in the memory M2. During the latter half of the second cycle the data for the block JB3 are stored in the memory M1 and the data for the second block JB2 are transferred to the latch circuit L2. The above-explained procedure are repeated for the rest of the scan line, and the read-out and write-in for the last odd-number block JB55 and the last even numberd block JB56 are conducted during the scanning of the next scan line by CCD. As explained in the foregoing the memory M1 has a capacity of one word or 32 bits of which the stored data are read in a cycle next to the storage cycle, while in the memory M2 the data read-out is effected after 64 scan lines or 1792 read-write cycles from the storage. Stated differently the even-numbered blocks receive the data of the 64th line preceding the line currently read by the CCD. This is due to a fact that the odd-numbered blocks and even-numbered blocks are separated by a distance of 8 mm corresponding to 64 lines.

For this reason address selecting function is required in the memory M2.

Figure 38:
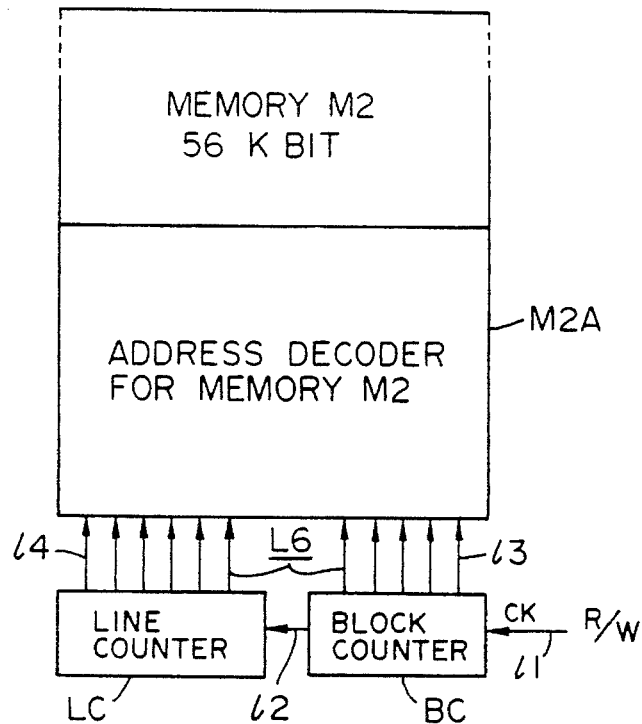
FIG. 38 is a partial view showing the configuration of the memory.

FIG. 38 shows the outline of the address decoding circuit M2A for the memory M2 and incorporated in memory M2, and a block counter BC and a line counter LC incorporated in the control circuit CC.

As explained in the foregoing, the memory M2 has a capacity of 56 killobits corresponding to 64 lines each composed of 28 words or 896 bits, wherein one word is composed of data of 32 bits for one block.

The block counter BC is a dodecaoctanary counter which is step advanced at the trailing end of each read/write signal R/W in a manner as shown in FIG. 36.

The line counter LC is a modulo-4 binary counter which is step advanced in response to the carry signal of block counter BC supplied through a signal line 12. The output lines 13 and 1 of block counter BC and line counter LC correspond to the addressing line L6 in FIG. 35, and the signals supplied therethrough are decoded in the address decoding circuit M2A to select the memory. In the memory M2, after the data write-in in an address of n-th line and m-th block, the output of the block counter is step advanced to perform the data read-out from an address of n-th line and (m+1)th block, thereby completing a read/write cycle. In the subsequent read/write cycle the data write-in is effected at an address for n-th line and (m+1)th block. The value of m returns to zero after reaching 27, and the value of n returns to zero after reaching 63.

Figure 39:
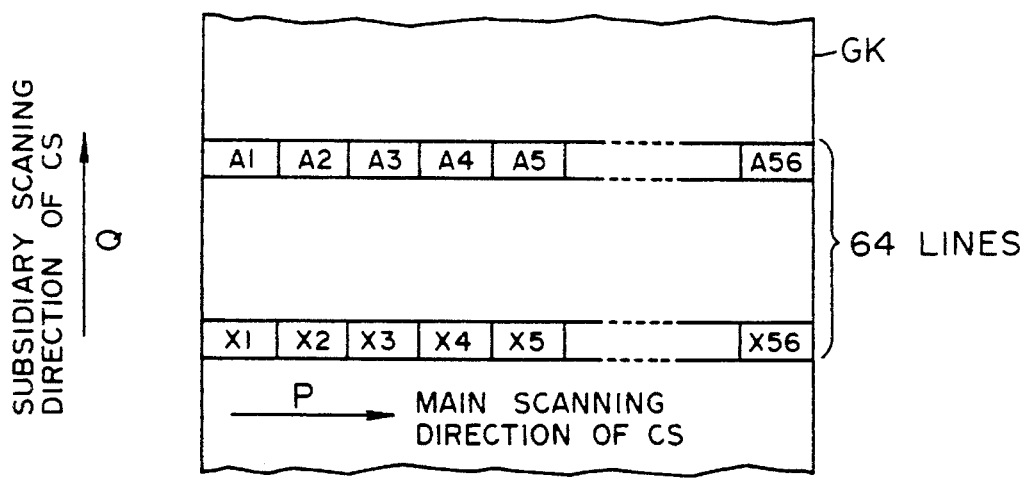
FIG. 39 is a chart showing the locations of the memory contents at the information, reading.

FIG. 39 shows the information on an original GK and the transfer of the data in the latches and the memories.

Data A1 of 32 bits loaded in the latch L1 at a time T1 are stored in the memory M1 at a time T2. Also at time T2, subsequent data A2 of 32 bits are loaded in the latch L1. At time T3, the data A1 stored in the memory M1 are transferred to the latch L2, the data A2 in the latch L1 are stored in the memory M2 and subsequent data A3 are loaded in the latch L1. At time T4, the latch L2 is loaded with data x2, the data A3 in the latch L1 are transferred to the memory M1, and data A4 are loaded in the latch L1. The above-explained procedures are thereafter repeated in a similar manner. Data x2, x4 etc. are those stored in the memory M2 64 lines before the current reading positions A1, A2, ... of the CCD photosensor.

Figure 40:
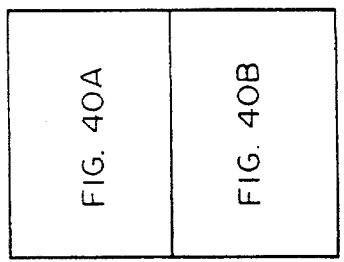
FIGS. 40A and 40B, when combined as shown in FIG. 40, are a flow chart showing the operations thereof.
Figure 40A:
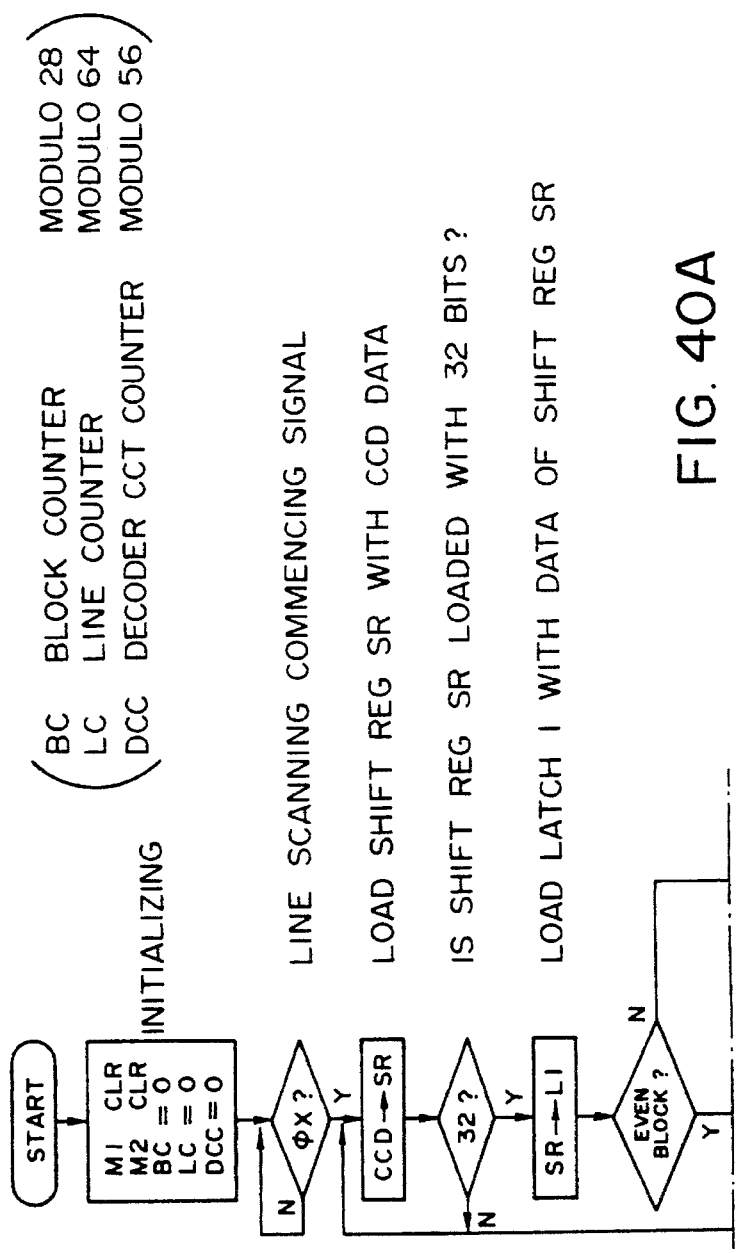
Figure 40B:
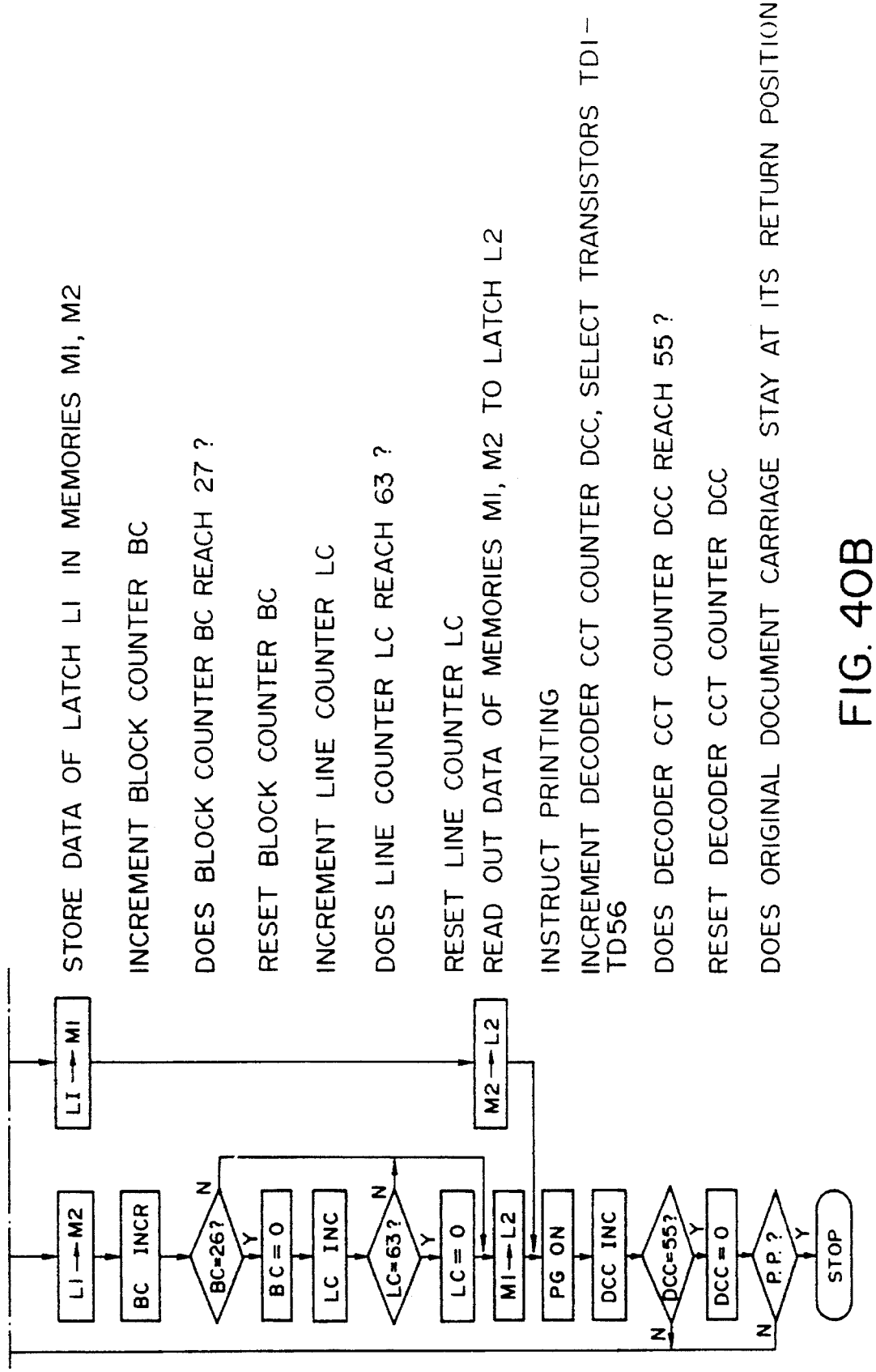

FIGS. 40A and 40B are a flow chart showing the above-explained functions.

Figure 41:
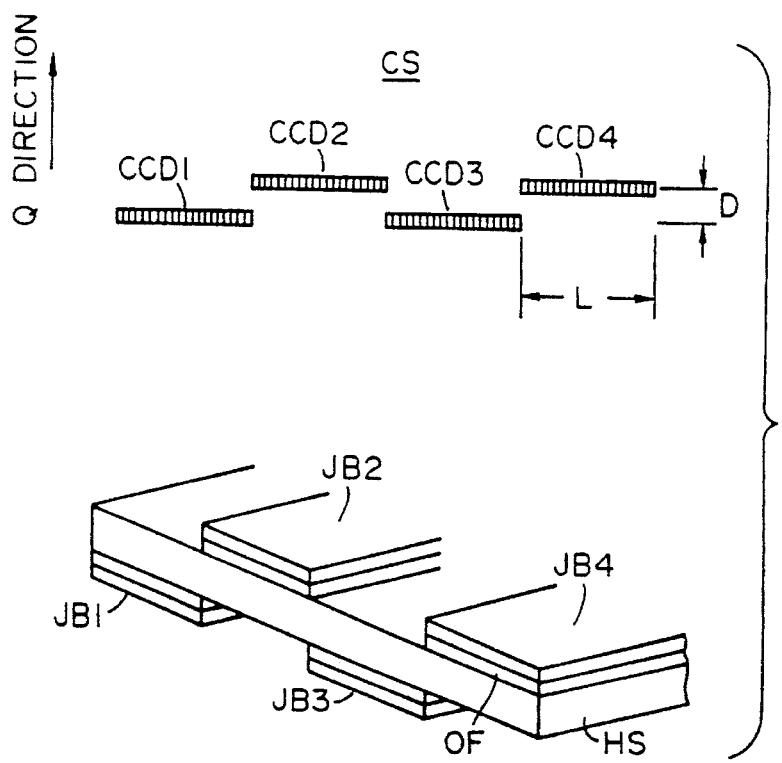
FIG. 41 is a view showing an example of the structure of the reading and recording heads.

FIG. 41 shows another embodiment of the self-scanning photosensor array CS, which is composed of a plurality of photoelectric transducing elements for providing time-sequential signals and is composed, in this embodiment, of four blocks CCD1–CCD4 each containing 512 bits and having an effective length of 12.8 mm (25 µm×512).

Such a photosensor array, combined with an optical system with a reducing ratio of 4:1, is capable of covering the lateral width 205 mm in the direction P of the original carriage shown in FIG. 34. In such case a resolution of 10 pixels/mm is achieved by 2048 elements in total.

Consequently the ink jet recording head is likewise designed with a density of 10 orifices/mm.

A full-line multiple ink jet head is composed of plural blocks arranged in a staggered fashion on and under a common substrate HS, for example of 4 blocks each containing 512 nozzles, corresponding to 2048 nozzles in total. As shown in FIG. 41, the 1st block JB1 and 3rd block JB3 mounted under the substrate HS are separated from the 2nd block JB2 and 4th block JB4 mounted on said substrate by a vertical orifice-to-orifice distance of 28 mm or 280 lines.

In order to utilize such a recording head in a copying apparatus in combination with a linear photo-sensor array such as the linear photosensor array of 2048 bits explained in the foregoing, there will be required a memory of 280K bits corresponding to the above-mentioned orifice-to-orifice distance. This will be understood from the embodiment of FIG. 26 requiring a memory M2 of 56K bits.

However in the present embodiment, the use of a photosensor of an arrangement corresponding to that of the recording head as shown in FIG. 41 allows to provide a simple system not requiring excessive memory. In the present embodiment it is rendered possible to perform scanning operation with sensor CS in the direction Q in FIG. 41 and to drive the ink jet blocks JB1–JB4 according to the information obtained from the sensor. In this case the upper sensors CCD2, CCD4 are separated from the lower sensors CCD1, CCD3 by a vertical distance of 7 mm, in consideration of the aforementioned orifice-to-orifice distance of 28 mm and the image reduction ratio of 4:1.

Figure 42:
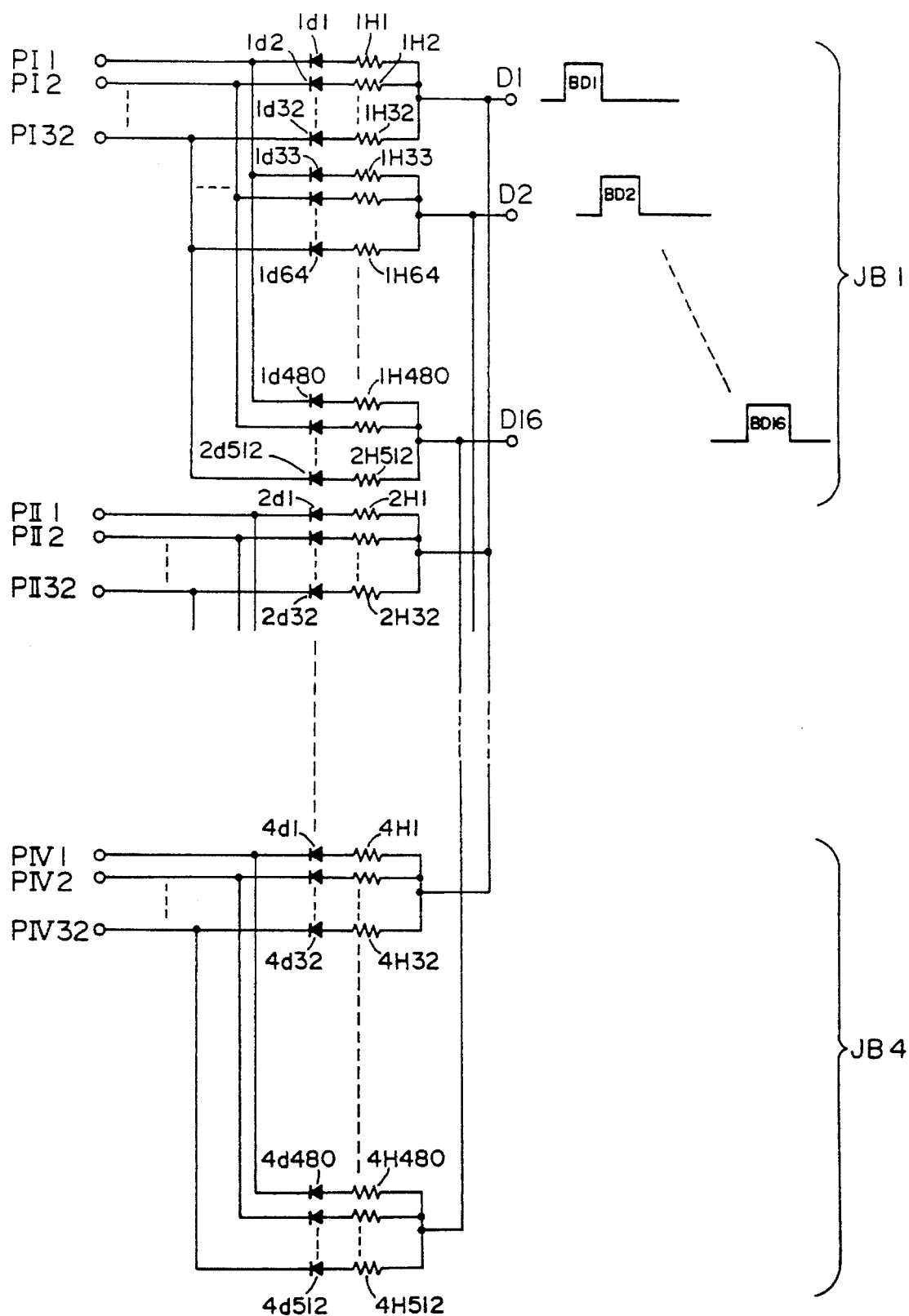
FIG. 42 is a circuit diagram showing an example of the drive circuit for the recording head.

FIG. 42 shows a drive circuit for the ink jet head shown in FIG. 41, wherein 1H1–4H512 are heating elements for the ink jet head, while 1d1–4d512 are diodes for preventing cross-talk. There are provided 2048 heating elements in total, which are divided into 4 blocks JB1–JB4 each containing 512 nozzles. The 512 heating elements in each block are divided into the groups of 32 nozzles, for effecting time-divided drive with a duty ratio of 1/16. Thus, in the first block JB1, 512 heating elements 1H1–1H512 are activated by time-division drive of data terminals PI1–PI32 and scan signal input terminals D1–D16. Other blocks have an identical structure and are activated in the same manner.

Figure 43:
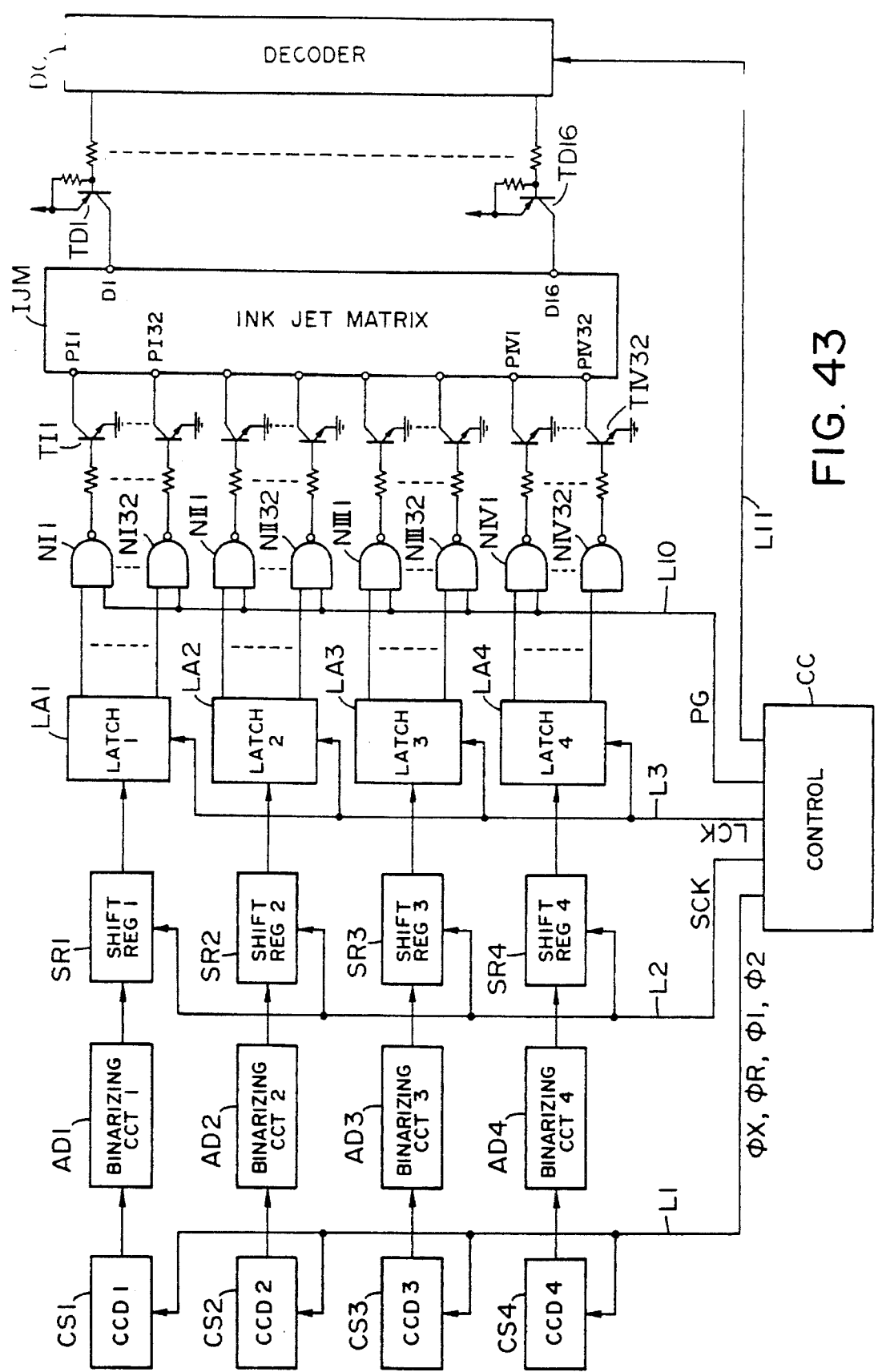
FIG. 43 is a schematic block diagram thereof.

FIG. 43 is a block diagram of the control circuit for use in the present embodiment. In this circuit the CCD sensors CCD1–CCD4, digitalizing circuits AD1–AD4, shift registers SR1–SR4 and latch circuits LA1–LA4 are combined with 4 blocks of the ink jet head in the identical manner, so that the following explanation will be limited to one block only.

CCD1 is a linear CCD sensor of 512 bits for scanning ¼ of a scan line and provides voltage signals corresponding to the image information, which are converted into binary signals representing black and white in a binarizing circuit AD1.

The binarizing circuit is composed of a comparator for comparing the output voltage of the CCD sensor with a determined slice level voltage, thereby releasing binary signals. In the case tonal rendition is required for example in copying, there will be employed an analog-digital converter for obtaining multiplex signals.

The digital data obtained from said binarizing circuit AD1 are entered into a shift register SR1 of 32 bits in which the data are subjected to a serial-parallel conversion for subsequent 32-bit parallel processing. The output data from shift register SR1 are retained in a latch circuit LA1 of 32 bits which selectively controls transistors TI1–TI32 through NAND gates NI1–NI32 controlled by the print instruction signal PG. Transistors TI1–TI32 composed of 32 NPN transistors of which collectors are respectively connected to the data terminals P1–P32 of the ink jet matrix IJM.

The scan signal input terminals D1–D16 of said ink jet matrix are respectively connected to the collectors of 16 PNP transistors TD1–TD16, which are controlled in succession by the output signals from a decoding circuit DC. This is a 4 line-to-16 line decoder for selecting the transistors TD1–TD16 in succession in response to the signals from the control circuit CC.

The control circuit CC generates drive clock pulses for CCD sensor, shift clock pulses for the shift register, clock pulses for the latch circuits, timing clock pulses for the gate circuits, selection signals for the decoding circuit etc. utilizing a quartz oscillator for generating standard clock pulses.

Now there will be explained the functions of various control signals by the circuit diagram of FIG. 43 and the timing chart in FIG. 44. The sensors CCD1–CCD4 receive various drive pulses from the control circuit CC through a signal line L1, such as start pulse for initiating line scanning (FIG. 44(1)), reset clock pulses φR for the output amplifier (FIG. 44(2)) and 2-phase shift clock pulses φ1, φ2 (not shown) for the shift registers. The interval of the start pulses φx corresponds to the scan time of one scan line, during which 512 reset clock pulses φR are released from the control circuit CC, corresponding to the number of bits of the CCD sensor and allowing the output of image information when the reset clock pulses are at the low level state.

Figure 44:
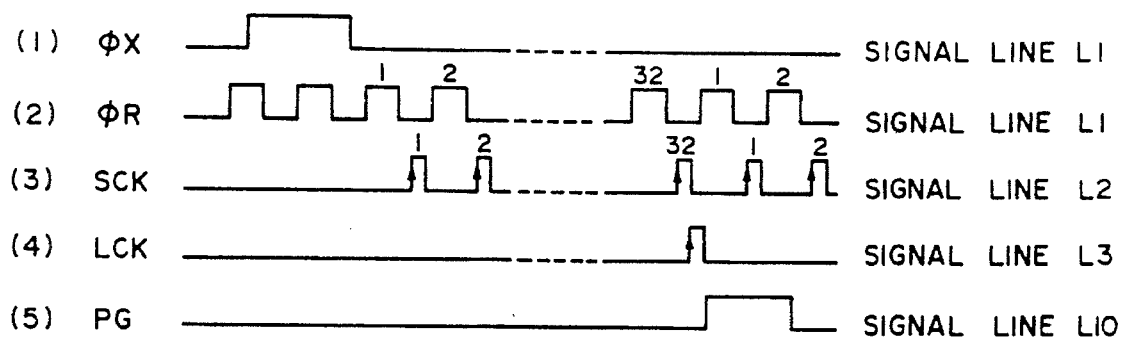
FIG. 44 is a waveform chart showing the operations thereof.

In a signal line L2 for controlling the shift register SR1 there are given shift clock pulses SCK having the same frequency as that of the reset clock pulses φR and starting when said reset clock pulses are in the low level state, as illustrated in FIG. 44(3).

The control circuit CC releases load clock signals to the latch circuits LA1–LA4 through a signal line L3 for every 32 shift clock pulses SCK. As shown in FIG. 44(4) the ad clock pulses are initiated after 32 shift clock pulses (FIG. 44(3)) are released.

The gate circuits NI1–NIV32 receive a signal PG for determining the timing and duration of the activation of the ink jet head, for every 32 reset clock pulses φR, through a signal line L11 after the load clock pulses (LCK in FIG. 44(4)) to the latch circuits LA1–LA4 as shown in FIG. 44(5).

The decoding circuit DC receives 16 binary signals in a scan line from a decahexanary counter which is step advanced for every 32 reset pulses φR. Consequently the transistors TD1–TD16 are turned on in succession for every 32 reset pulses φR (cf. FIG. 42 BD1–BD16).

This embodiment is advantageous in that the memory capacity can be significantly reduced in comparison with the preceding embodiment.

A similar effect is also obtainable when the sensors CCD1–CCD4 and ink jet blocks JB1–JB4 are respectively arranged in a linear fashion, if such arrangement is rendered feasible from the viewpoint of manufacturing technology. Also the divided structure of the sensors and ink jet blocks is advantageous for the repair, and facilitates to achieve a sufficient planar precision.

Figure 45:
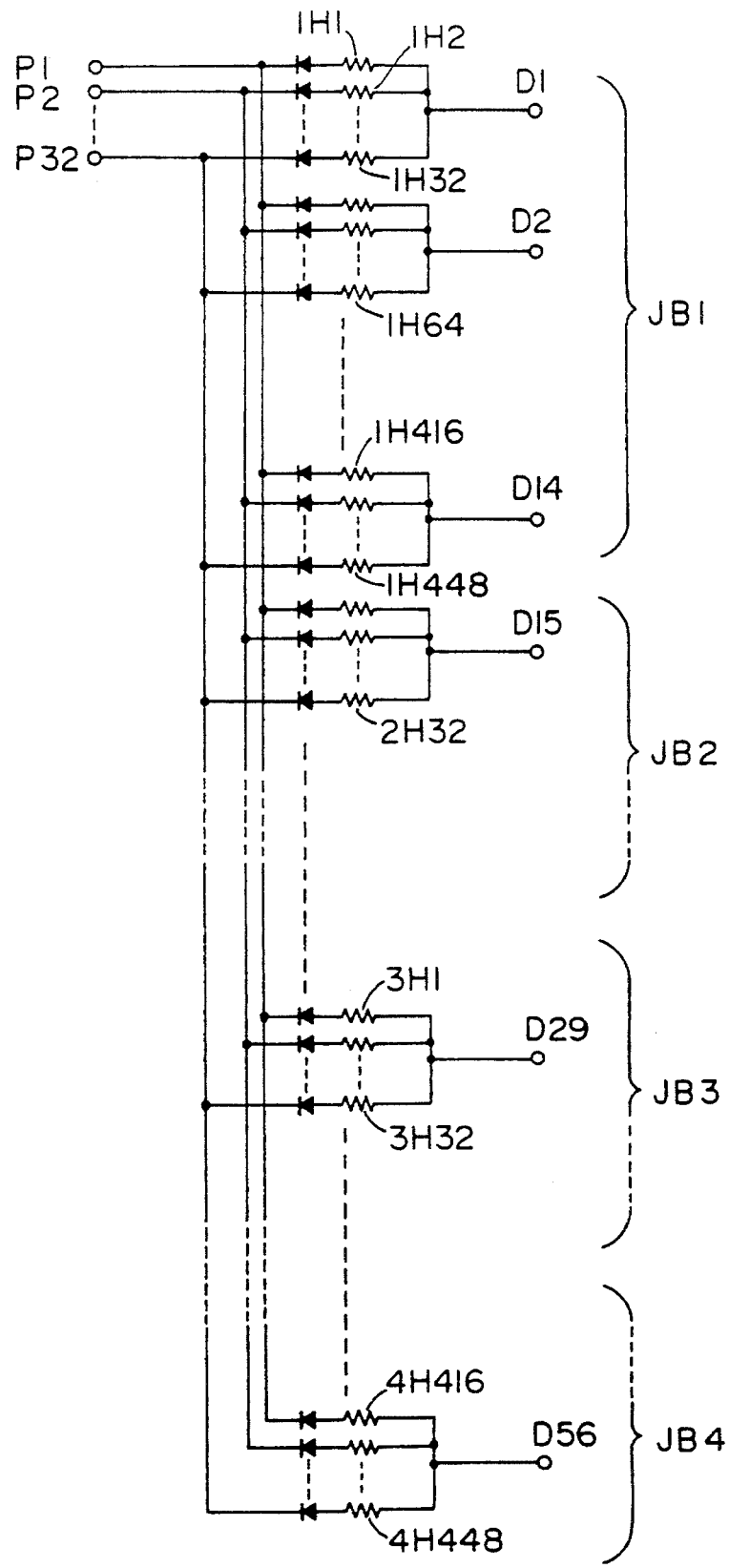
FIG. 45 is a circuit diagram showing another example of the drive circuit.
Figure 46:
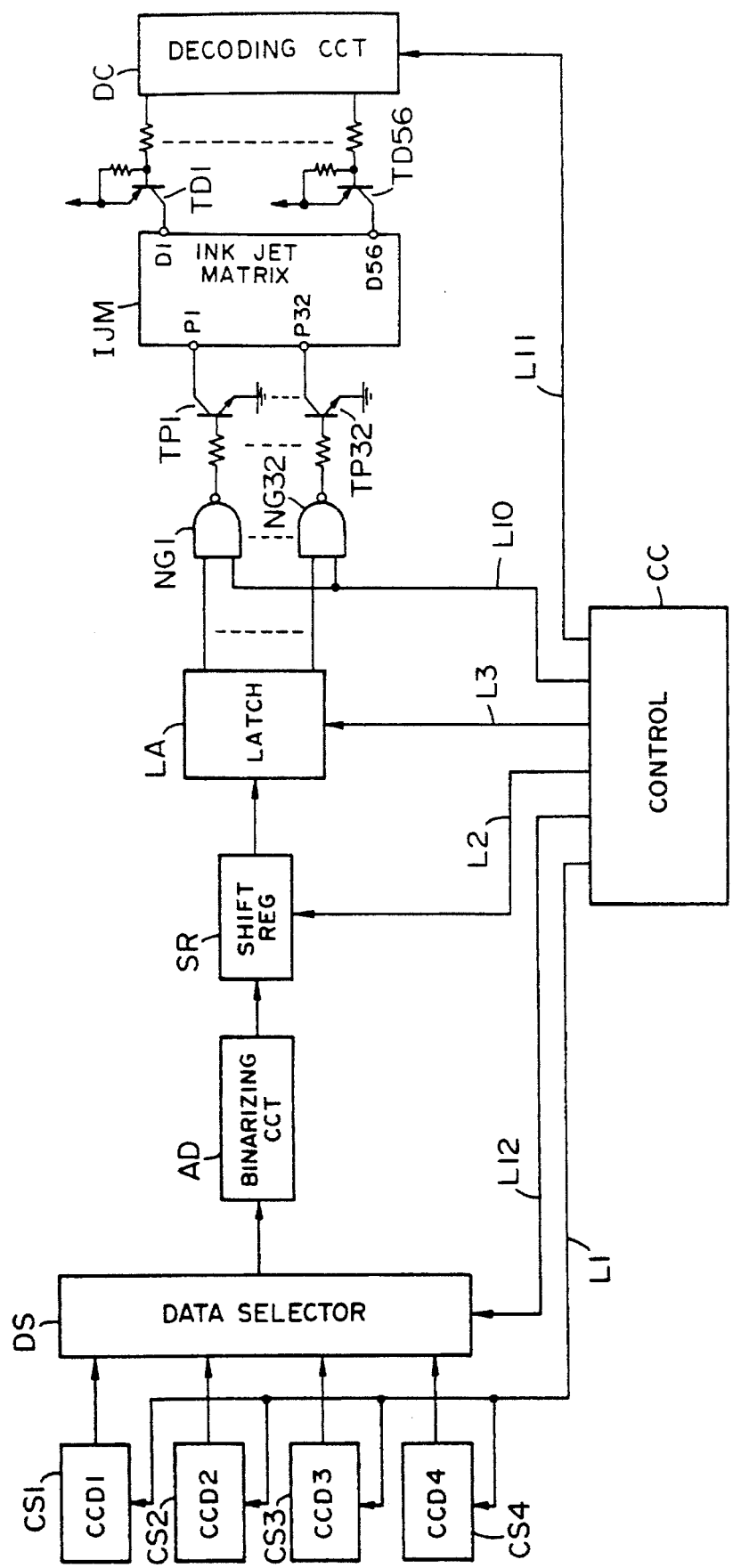
FIG. 46 is a schematic block diagram thereof.

FIGS. 45 and 46 show another embodiment of the present invention in which th geometrical arrangement of the CCD sensors and the ink jet recording blocks is the same as that in the preceding embodiment. The present embodiment provides a significantly simplified circuit by reducing the number of wirings in the matrix and using a data processing circuit in common for 4 CCD sensors. In contrast to the parallel data processing for 4 sensors in the circuit of FIG. 43, the data processing circuit shown in FIG. 46 effects a time-divided serial processing.

Referring to FIG. 45, there are provided 1792 heating elements 1H1–4H448 which are respectively connected to diodes for preventing cross talk. The 1792 ink jet nozzles are divided into 4 blocks each having 14 scan signal input terminals D1–D14. The other ends of the heating elements are cyclically connected to 32 data input terminals P1–P32.

In FIG. 46, the output signals from CCD sensors CS1–CS4 are supplied to a 4 line-to-1 line analog-data selector DS, which selects the output from CCD sensors for every quarter of the scan line (205 mm on the original) and connects these output signals in serial manner to constitute a scan line. The selection is achieved by the signals supplied from the control circuit CC through a signal line L12.

The subsequent processing is conducted in the same manner as explained in the preceding embodiment, and the signals are supplied to the data input terminals D1–D32 of the matrix IJM through a binarizing circuit AD, a shift register SR of 32 bits, a latch circuit LA of 32 bits, 32 NAND gates NG1–NG32 and transistors TP1–TP32. In this case there is employed a 6 line-to-56 line decoding circuit DC.

Although the present embodiment enables the use of a simplified circuit, it requires a 4 times larger recording time in comparison with the preceding embodiment. However such difference is negligible in consideration of the response frequency of the ink jet head of the present invention.

Figure 47:
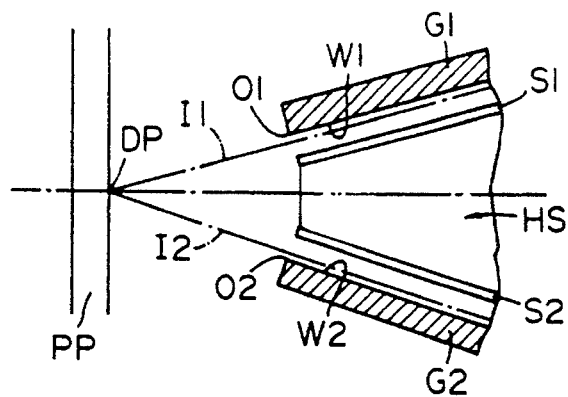
FIG. 47 is a view showing another example of the head structure.

FIG. 47 shows another embodiment of the recording head in a schematic cross-sectional view, wherein a metal substrate HS has mutually converging faces. The converging faces are provided with substrates S1, S2 having heating elements. Substrates S1, S2 are joined respectively to grooved plates G1, G2 to form liquid chambers W1, W2 on both sides of the metal substrate HS.

Liquid chamber W1 emits the recording droplets from the orifice O1 thereof in a direction I1 while the other liquid chamber W2 emits the droplets from the orifice O2 thereof in a direction I2, with both of said directions converging on the same line DP on the recording member PP.

Consequently the vertical aberration of the recording does not occur even when the heads G1, G2 are arranged in a staggered fashion as shown in FIG. 41. It is thus possible to employ a commercially available linear sensor instead of the sensor with staggered arrangement as shown in FIG. 41.

The present embodiment is further advantageous in that the data processing circuit can be simplified as shown in FIGS. 43 and 46.

Also the present embodiment permits a significant increase of the orifice density and thus the image information density. Furthermore it is possible to record arbitrary format on the recording member PP by supplying suitable image signals from different information sources. For example it is possible to obtain an easily readable print format by supplying the information of tabulating frames and of contents of such a table respectively to the odd-numbered blocks and the even-numbered blocks.

The legibility of the recorded information can be further improved by the use of plural colors, for example black and red.

Furthermore, if the head is provided, instead of staggered arrangement of the nozzle blocks, with upper and lower blocks which both perform recording on the same line DP, the doubly printed dot structure facilitates to reproduce the tonal rendition.

Furthermore it is possible to obtain a color image composed for example of red, blue and mixture thereof.

Figure 48:
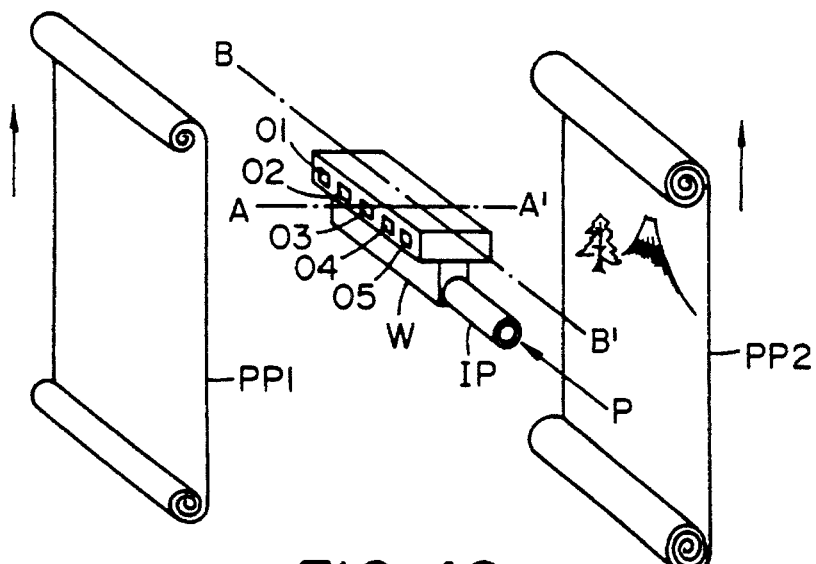
FIG. 48 is a view showing still another example of the head structure.
Figure 49A:
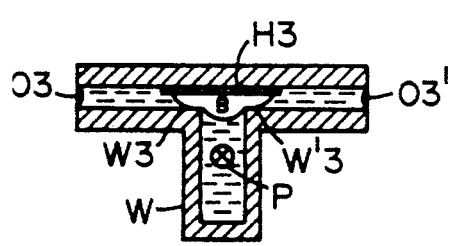
FIGS. 49A and 49B are cross-sectional views thereof.
Figure 49B:
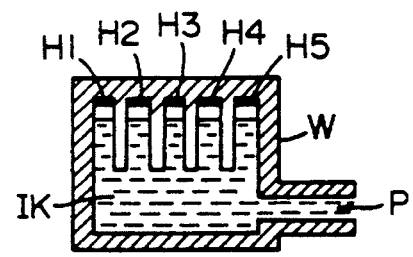

FIG. 48 shows, in a schematic perspective view, a recording head for simultaneously obtaining two records and advantageously embodying the present invention, and FIGS. 49A and 49B are cross-sectional views thereof respectively along the directions A—A' and B—B' in FIG. 48. As illustrated the ink chamber W is divided into five small chambers, which are respectively provided with heating elements H1–H5 at the uppermost portions thereof. Ink IK is maintained under a pressure P as explained in the foregoing. Upon application of a drive pulse for example to the heating element H3, a bubble is generated as shown in FIG. 49A to create propelling force toward both lateral directions.

In case the bubble collides with the opposing walls W3 and W3', the force of collision is diverted laterally to intensify the propelling force. In addition the droplet propelling force is advantageously transmitted to both lateral directions as the bubble B is subjected, at the center thereof, to pressure P. It is therefore rendered possible to perform similar recordings simultaneously on two recording media PP1 and PP2 with the use of a single heating element and a single drive pulse.

Figure 50:
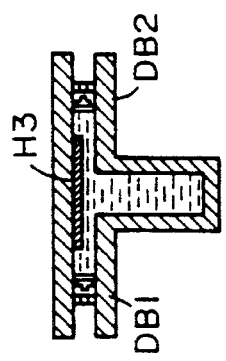
FIGS. 50 and 51 are schematic views of still other examples.

In case such two records are only occasionally required, the orifice O3' is maintained in continuous use while the other orifice O3 may be fitted with a cap CP which returns the emitted droplets to the ink chamber through a pipe CPP as shown in FIG. 50.

Also such cap may be provided both on the orifices O3 and O3' for example for preventing the clogging and drying of the orifices. Furthermore if such cap CP is made of a substantially transparent material, the emission test Of the nozzle can be easily confirmed from the outside without causing unnecessary ink stain nor requiring particular test board or test place.

Figure 51:
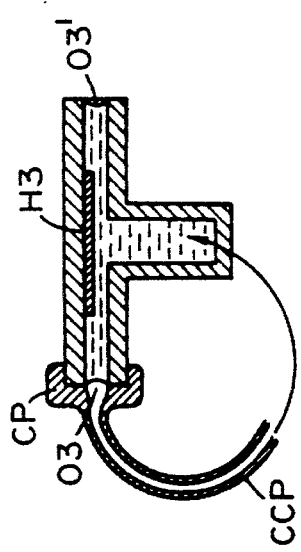

FIG. 51 shows another embodiment in which the recording is selectively controlled by solenoid valves DB1 and DB2.

Figure 52:
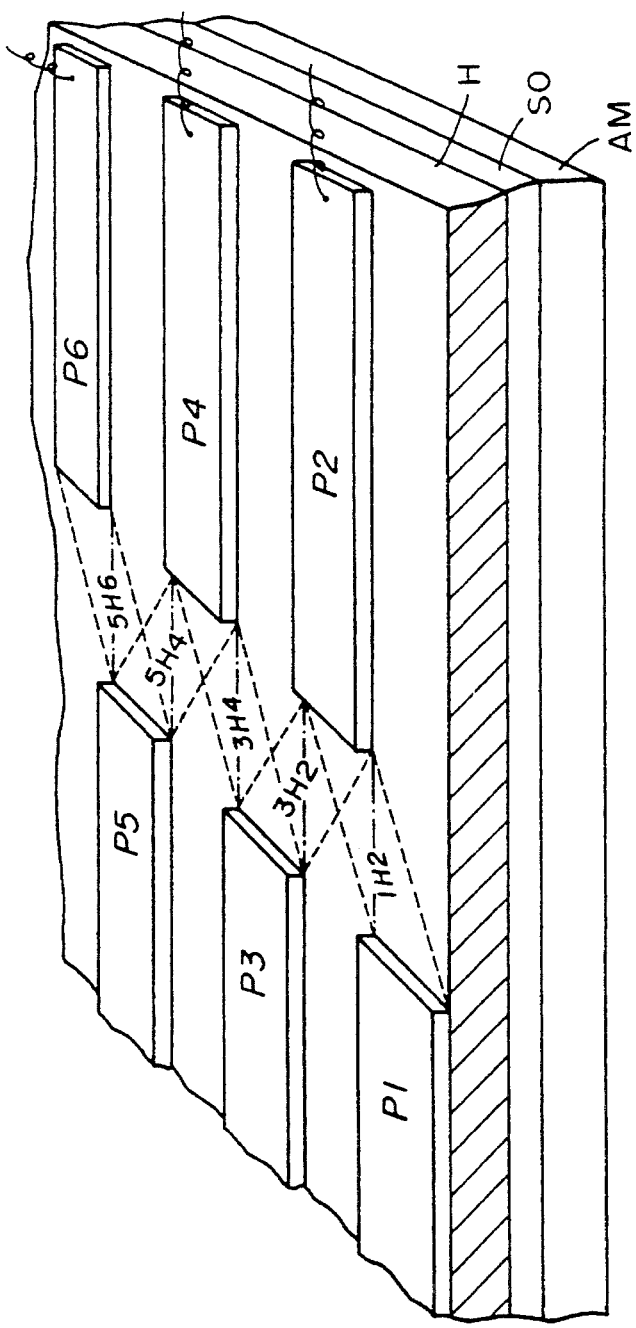
FIG. 52 is a perspective view of still another example of the heat-generating unit of the head.

FIG. 52 shows another embodiment of the arrangement of heating elements allowing easy and inexpensive manufacture with improved density. In this embodiment selecting electrodes P1–P6 are provided on a heat-generating resistor layer H to define heat-generating areas 1H2, 3H2, 3H4, 5H4 and 5H6 therein. For example the area 1H2 is selected by supplying the drive pulse to the electrodes P1 and P2. Also the pulse supply to the terminals P5 and P4 generates heat in the area 5H4 to form a bubble thereon. It is quite easy to design a selecting circuit for such structure, and the structure itself is extremely simplified because of the absence of etching process for the layer H. Naturally there may added suitable etching steps in certain portions if necessary.

Figure 53:
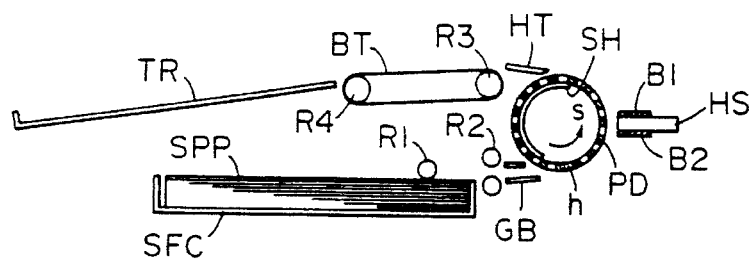
FIG. 53 is a schematic view of an example of the apparatus.

FIG. 53 shows, in a cross-sectional view, the feeding and recording sections of a copier or a facsimile apparatus in which a sheet-formed recording medium is advanced around a rotary drum. Sheet-formed recording paper SPP contained in a sheet feed cassette SFC are taken out therefrom by a pick-up roller R1 and advanced to the surface of a rotary drum PD by means of a feed roller R2 and a guide plate GB. Rotary drum PD is provided on the surface thereof with regularly and densely distributed small suction holes h. The rotary drum PD is rotated at a constant speed in a direction of arrow S by an unrepresented drive source and the air is sucked from the interior of the rotary drum by unrepresented suction means.

The recording paper SPP guided to the surface of rotary drum PD is maintained thereon by suction holes h and is rotated integrally with the rotary drum PD.

There are provided two groups B1 and B2 of ink jet recording heads on and under a heat sink plate HS as explained in the foregoing to obtain recording on the recording paper supported on the rotary drum according to the image signals.

After the recording, the recording paper is separated from the rotary drum PD by means of a suction shielding cylinder SH provided thereon of a paper separating claw HT.

The recording sheet released from the rotary drum PD is transferred, by means of a roller R3, onto a conveyor belt BT rotated at the speed same as the peripheral speed of drum PD, and finally ejected onto a tray TR.

Figure 54:
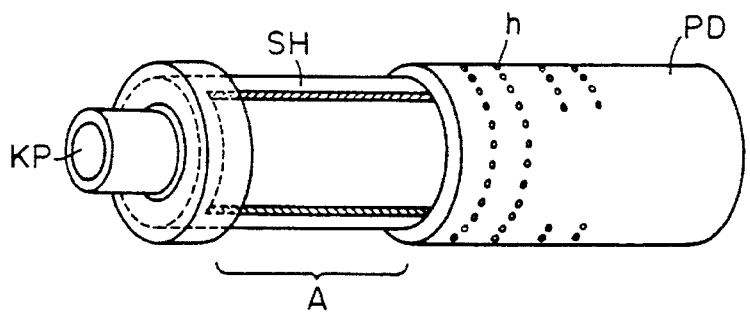
FIG. 54 is a perspective view of the drum unit.
Figure 55:
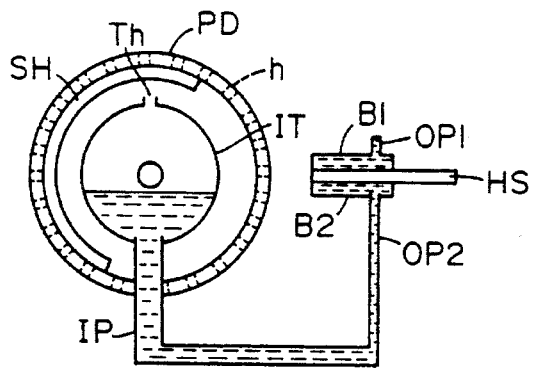
FIG. 55 is a cross-sectional view of an example thereof.

FIG. 54 shows the details of rotary drum PD having the above-explained suction holes h thereon. As shown in the cut-off portion A, the rotary drum PD is provided with a suction shielding cylinder SH positioned therein and closely thereto, the shielding cylinder being open in an area facing to the ink jet heads B1 and B2 to exert a suction force substantially in the area only. In the vicinity of the separating claw HT the suction force is shielded by the shielding cylinder as shown in FIG. 53 to facilitate paper separation from the drum. The shielding cylinder is connected to a suction pipe KP and positioned in such a manner that the aperture of the cylinder is constantly directed toward the ink jet heads regardless of the rotary motion of the rotary drum. Suction pipe KP is connected for example to a hose, through which the air inside the rotary drum is exhausted by a suction fan. FIG. 55 shows another preferred embodiment in which the ink tank IT is accommodated in the rotary drum PD for achieving a more compact structure than in the embodiment shown in FIG. 20 and also improving the suction efficiency.

The liquid leak from the heads can be advantageously prevented by positioning the liquid level in the ink tank IT lower than the head position and effecting the ink supply to the ink chamber by capillary action. It is also possible to adjust the liquid chamber at a negative pressure utilizing the suction air flow present in the rotary drum, even if the liquid level in the ink tank IT is not lowered. 15 In the full-line multiple head having upper and lower head blocks as explained above or as shown in FIG. 53, the precision of the vertical distance between the upper and lower head blocks is very important. Particularly in the case of an ink jet copier, the error in the distance between the print dots should not exceed a half of the dot-to-dot distance, or ca. 50 micrometers. The distance between the head blocks should be maintained at the same precision, and requires fine adjustment in practice in consideration of the precision of the thickness of the substrate HS or of the mounting precision of the heads.

The next embodiment allows the adjustment of print distance by merely displacing the heat sink HS without modifying the head distance, after the heads are mounted on and under the heat sink HS in apparatus employing a rotary drum as explained above.

The head distance adjusting method of the present invention will be explained by FIG. 56.

Figure 56:
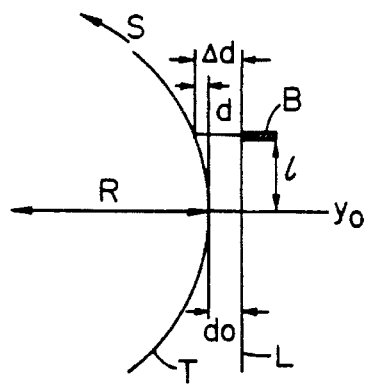
FIG. 56 is a schematic view showing the principle for correcting the head position.

In FIG. 56, T is a recording face of the recording sheet supported on the rotary drum, and L is a plane along which the front end of the head B is vertically displaced. It is assumed that the head is located at a distance l from a horizontal line $Y_o$ passing through the center of the drum. Also d is the horizontal distance from the head plane L to the recording face T, $d_o$ is the horizontal distance from the head plane L to the recording plane T on line $y_o$, and R is the distance from the rotary center of the drum to the recording face T.

Under the above-explained conditions, the change in the horizontal distance with respect to horizontal distance $d_o$ on the line $y_o$, i.e. $\Delta d = d - d_o$ caused by the vertical displacement of the head along the plane L can be represented as a function of l in the following manner:

$$\Delta d = d - d_o = (R + d_o) - \sqrt{(R + d_o)^2 - l^2}$$

In case the head is shaped in a linear form and positioned on the line $y_o$, the droplet flies substantially in the horizontal direction practically without the influence of gravity to reach the recording face T since d and $d_o$ are practically sufficiently small. Thus the flight distance of the droplet changes by $\Delta d$ in response to the vertical displacement of the head.

However, because of the displacement of the recording face T in the direction S, a change in the flight distance results in a change in the arriving position of the droplet on the face T. The change $\Delta l$ in the print position resulting from the change in $\Delta d$ is represented by:

$$\Delta l = v_p / v_d \times \Delta d$$

wherein $v_p$ is the peripheral speed of the rotary drum, and $v_d$ is the flying speed of the droplet (assumed as constant throughout the flight).

In a numerical example there is obtained the following result: $\Delta l = 0.11$ mm for the conditions R=29 mm, $d_o$=1 mm, $v_d$=2 m/sec, $v_p$=0.2 m/sec and l=8 mm. This result signifies that, in case the ink droplet is emitted at a position distanced by 8 mm from the horizontal line $y_o$, the print position will be displaced, due to the displacement of the recording paper, by 0.11 mm from the print position obtained in case the recording paper is fixed.

Figure 57:
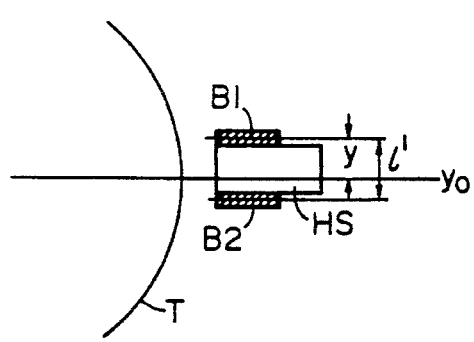
FIG. 57 is a cross-sectional view of an example of the apparatus.

It is now assumed that ink jet heads B1 and B2 are mounted on both faces of the heat sink plate HS with a nozzle distance l' as shown in FIG. 57. From the foregoing explanation, the aberration $\Delta l$ between the printed dots formed by the heads B1 and B2 is given by the following equation as a function of the distance y of the head B1 from the line $y_o$:

$$\Delta l = \frac{v_p}{v_d} [\sqrt{(R+d_o)^2 - (l'-y)^2} - \sqrt{(R+d_o)^2 - y^2}]$$

wherein $\Delta l$ is positive or negative respectively when the dot distance is increased or decreased due to the difference in the flight distances.

A result $\Delta l = 0$, or absence of aberration, is obtained when y=l'/2, or when the heads B1 and B2 are positioned symmetrically with respect to the line $y_o$. Consequently it is possible to reduce $\Delta l$ toward zero by displacing the entire head upwards (y>l'/2) or downwards (y<l'/2) respectively when the value l' is larger or smaller than the design value $l_o$.

The maximum correction is obtained when either head is positioned on the line $y_o$, i.e. y=0 or y=l'. From the foregoing example this value corresponds to ca. 0.11 mm in the case of a head distance of 8 mm.

Figure 58:
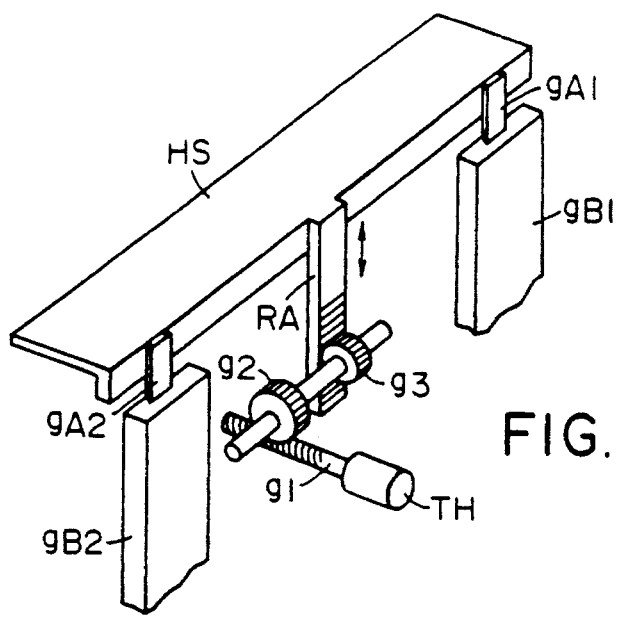
FIG. 58 s a perspective view of an example of the vertical adjust means.

Thus, in case the head distance designed as 8 mm is changed for example to 7.9 mm by an error in the manufacture, the resolution of the dots will be deteriorated from a designed value of 64 dots/mm to ca. 63 dots/mm if the head is symmetrically positioned with respect to the line $y_o$ (y=l'/2). However such error can be compensated by displacing the head downwards in such a manner that the had B1 is approximately positioned on the line $y_o$ by the correcting means as shown in FIG. 58. In FIG. 58, a knob TM rotates gears g1, g2 and g3 to vertically displace a rack RA which is fixed to the heat sink HS, so that the heads B1 and B2 are displaced in the vertical direction.

Referring to FIG. 58 gA1 and gA2 are guide rods for the heat sink HS, and gB1 and gB2 are guide members.

Figure 59:
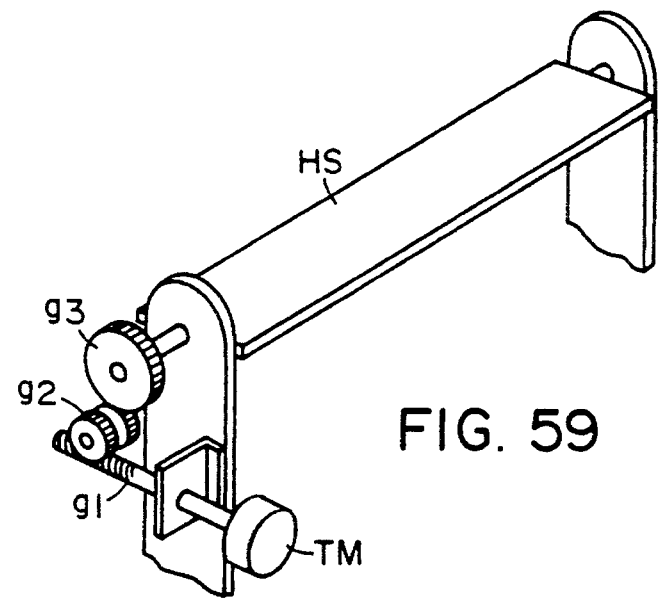
FIG. 59 s a perspective view of an example of the mechanism for changing the ink emitting direction.
Figure 60:
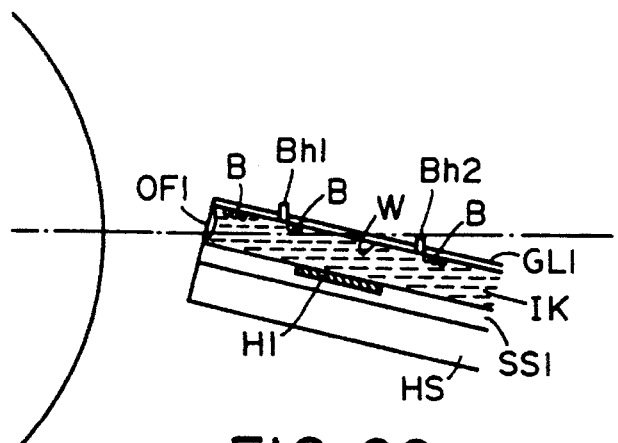
FIG. 60 s a cross-sectional view useful in understanding the principle of bubble elimination.
Figure 61:
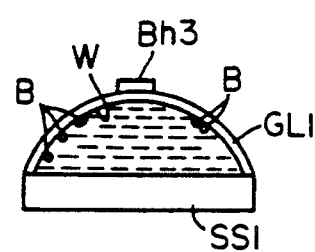
FIG. 61 is a cross-sectional view of an example of the ink chamber.

Although the foregoing embodiment provides a simple adjustment for the flight distance of droplets from a 2-layered ink jet head by vertical displacement thereof, it is also possible to modify the flight distance by rotating the head, as shown in FIG. 59, in which the heat sink plate HS is rotated by an adjust screw TM through gears g1, g2 and g3. Also FIG. 60 schematically shows the state of changing the angle of the head. The upward position as illustrated of the nozzle is preferable in that the unnecessary bubbles B are spontaneously eliminated from the orifice and in that the heavy dusts are collected in the rear portion. It is also possible to provide apertures Bh1, Bh2 etc. for eliminating unnecessary bubbles. Particularly the presence of the aperture Bh2 is advantageous in preventing the interruption of ink supply by the bubble. Also a dome-shaped ink chamber W as shown in FIG. 61 is advantageous in that unnecessary bubbles are spontaneously collected in the top portion of the dome and eliminated effectively through an aperture Bh3. Furthermore, it possible to incline the head or open the apertures in case the bubble elimination becomes necessary.

What we claim is:

1. An information recording apparatus comprising:

recording means for recording on a recording medium, said recording means having a plurality of heat energy generating elements corresponding to a plurality of ejection portions for ejecting ink, wherein each said heat energy generating element generates heat in response to a drive signal that causes a bubble to grow rapidly in the ink and then vanish gradually, so that the bubble forms more quickly than it vanishes, thereby ejecting ink droplets from corresponding ejection portions and attaching the ink droplets to the recording medium;

control means for causing said recording means to eject two ink droplets from different ejection portions to a same position on the recording medium so that the tone of the recording is emphasized; and driving means for sequentially driving plural blocks of said heat energy generating elements, each said block including plural heat energy generating elements, by applying the drive signal to selected said heat energy generating elements in each said block in accordance with recording information.

2. An apparatus according to claim 1, wherein said recording means includes a first head array and a second head array, each having a plurality of ejection portions aligned on corresponding lines, said first and second head arrays being mutually spaced with a predetermined interval in a relative scanning direction with respect to the recording medium, and said control means causing the ink droplets to be ejected respectively from said first and second ejection portions to the same position on the recording medium for multi-recording.

3. An apparatus according to claim 1, wherein the ink is color ink.

4. An information recording apparatus according to claim 1, wherein the ejection portions are ejection ports.

5. An information recording apparatus according to claim 1, further comprising:

storage means for storing the recording medium;

an image forming unit in which the image is formed by said recording without contacting the recording medium;

discharge means for discharging the recording medium on which the image has been formed; and transporting means for transporting the recording medium through a transport path from said storage means through said image forming unit to said discharge means, wherein the transport path for the recording medium has a U-shaped configuration.

6. An apparatus according to claim 5, wherein said recording means is of a serial type in which a moving scanning is performed in a direction perpendicular to a transport direction of the recording medium.

7. An apparatus according to claim 5, wherein said recording means is of a full-line type in which said ejection portions are arranged to permit recording over substantially the whole recording width of the recording medium.

8. An apparatus according to claim 5, wherein said image forming unit includes a platen, said platen having a cylindrical configuration of a drum on the periphery of which is an absorbing hole for transporting the recording medium by absorption.

9. An apparatus according to claim , wherein said platen includes an ink tank for storing the ink to be supplied to said recording means.

10. An apparatus according to claim 5, wherein said recording means comprises a copying machine having a reading unit for reading the image.

11. An apparatus according to claim 5, wherein said recording means comprises a facsimile machine having a reading unit for reading the image, and transmitting and receiving means for transmitting a read image signal and for receiving a transmitted image signal.

12. An apparatus according to claim 5, wherein said recording means comprises a plurality of recording units, each including a plurality of ejection portions, and said plurality of recording units are mounted on a common base.

13. An apparatus according to claim 5, wherein said recording means comprises a plurality of recording units, each including a plurality of ejection portions for ejecting droplets, and said plurality of recording units are adapted to eject droplets of mutually different colors.

14. An information recording apparatus according to claim 1, wherein the ejection portions are ejection ports.

15. An apparatus according to claim 5, wherein said recording means includes heating resistive elements for generating the heat energy.

16. An apparatus according to claim 15, wherein said recording means includes a plurality of ejection portions for ejecting ink, a plurality of ink paths including said heating resistive elements, each ink path being connected to a corresponding ejection portion, and a common ink chamber connected to said ink paths for storing ink to be supplied to said ink paths, said common ink chamber having a substantially dome-shaped configuration.

17. An apparatus according to claim 15, wherein said recording means includes a plurality of ejection portions for ejecting ink, a plurality of ink paths including said heating resistive elements, each ink path being connected to a corresponding ejection portion, and a common ink chamber connected to said ink paths for storing ink to be supplied to said ink paths, and said plurality of ejection portions are aligned on two lines.

* * * * *

UNITED STATES PATENT AND TRADEMARK OFFICE
CERTIFICATE OF CORRECTION

PATENT NO. : 5,486,848
DATED : January 23, 1996
INVENTOR(S) : NAOKI AYATA ET AL.          Page 1 of 5

It is certified that error appears in the above-identified patent and that said Letters Patent is hereby corrected as shown below:

Title page,
AT [56] REFERENCES CITED

U.S. Patent Documents,
"3,897,492  10/1976  Kraus et al." should read
--3,987,492  10/1976  Kraus et al.--.

Foreign Patent Documents,
"2349340B2  4/1975  Germany" should be deleted.
"2944005A1  5/1980  Germany" should be deleted.

COLUMN 1

Line 28, "therein" should read --therein.--.
line 29, "more" should read --More--.

COLUMN 4

Line 3, "s" should read --is--.
Line 5, "s" should read --is--.
Line 7, "s" should read --is--.
Line 17, "no" should read --now--.
Line 43, "with" should be deleted.
Line 66, "on" should read --an--.

COLUMN 7

Line 64, "$22_1-21_5$." should read --$22_1-22_5$.--.

UNITED STATES PATENT AND TRADEMARK OFFICE
CERTIFICATE OF CORRECTION

PATENT NO. : 5,486,848
DATED : January 23, 1996
INVENTOR(S) : NAOKI AYATA ET AL.

It is certified that error appears in the above-identified patent and that said Letters Patent is hereby corrected as shown below:

COLUMN 10

Line 61, "dot" should read --dots--.
    Line 66, "multiorifice" should read --multi-orifice--.

COLUMN 11

Line 20, "simplifying" should read --simplify--.
    Line 49, "lines/mm" should read --lines/mm,--.
    Line 59, "super-posed" should read --superposed--.

COLUMN 12

Line 25, "V4" should read --VRM--.
    Line 27, "VR" should read --VRM--.
    Line 31, "V" should read --VRM--.

COLUMN 15

Line 38, "ends" should read --end--.

COLUMN 16

Line 29, "in." should read --in--.

UNITED STATES PATENT AND TRADEMARK OFFICE
CERTIFICATE OF CORRECTION

PATENT NO. : 5,486,848
DATED : January 23, 1996
INVENTOR(S) : NAOKI AYATA ET AL.

Page 3 of 5

It is certified that error appears in the above-identified patent and that said Letters Patent is hereby corrected as shown below:

COLUMN 17

Line 2, "iC'" should read --1C'--.
Line 9, "sink P" should read --sink HS.--.

COLUMN 18

Line 40, "being" should be deleted.

COLUMN 19

Line 8, "Width" should read --width--.
Line 23, "levels-corresponding" should read
--levels corresponding--.

COLUMN 20

Line 17, "there-from" should read --therefrom--.

COLUMN 21

Line 14, "procedure" should read --procedures--.
Line 64, "the-latch" should read --the latch--.

COLUMN 24

Line 12, "th" should read --the--.

UNITED STATES PATENT AND TRADEMARK OFFICE
CERTIFICATE OF CORRECTION

PATENT NO. : 5,486,848
DATED : January 23, 1996
INVENTOR(S) : NAOKI AYATA ET AL.

It is certified that error appears in the above-identified patent and that said Letters Patent is hereby corrected as shown below:

COLUMN 25

Line 49, "Of" should read --of--.

COLUMN 26

Line 57, "15 In" should read --¶ In--.

COLUMN 27

Line 12, "Line $Y_o$" should read --Line $Y_o$.--.

COLUMN 28

Line 14, "had" should read --head--.
Line 20, "FIG. 58" should read --FIG. 58,--.
Line 40, "it" should read --it is--.

COLUMN 29

Line 39, "claim ," should read --claim 8,--.

UNITED STATES PATENT AND TRADEMARK OFFICE
CERTIFICATE OF CORRECTION

PATENT NO. : 5,486,848
DATED : January 23, 1996
INVENTOR(S) : NAOKI AYATA ET AL.

It is certified that error appears in the above-identified patent and that said Letters Patent is hereby corrected as shown below:

<u>COLUMN 30</u>

Line 19, "claim 1," should read --claim 5,--.

Signed and Sealed this

Nineteenth Day of November, 1996

Attest:

BRUCE LEHMAN

Attesting Officer    Commissioner of Patents and Trademarks